United States Patent
Xu et al.

(10) Patent No.: US 12,225,603 B2
(45) Date of Patent: Feb. 11, 2025

(54) COMMUNICATION METHOD AND APPARATUS FOR REDUCING DATA TRANSMISSION DELAY AND REDUCING SIGNALING OVERHEADS

(71) Applicant: Huawei Technologies Co., Ltd., Shenzhen (CN)

(72) Inventors: Xiaoying Xu, Shanghai (CN); Qufang Huang, Shenzhen (CN); Chong Lou, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 451 days.

(21) Appl. No.: 17/673,548

(22) Filed: Feb. 16, 2022

(65) Prior Publication Data
US 2022/0174760 A1    Jun. 2, 2022

Related U.S. Application Data

(63) Continuation of application No. PCT/CN2019/101186, filed on Aug. 16, 2019.

(51) Int. Cl.
*H04W 4/00* (2018.01)
*H04W 76/12* (2018.01)
(Continued)

(52) U.S. Cl.
CPC .......... *H04W 76/12* (2018.02); *H04W 76/19* (2018.02); *H04W 76/20* (2018.02); *H04W 76/30* (2018.02)

(58) Field of Classification Search
CPC ...... H04W 76/12; H04W 76/19; H04W 76/30
See application file for complete search history.

(56) References Cited

U.S. PATENT DOCUMENTS

| 2013/0039339 A1* | 2/2013 | Rayavarapu | H04W 76/19 370/329 |
|---|---|---|---|
| 2016/0198517 A1* | 7/2016 | Shi | H04W 76/22 370/329 |

(Continued)

FOREIGN PATENT DOCUMENTS

| CN | 108616988 A | 10/2018 |
| CN | 109151800 A | 1/2019 |

(Continued)

OTHER PUBLICATIONS

Nokia, Nokia Shanghai Bell, ATandT(?), Qualcomm(?), "KI #2, evaluation of user plane solutions," 3GPP TSG-SA WG2 Meeting #129bis, West Palm Beach, USA, S2-1812721, total 3 pages, 3rd Generation Partnership Project, Valbonne, France (Nov. 26-30, 2018).

(Continued)

*Primary Examiner* — Elisabeth Benoit Magloire
(74) *Attorney, Agent, or Firm* — Leydig, Voit & Mayer, Ltd.

(57) ABSTRACT

This application provides a communication method and apparatus, and relates to the field of communication technologies, to resolve problems of a long data transmission delay and high signaling overheads. A first access network device receives uplink user plane data from a user equipment in an inactive state, and sends an uplink control plane information element and the uplink user plane data to a second access network device through a same interface. The method is applied to a data transmission process.

17 Claims, 24 Drawing Sheets

(51) Int. Cl.
  *H04W 76/19*  (2018.01)
  *H04W 76/20*  (2018.01)
  *H04W 76/30*  (2018.01)

(56) References Cited

U.S. PATENT DOCUMENTS

| | | |
|---|---|---|
| 2018/0332467 A1 | 11/2018 | Tenny et al. |
| 2019/0174571 A1* | 6/2019 | Deenoo ................ H04W 76/11 |
| 2019/0342854 A1* | 11/2019 | Rune ..................... H04W 68/02 |
| 2019/0357106 A1* | 11/2019 | Ke ....................... H04W 36/023 |
| 2021/0185755 A1* | 6/2021 | Kim .................... H04W 68/005 |
| 2021/0274393 A1* | 9/2021 | Zhou ................... H04W 76/27 |
| 2022/0369410 A1* | 11/2022 | Bedekar ............... H04W 76/27 |

FOREIGN PATENT DOCUMENTS

| | | |
|---|---|---|
| WO | 2018126812 A1 | 7/2018 |
| WO | 2019149258 A1 | 8/2019 |

OTHER PUBLICATIONS

Qualcomm Incorporated, "(TP for NR BL CR for TS 38.423) Periodic RNAU Without Anchor Relocation," 3GPP TSG-RAN WG3 Meeting AH1807, Montreal, Canada, R3-183735, total 15 pages, 3rd Generation Partnership Project, Valbonne, France (Jul. 2-6, 2018).

Zte, "XnAP Correction of Xn-U Address Indication Procedure," 3GPP TSG RAN WG3#103bis, Xian, China, R3-191255, total 3 pages, 3rd Generation Partnership Project, Valbonne, France (Apr. 8-12, 2019).

"Discussion on functionality in RRC-Inactive state," 3GPP TSG-RAN WG3 Meeting #96, R3-171500, Hangzhou, P.R. China, Total 8 pages, 3rd Generation Partnership Project, Valbonne, France (May 15-19, 2017).

* cited by examiner

COMMUNICATION METHOD AND APPARATUS FOR REDUCING DATA TRANSMISSION DELAY AND REDUCING SIGNALING OVERHEADS

CROSS-REFERENCE TO RELATED APPLICATIONS

This application is a continuation of International Application No. PCT/CN2019/101186, filed on Aug. 16, 2019, the disclosure of which is hereby incorporated by reference in its entirety

TECHNICAL FIELD

This application relates to the field of communication technologies, and in particular, to a communication method and apparatus.

BACKGROUND

In a communication system, an inactive state is a state between a connected state and an idle state. When a user equipment (UE) that is in the inactive state and that moves out of a coverage area of a source base station needs to transmit data, the UE needs to perform context migration and user plane tunnel migration processes. This causes a long data transmission delay, high signaling overheads, and is not conducive to power saving of the UE. A user plane tunnel is a connection between an access network device (for example, a base station) and a user plane function (UPF) network element.

SUMMARY

Embodiments of this application provide a communication method and apparatus, to reduce a data transmission delay and reduce signaling overheads.

To achieve the foregoing objective, the following technical solutions are used in the embodiments of this application.

According to a first aspect, an embodiment of this application provides a communication method. The method is applied to a first access network device or a chip of the first access network device. The method includes: The first access network device receives uplink user plane data from user equipment in an inactive state, and sends an uplink control plane information element and the uplink user plane data to a second access network device through a same interface.

According to the communication method provided in this embodiment of this application, the first access network device can receive the uplink user plane data from the UE in the inactive state and then send the uplink control plane information element and the uplink user plane data to the second access network device, and the second access network device forwards the uplink user plane data to a core network device, so that a data transmission function is implemented. Because the first access network device that receives the uplink user plane data of the UE does not need to send the uplink user plane data to the core network device, but forwards the uplink user plane data to the core network device through the second access network device, there is no migration process of an access stratum context of the UE, and there is also no migration process of a user plane tunnel between the access network device and the core network device, so that a data transmission delay can be reduced, signaling overheads between the UE and the access network device can be reduced, and signaling overheads between the access network device and the core network device can also be reduced.

In a possible design, the uplink control plane information element includes: a first user equipment identifier, identity authentication information of the UE, a cell identifier of a target cell accessed by the UE, and a second user equipment identifier allocated by the first access network device to the UE.

The first user equipment identifier is used by the first access network device to determine the second access network device of the UE, and is further used by the second access network device to determine the access network context of the UE. For example, the first user equipment identifier may be an inactive radio network temporary identifier (I-RNTI) allocated by the second access network device to the UE.

The identity authentication information of the UE is used by the second access network device to perform authentication on whether an identity of the UE is authorized. For example, the identity authentication information of the UE may be a message authentication code (message authentication code for integrity, MAC-I) or a short MAC-I.

The cell identifier of the target cell accessed by the UE is used by the second access network device to generate new identity authentication information of the user equipment, and is further used by the second access network device to derive a new base station key. A cell in which the UE is located when the UE accesses the first access network device is referred to as the target cell. The target cell belongs to a coverage area of the first access network device.

The second user equipment identifier is used by the second access network device to perform resource scheduling. For example, the second access network device schedules an uplink resource based on the second user equipment identifier. The second user equipment identifier is further used by the second access network device to generate new identity authentication information of the user equipment. For example, the second user equipment identifier may be a cell radio network temporary identifier (C-RNTI) allocated by the first access network device to the UE.

In a possible design, the uplink control plane information element further includes a third user equipment identifier allocated by the first access network device to the UE. The third user equipment identifier is used to identify the user equipment. For example, the third user equipment identifier may be an Xn application protocol identifier (Xn-AP ID).

In a possible design, the uplink control plane information element further includes a cause value, and the cause value is used to indicate the second access network device to receive the uplink user plane data of the UE.

In a possible design, that the first access network device sends an uplink control plane information element and the uplink user plane data to a second access network device through a same interface includes: The first access network device sends the uplink control plane information element and the uplink user plane data to the second access network device through a user plane interface or a control plane interface. In this way, the access stratum context of the UE does not need to be migrated, and the user plane tunnel between the access network device and the core network device also does not need to be migrated. The data transmission function is implemented between the UE and the core network device through the first access network device and the second access network device, so that the data transmission delay is reduced and the signaling overheads are reduced.

In a possible design, that the first access network device sends the uplink control plane information element and the uplink user plane data to the second access network device through a control plane interface includes: The first access network device sends a control plane message to the second access network device through the control plane interface, where the control plane message carries the uplink control plane information element and the uplink user plane data. In this way, the uplink user plane data is transmitted between the first access network device and the second access network device through the control plane interface, to implement data transmission between the UE and the core network device, without needing to migrate the access stratum context of the UE, and without needing to switch the user plane tunnel between the access network device and the core network device (a UPF), thereby reducing the signaling overheads and reducing the data transmission delay.

In a possible design, the control plane message includes a context obtaining request message.

In a possible design, the communication method in this embodiment of this application further includes: The first access network device receives a feedback message of the context obtaining request message from the second access network device, where the feedback message is used to indicate that context obtaining fails.

In a possible design, that the first access network device sends the uplink control plane information element and the uplink user plane data to the second access network device through a user plane interface includes: The first access network device sends a user plane message to the second access network device through the user plane interface, where the user plane message carries the uplink control plane information element and the uplink user plane data. In this way, the uplink user plane data is transmitted between the first access network device and the second access network device through the user plane interface, to implement data transmission between the UE and the core network device, without needing to migrate the access stratum context of the UE, and without needing to switch the user plane tunnel between the access network device and the core network device (a UPF), thereby reducing the signaling overheads and reducing the data transmission delay.

In a possible design, the communication method in this embodiment of this application further includes: The first access network device receives a downlink control plane information element and downlink user plane data from the second access network device through a same interface; and the first access network device sends the downlink user plane data to the UE. In this way, the downlink user plane data is transmitted from the core network device to the UE through the second access network device and the first access network device, without needing to migrate the access stratum context of the UE, and without needing to switch the user plane tunnel between the access network device and the core network device (the UPF), thereby reducing the signaling overheads and reducing the data transmission delay.

In a possible design, that the first access network device receives a downlink control plane information element and downlink user plane data from the second access network device through a same interface includes: The first access network device receives a user plane message from the second access network device through the user plane interface, where the user plane message carries the downlink control plane information element and the downlink user plane data. In this way, the downlink user plane data is transmitted between the first access network device and the second access network device through the user plane interface, to implement data transmission between the UE and the core network device, without needing to migrate the access stratum context of the UE, and without needing to switch the user plane tunnel between the access network device and the core network device (the UPF), thereby reducing the signaling overheads and reducing the data transmission delay.

In a possible design, that the first access network device receives a downlink control plane information element and downlink user plane data from the second access network device through a same interface includes: The first access network device receives a control plane message from the second access network device through the control plane interface, where the control plane message carries the downlink control plane information element and the downlink user plane data. In this way, the downlink user plane data is transmitted between the first access network device and the second access network device through the control plane interface, to implement data transmission between the UE and the core network device, without needing to migrate the access stratum context of the UE, and without needing to switch the user plane tunnel between the access network device and the core network device (the UPF), thereby reducing the signaling overheads and reducing the data transmission delay.

In a possible design, the communication method in this embodiment of this application further includes: The first access network device receives downlink user plane data from the second access network device through the user plane interface; the first access network device receives a downlink control plane information element from the second access network device through the control plane interface; and the first access network device sends the downlink user plane data to the UE, where the downlink control plane information element includes a second indication information element, and the second indication information element is used to indicate the first access network device to receive the downlink user plane data from the second access network device.

In a possible design, the downlink control plane information element includes information used to identify the UE, so that the first access network device determines the UE that transmits information.

According to a second aspect, an embodiment of this application provides a communication method. The method is applied to a second access network device or a chip of the second access network device. The method includes: The second access network device receives uplink user plane data of user equipment UE and an uplink control plane information element from a first access network device through a same interface, then processes the uplink user plane data based on context information of the UE and the uplink control plane information element, and sends the uplink user plane data to a core network device. The second access network device stores the context information of the UE.

In a possible design, the uplink control plane information element includes: a first user equipment identifier, identity authentication information of the UE, a cell identifier of a target cell accessed by the UE, and a second user equipment identifier allocated by the first access network device to the UE.

In a possible design, the uplink control plane information element further includes a third user equipment identifier allocated by the first access network device to the UE.

In a possible design, the uplink control plane information element further includes a cause value, and the cause value is used to indicate the second access network device to receive the uplink user plane data of the UE.

In a possible design, that the second access network device receives uplink user plane data of UE and an uplink control plane information element from a first access network device through a same interface includes: The second access network device receives the uplink user plane data of the UE and the uplink control plane information element from the first access network device through a user plane interface or a control plane interface. In this way, an access stratum context of the UE does not need to be migrated, and a user plane tunnel between the access network device and the core network device also does not need to be migrated. A data transmission function is implemented between the UE and the core network device through the first access network device and the second access network device, so that a data transmission delay is reduced and signaling overheads are reduced.

In a possible design, that the second access network device receives the uplink user plane data of the UE and the uplink control plane information element from the first access network device through a control plane interface includes: The second access network device receives a control plane message from the first access network device through the control plane interface, where the control plane message carries the uplink user plane data of the UE and the uplink control plane information element. In this way, the uplink user plane data is transmitted between the first access network device and the second access network device through the control plane interface, to implement data transmission between the UE and the core network device, without needing to migrate the access stratum context of the UE, and without needing to switch the user plane tunnel between the access network device and the core network device (a UPF), thereby reducing the signaling overheads and reducing the data transmission delay.

In a possible design, the control plane message includes a context obtaining request message.

In a possible design, the communication method in this embodiment of this application further includes: The second access network device sends a feedback message of the context obtaining request message to the first access network device, where the feedback message is used to indicate that context obtaining fails.

In a possible design, that the second access network device receives the uplink user plane data of the UE and the uplink control plane information element from the first access network device through a user plane interface includes: The second access network device receives a user plane message from the first access network device through the user plane interface, where the user plane message carries the uplink user plane data of the user equipment UE and the uplink control plane information element. In this way, the uplink user plane data is transmitted between the first access network device and the second access network device through the user plane interface, to implement data transmission between the UE and the core network device, without needing to migrate the access stratum context of the UE, and without needing to switch the user plane tunnel between the access network device and the core network device (a UPF), thereby reducing the signaling overheads and reducing the data transmission delay.

In a possible design, the communication method in this embodiment of this application further includes: The second access network device sends a downlink control plane information element and downlink user plane data to the first access network device through a same interface. In this way, the downlink user plane data is transmitted from the core network device to the UE through the second access network device and the first access network device, without needing to migrate the access stratum context of the UE, and without needing to switch the user plane tunnel between the access network device and the core network device (the UPF), thereby reducing the signaling overheads and reducing the data transmission delay.

In a possible design, that the second access network device sends a downlink control plane information element and downlink user plane data to the first access network device through a same interface includes: The second access network device sends a control plane message to the first access network device through the control plane interface, where the control plane message carries the downlink control plane information element and the downlink user plane data.

In a possible design, that the second access network device sends a downlink control plane information element and downlink user plane data to the first access network device through a same interface includes: The second access network device sends a user plane message to the first access network device through the user plane interface, where the user plane message carries the downlink control plane information element and the downlink user plane data.

In a possible design, the communication method in this embodiment of this application further includes: The second access network device sends a downlink control plane information element to the first access network device through the control plane interface, and sends downlink user plane data to the first access network device through the user plane interface, where the downlink control plane information element includes a second indication information element, and the second indication information element is used to indicate the first access network device to receive the downlink user plane data from the second access network device.

In a possible design, the downlink control plane information element includes information used to identify the UE, so that the first access network device determines the UE that transmits information.

According to a third aspect, an embodiment of this application provides a communication method. The method is applied to a first access network device or a chip of the first access network device. The method includes: The first access network device receives uplink user plane data from user equipment UE in an inactive state, and then sends an uplink control plane information element and the uplink user plane data to a second access network device through different interfaces. The uplink control plane information element includes a first indication information element, and the first indication information element is used to indicate the second access network device to receive the uplink user plane data sent by the first access network device.

Because the first access network device that receives the uplink user plane data of the UE does not need to send the uplink user plane data to a core network device, but forwards the uplink user plane data to the core network device through the second access network device, there is no migration process of an access stratum context of the UE, and there is also no migration process of a user plane tunnel between the access network device and the core network device, so that a data transmission delay can be reduced, signaling overheads between the UE and the access network device can be reduced, and signaling overheads between the access network device and the core network device can also be reduced.

In a possible design, the first indication information element includes a cause value or a buffer status report BSR, and the cause value or the BSR is used to indicate the second access network device to receive the uplink user plane data sent by the first access network device.

In a possible design, the uplink control plane information element includes one or more of the following information elements: a first user terminal identifier, identity authentication information of the UE, a cell identifier of a target cell accessed by the UE, and a second user terminal identifier allocated by the first access network device to the UE.

In a possible design, that the first access network device sends an uplink control plane information element and the uplink user plane data to a second access network device through different interfaces includes: The first access network device sends the uplink control plane information element to the second access network device through a control plane interface, and sends the uplink user plane data to the second access network device through a user plane interface.

In a possible design, the communication method in this embodiment of this application further includes: The first access network device receives a downlink control plane information element and downlink user plane data from the second access network device through different interfaces, and then sends the downlink user plane data to the UE, where the downlink control plane information element includes a second indication information element, and the second indication information element is used to indicate the first access network device to receive the downlink user plane data from the second access network device. In this way, in a downlink user plane data transmission process, there is also no migration process of the access stratum context of the UE and no migration process of the user plane tunnel between the access network device and the core network device, thereby reducing the data transmission delay and reducing the signaling overheads.

In a possible design, that the first access network device receives a downlink control plane information element and downlink user plane data from the second access network device through different interfaces includes: The first access network device receives the downlink user plane data from the second access network device through the user plane interface, and receives the downlink control plane information element from the second access network device through the control plane interface.

In a possible design, the communication method in this embodiment of this application further includes: The first access network device starts a timer when the first access network device receives the downlink user plane data but does not receive the downlink control plane information element, where a running period of the timer is used by the first access network device to receive the downlink control plane information element, so that the first access network device is prevented from directly sending an RRC connection release message to the UE based on the downlink control plane information element.

In a possible design, the communication method in this embodiment of this application further includes: The first access network device receives a downlink control plane information element and downlink user plane data from the second access network device through the control plane interface; or the first access network device receives a downlink control plane information element and downlink user plane data from the second access network device through the user plane interface.

According to a fourth aspect, an embodiment of this application provides a communication method. The method is applied to a second access network device or a chip of the second access network device. The method includes: The second access network device receives an uplink control plane information element and uplink user plane data from a first access network device through different interfaces, then processes the uplink user plane data based on context information of UE and the uplink control plane information element, and sends the uplink user plane data to a core network device. The uplink control plane information element includes a first indication information element, the first indication information element is used to indicate the second access network device to receive the uplink user plane data from the first access network device, and the second access network device stores the context information of the UE.

In a possible design, the first indication information element includes a cause value or a buffer status report BSR, and the cause value or the BSR is used to indicate the second access network device to receive the uplink user plane data from the first access network device.

In a possible design, the uplink control plane information element includes one or more of the following information elements: a first user terminal identifier, identity authentication information of the UE, a cell identifier of a target cell accessed by the UE, and a second user terminal identifier allocated by the first access network device to the UE.

In a possible design, that the second access network device receives an uplink control plane information element and uplink user plane data from a first access network device through different interfaces includes: The second access network device receives the uplink control plane information element from the first access network device through a control plane interface, and receives the uplink user plane data from the first access network device through a user plane interface.

In a possible design, the communication method in this embodiment of this application further includes: The second access network device starts a timer when the second access network device receives the uplink user plane data but does not receive the uplink control plane information element, where a running period of the timer is used by the second access network device to receive the uplink control plane information element, so that the second access network device performs authentication on an identity of the UE.

In a possible design, the communication method in this embodiment of this application further includes: The second access network device sends a downlink control plane information element and downlink user plane data to the first access network device through different interfaces, where the downlink control plane information element includes a second indication information element, and the second indication information element is used to indicate the first access network device to receive the uplink user plane data from the second access network device. In this way, in a downlink user plane data transmission process, there is also no migration process of an access stratum context of the UE and no migration process of a user plane tunnel between the access network device and the core network device, thereby reducing a data transmission delay and reducing signaling overheads.

In a possible design, that the second access network device sends a downlink control plane information element and downlink user plane data to the first access network device through different interfaces includes: The second access network device sends the downlink control plane information element to the first access network device through the control plane interface, and sends the downlink user plane data to the first access network device through the user plane interface.

In a possible design, the communication method in this embodiment of this application further includes: The second access network device sends a downlink control plane information element and downlink user plane data to the first access network device through the control plane interface; or the second access network device sends a downlink control plane information element and downlink user plane data to the first access network device through the user plane interface.

According to a fifth aspect, an embodiment of this application provides a communication apparatus. The communication apparatus may be the first access network device in the first aspect. The communication apparatus includes a communication unit. The communication unit is configured to receive uplink user plane data from user equipment UE in an inactive state, and is further configured to send an uplink control plane information element and the uplink user plane data to a second access network device through a same interface.

In a possible design, the uplink control plane information element includes: a first user equipment identifier, identity authentication information of the UE, a cell identifier of a target cell accessed by the UE, and a second user equipment identifier allocated by the communication apparatus to the UE.

In a possible design, the uplink control plane information element further includes a third user equipment identifier allocated by the communication apparatus to the UE.

In a possible design, the uplink control plane information element further includes a cause value, and the cause value is used to indicate the second access network device to receive the uplink user plane data of the UE.

In a possible design, that the communication unit is configured to send an uplink control plane information element and the uplink user plane data to a second access network device through a same interface includes: The communication unit is configured to send the uplink control plane information element and the uplink user plane data to the second access network device through a user plane interface or a control plane interface.

In a possible design, that the communication unit is configured to send the uplink control plane information element and the uplink user plane data to the second access network device through a control plane interface includes: The communication unit is configured to send a control plane message to the second access network device through the control plane interface, where the control plane message carries the uplink control plane information element and the uplink user plane data.

In a possible design, the control plane message includes a context obtaining request message.

In a possible design, the communication unit is further configured to receive a feedback message of the context obtaining request message from the second access network device, where the feedback message is used to indicate that context obtaining fails.

In a possible design, that the communication unit is configured to send the uplink control plane information element and the uplink user plane data to the second access network device through a user plane interface includes: The communication unit is configured to send a user plane message to the second access network device through the user plane interface, where the user plane message carries the uplink control plane information element and the uplink user plane data.

In a possible design, the communication unit is further configured to: receive a downlink control plane information element and downlink user plane data from the second access network device through a same interface, and send the downlink user plane data to the UE.

In a possible design, that the communication unit is configured to receive a downlink control plane information element and downlink user plane data from the second access network device through a same interface includes: The communication unit is configured to receive a user plane message from the second access network device through the user plane interface, where the user plane message carries the downlink control plane information element and the downlink user plane data.

In a possible design, that the communication unit is configured to receive a downlink control plane information element and downlink user plane data from the second access network device through a same interface includes: The communication unit is configured to receive a control plane message from the second access network device through the control plane interface, where the control plane message carries the downlink control plane information element and the downlink user plane data.

In a possible design, the communication unit is further configured to: receive downlink user plane data from the second access network device through the user plane interface, receive a downlink control plane information element from the second access network device through the control plane interface, and send the downlink user plane data to the UE, where the downlink control plane information element includes a second indication information element, and the second indication information element is used to indicate the communication apparatus to receive the downlink user plane data from the second access network device.

In a possible design, the downlink control plane information element includes information used to identify the UE.

According to a sixth aspect, an embodiment of this application provides a communication apparatus. The communication apparatus may be the second access network device in the second aspect. The communication apparatus includes a communication unit and a processing unit. The communication unit is configured to receive uplink user plane data of user equipment UE and an uplink control plane information element from a first access network device through a same interface, where the communication apparatus stores context information of the UE. The processing unit is configured to process the uplink user plane data based on the context information of the UE and the uplink control plane information element. The communication unit is further configured to send the uplink user plane data to a core network device.

In a possible design, the uplink control plane information element includes: a first user equipment identifier, identity authentication information of the UE, a cell identifier of a target cell accessed by the UE, and a second user equipment identifier allocated by the first access network device to the UE.

In a possible design, the uplink control plane information element further includes a third user equipment identifier allocated by the first access network device to the UE.

In a possible design, the uplink control plane information element further includes a cause value, and the cause value is used to indicate the communication apparatus to receive the uplink user plane data of the UE.

In a possible design, that the communication unit is configured to receive uplink user plane data of UE and an uplink control plane information element from a first access network device through a same interface includes: The communication unit is configured to receive the uplink user plane data of the UE and the uplink control plane information element from the first access network device through a user plane interface or a control plane interface.

In a possible design, that the communication unit is configured to receive the uplink user plane data of the UE and the uplink control plane information element from the first access network device through a control plane interface includes: The communication unit is configured to receive a control plane message from the first access network device through the control plane interface, where the control plane message carries the uplink user plane data of the UE and the uplink control plane information element.

In a possible design, the control plane message includes a context obtaining request message.

In a possible design, the communication unit is further configured to send a feedback message of the context obtaining request message to the first access network device, where the feedback message is used to indicate that context obtaining fails.

In a possible design, that the communication unit is configured to receive the uplink user plane data of the UE and the uplink control plane information element from the first access network device through a user plane interface includes: The communication unit is configured to receive a user plane message from the first access network device through the user plane interface, where the user plane message carries the uplink user plane data of the UE and the uplink control plane information element.

In a possible design, the communication unit is further configured to send a downlink control plane information element and downlink user plane data to the first access network device through a same interface.

In a possible design, that the communication unit is configured to send a downlink control plane information element and downlink user plane data to the first access network device through a same interface includes: The communication unit is configured to send a control plane message to the first access network device through the control plane interface, where the control plane message carries the downlink control plane information element and the downlink user plane data.

In a possible design, that the communication unit is configured to send a downlink control plane information element and downlink user plane data to the first access network device through a same interface includes: The communication unit is configured to send a user plane message to the first access network device through the user plane interface, where the user plane message carries the downlink control plane information element and the downlink user plane data.

In a possible design, the communication unit is further configured to send a downlink control plane information element to the first access network device through the control plane interface, and send downlink user plane data to the first access network device through the user plane interface, where the downlink control plane information element includes a second indication information element, and the second indication information element is used to indicate the first access network device to receive the downlink user plane data from the communication apparatus.

In a possible design, the downlink control plane information element includes information used to identify the UE.

According to a seventh aspect, an embodiment of this application provides a communication apparatus. The communication apparatus may be the first access network device in the third aspect. The communication apparatus includes a communication unit and a processing unit. The communication unit is configured to receive uplink user plane data from user equipment UE in an inactive state, and is further configured to send an uplink control plane information element and the uplink user plane data to a second access network device through different interfaces, where the uplink control plane information element includes a first indication information element, and the first indication information element is used to indicate the second access network device to receive the uplink user plane data sent by the communication apparatus.

In a possible design, the first indication information element includes a cause value or a buffer status report BSR, and the cause value or the BSR is used to indicate the second access network device to receive the uplink user plane data sent by the communication apparatus.

In a possible design, the uplink control plane information element includes one or more of the following information elements: a first user terminal identifier, identity authentication information of the UE, a cell identifier of a target cell accessed by the UE, and a second user terminal identifier allocated by the communication apparatus to the UE.

In a possible design, that the communication unit is configured to send an uplink control plane information element and the uplink user plane data to a second access network device through different interfaces includes: The communication unit is configured to send the uplink control plane information element to the second access network device through a control plane interface, and is configured to send the uplink user plane data to the second access network device through a user plane interface.

In a possible design, the communication unit is further configured to: receive a downlink control plane information element and downlink user plane data from the second access network device through different interfaces, and send the downlink user plane data to the UE, where the downlink control plane information element includes a second indication information element, and the second indication information element is used to indicate the communication apparatus to receive the downlink user plane data from the second access network device.

In a possible design, that the communication unit is configured to receive a downlink control plane information element and downlink user plane data from the second access network device through different interfaces includes: The communication unit is configured to receive the downlink user plane data from the second access network device through the user plane interface, and is configured to receive the downlink control plane information element from the second access network device through the control plane interface.

In a possible design, the processing unit is configured to start a timer when determining that the communication apparatus receives the downlink user plane data but does not receive the downlink control plane information element; and the communication unit is further configured to receive the downlink control plane information element during a running period of the timer.

In a possible design, the communication unit is further configured to receive a downlink control plane information element and downlink user plane data from the second access network device through the control plane interface; or the communication unit is further configured to receive a downlink control plane information element and downlink user plane data from the second access network device through the user plane interface.

According to an eighth aspect, an embodiment of this application provides a communication apparatus. The communication apparatus may be the second access network device in the fourth aspect. The communication apparatus includes a communication unit and a processing unit. The communication unit is configured to receive an uplink control plane information element and uplink user plane data from a first access network device through different interfaces, where the uplink control plane information element includes a first indication information element, the first indication information element is used to indicate the communication apparatus to receive the uplink user plane data from the first access network device, and the communication apparatus stores context information of UE. The processing unit is configured to process the uplink user plane data based on the context information of the UE and the uplink control plane information element. The communication unit is further configured to send the uplink user plane data to a core network device.

In a possible design, the first indication information element includes a cause value or a buffer status report BSR, and the cause value or the BSR is used to indicate the communication apparatus to receive the uplink user plane data from the first access network device.

In a possible design, the uplink control plane information element includes one or more of the following information elements: a first user terminal identifier, identity authentication information of the UE, a cell identifier of a target cell accessed by the UE, and a second user terminal identifier allocated by the first access network device to the UE.

In a possible design, that the communication unit is configured to receive an uplink control plane information element and uplink user plane data from a first access network device through different interfaces includes: The communication unit is configured to receive the uplink control plane information element from the first access network device through a control plane interface, and is configured to receive the uplink user plane data from the first access network device through a user plane interface.

In a possible design, the processing unit is configured to start a timer when the communication apparatus receives the uplink user plane data but does not receive the uplink control plane information element. The communication unit is configured to receive the uplink control plane information element during a running period of the timer.

In a possible design, the communication unit is further configured to send a downlink control plane information element and downlink user plane data to the first access network device through different interfaces, where the downlink control plane information element includes a second indication information element, and the second indication information element is used to indicate the first access network device to receive the uplink user plane data from the communication apparatus.

In a possible design, that the communication unit is configured to send a downlink control plane information element and downlink user plane data to the first access network device through different interfaces includes: The communication unit is configured to send the downlink control plane information element to the first access network device through the control plane interface, and is configured to send the downlink user plane data to the first access network device through the user plane interface.

In a possible design, the communication unit is further configured to send a downlink control plane information element and downlink user plane data to the first access network device through the control plane interface; or the communication unit is further configured to send a downlink control plane information element and downlink user plane data to the first access network device through the user plane interface.

According to a ninth aspect, an embodiment of this application provides a communication apparatus, configured to implement a function of the first access network device in any one of the foregoing aspects, or configured to implement a function of the second access network device in any one of the foregoing aspects.

According to a tenth aspect, an embodiment of this application provides a communication apparatus, where the apparatus has a function of implementing the communication method according to any possible design of any one of the foregoing aspects. The function may be implemented by hardware, or may be implemented by hardware executing corresponding software. The hardware or the software includes one or more modules corresponding to the function.

According to an eleventh aspect, an embodiment of this application provides a communication apparatus, including a processor and a memory. The memory is configured to store computer-executable instructions. When the communication apparatus runs, the processor executes the computer-executable instructions stored in the memory, so that the communication apparatus performs the communication method in any possible design of any one of the foregoing aspects.

According to a twelfth aspect, an embodiment of this application provides a communication apparatus, including a processor. The processor is configured to: be coupled to a memory, and after reading instructions in the memory, perform the communication method in any possible design of any one of the foregoing aspects according to the instructions.

According to a thirteenth aspect, an embodiment of this application provides a communication apparatus, including a processor and an interface circuit. The interface circuit is configured to communicate with another apparatus. The processor is configured to: be coupled to a memory, and after reading instructions in the memory, perform the communication method in any possible design of any one of the foregoing aspects according to the instructions.

According to a fourteenth aspect, an embodiment of this application provides a computer-readable storage medium. The computer-readable storage medium stores instructions. When the instructions are run on a computer, the computer is enabled to perform the communication method in any possible design of any one of the foregoing aspects.

According to a fifteenth aspect, an embodiment of this application provides a computer program product including instructions. When the computer program product runs on a computer, the computer is enabled to perform the communication method in any possible design of any one of the foregoing aspects.

According to a sixteenth aspect, an embodiment of this application provides a circuit system. The circuit system includes a processing circuit, and the processing circuit is configured to perform the communication method in any possible design of any one of the foregoing aspects.

According to a seventeenth aspect, an embodiment of this application provides a chip, including a processor. The processor is coupled to a memory. The memory stores program instructions. When the program instructions stored in the memory are executed by the processor, the communication method in any possible design of any one of the foregoing aspects is implemented.

According to an eighteenth aspect, an embodiment of this application provides a communication system. The communication system includes the first access network device in any one of the foregoing aspects and the second access network device in any one of the foregoing aspects.

For technical effects brought by any design manner of the second to the eighteenth aspects, refer to the technical effects brought by different design manners of the first aspect. Details are not described herein again.

DESCRIPTION OF EMBODIMENTS

In the specification and accompanying drawings of this application, the terms "first", "second", and the like are intended to distinguish between different objects or distinguish between different processing of a same object, but do not describe a particular order of the objects. In addition, the terms "including", "having", or any other variant thereof in descriptions of this application are intended to cover non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that, in the embodiments of this application, the word such as "example" or "for example" is used to represent giving an example, an illustration, or a description. Any embodiment or design scheme described as an "example" or with "for example" in the embodiments of this application should not be explained as being more preferred or having more advantages than another embodiment or design scheme. Exactly, use of the word such as "example" or "for example" is intended to present a relative concept in a specific manner.

To make the embodiments of this application clearer, some terms and processing procedures in the embodiments of this application are first briefly described.

Figure 1:
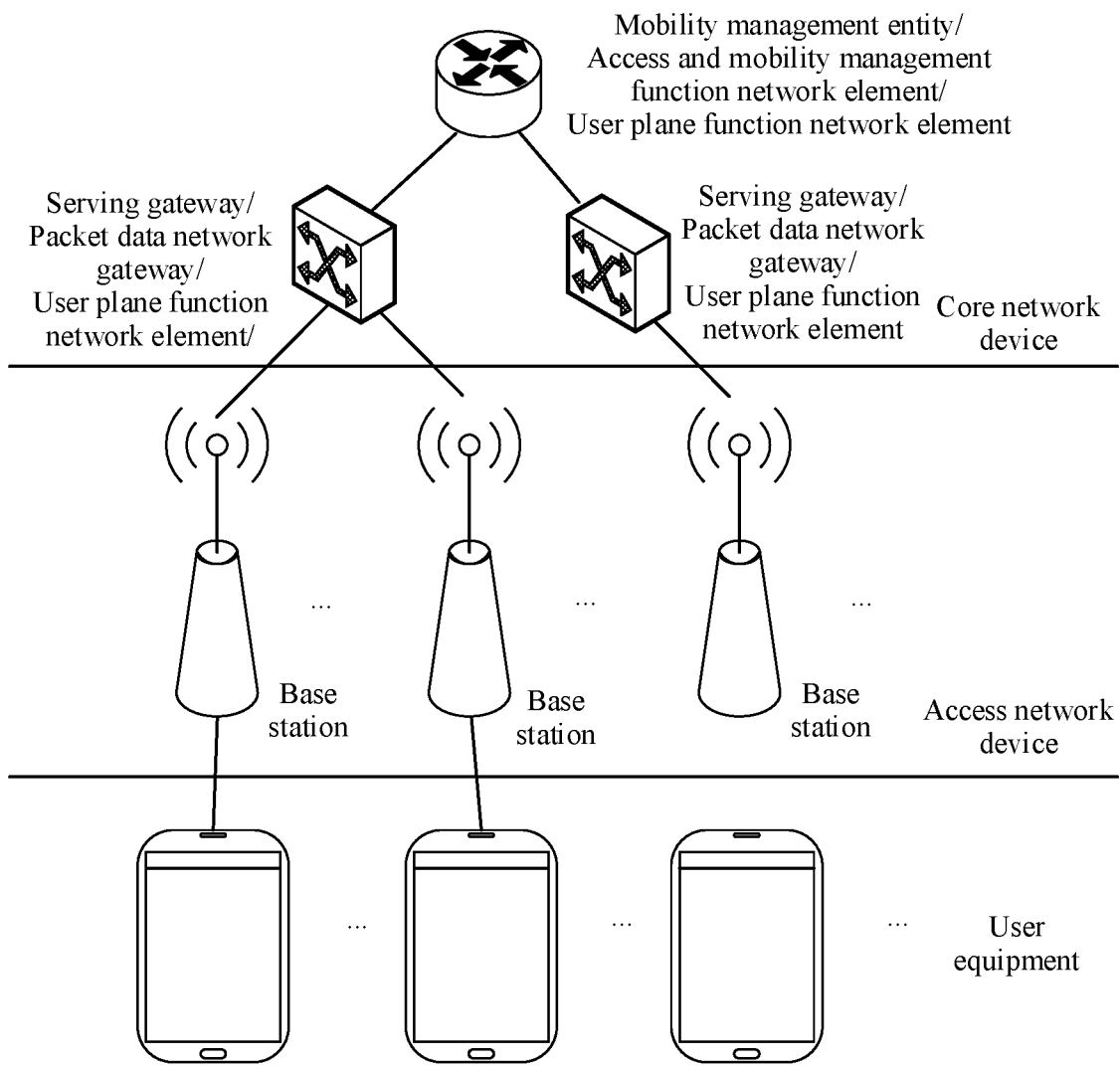
FIG. 1 is a schematic diagram of a system architecture of a communication system provided in a related technology.

A communication system shown in FIG. 1 is used as an example. The communication system shown in FIG. 1 includes a core network (CN) device, an access network (AN) device, and a user equipment (UE). The access network device may alternatively be a radio access network (RAN) device. The access network device may include one or more base stations, as shown in FIG. 1.

Using a long term evolution (LTE) system as an example, the core network device may include one or more mobility management entities (mobility management entity, MME) (only one is shown in FIG. 1), and one or more serving gateways (SGWs) or one or more packet data network gateways (PGWs) connected to the MME. For example, the MME may be configured to manage bearer establishment and configuration of the UE between the base station and the SGW, and trigger paging of the UE in an idle state when downlink data arrives at the core network device (for example, the SGW). Both the SGW and the PGW are configured to route and forward data, and perform quality of service (QoS) control on a user plane.

Using a new radio (NR) system as an example, the core network device may include an access and mobility management function (AMF) network element and a user plane function (UPF) network element. The AMF network element is configured to manage bearer establishment and configuration of the UE between the base station and the UPF network element, and trigger paging of the UE in an idle state when downlink data arrives at the core network device (for example, the UPF network element). The UPF network element is configured to route and forward data, and perform QoS control on a user plane.

1. Air Interface Connection and RAN-CN Connection

To implement communication between UE and a network device, an air interface connection and a RAN-CN connection need to be established.

The air interface connection is a connection between the UE and an access network device (for example, a base station). The air interface connection includes a user plane bearer between the UE and the base station, for example, a data radio bearer (DRB) in an LTE system; and a control plane bearer between the UE and the base station, for example, a signaling radio bearer (SRB) in the LTE system.

The RAN-CN connection is a connection between the access network device (for example, the base station) and a core network device. The RAN-CN connection includes a user plane bearer and a control plane bearer between the base station and the core network device, for example, an Si bearer in the LTE system, and an N2 connection and an N3 connection in a new radio (NR) system.

2. Idle State, Inactive State, and Connected State

The idle state, the inactive state, and the connected state are all used to describe states of UE.

For the UE in the idle state, a user plane bearer and a control plane bearer of an air interface, and a user plane bearer between a RAN and a CN have been released (release). When the UE initiates a call or service request, the UE needs to first establish a control plane bearer of the air interface, and then establish a user plane bearer between the RAN and the CN and a user plane bearer of the air interface.

For the UE in the inactive state, a user plane bearer of an air interface has been suspended (suspend), a user plane bearer and a control plane bearer between a RAN and a CN are still maintained, but a core network device is anchored to one access network device (where the access network device is referred to as an anchor access network device). The UE stores an access stratum context and supports cell reselection. When the UE initiates a call or service request, the user plane bearer of the air interface needs to be activated, and the existing user plane bearer and the existing control plane bearer between the RAN and the CN are reused.

For the UE in the connected state, a control plane bearer of an air interface has been established, and default user plane bearers (including a user plane bearer of the air interface and a user plane bearer between a RAN and a CN) have been established. If the default user plane bearers cannot satisfy a quality of service (QoS) requirement of a service, dedicated user plane bearers (including a user plane bearer of the air interface and a user plane bearer between the RAN and the CN) are established.

3. Serving Access Network Device and Anchor Access Network Device

Figure 2:
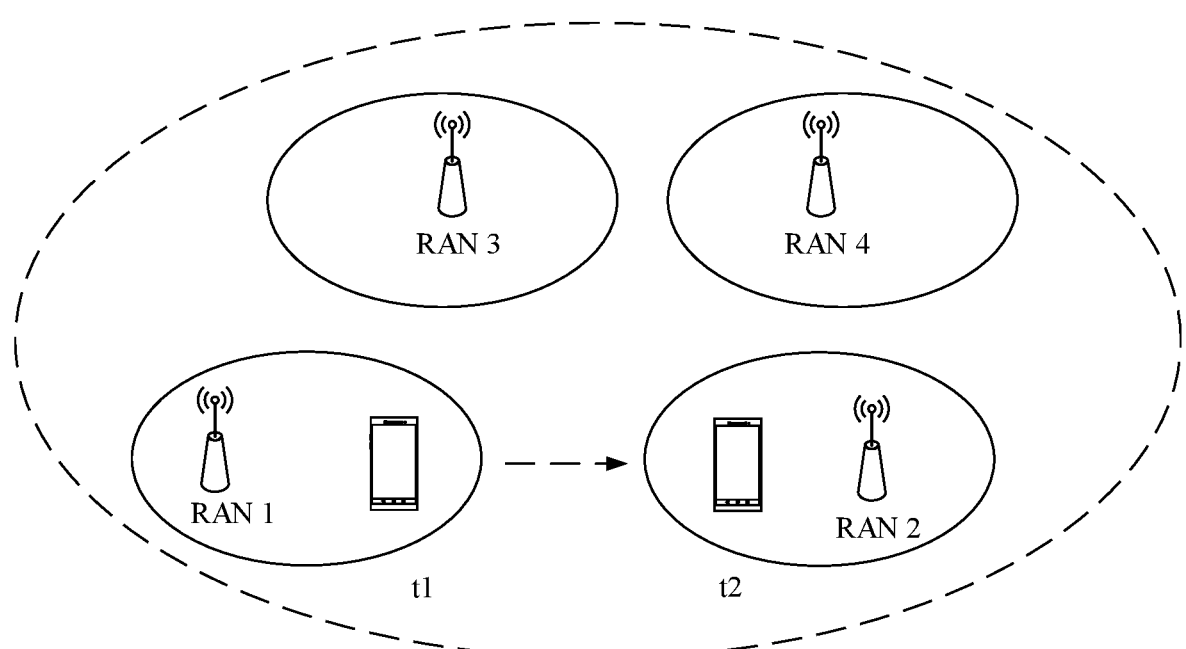
FIG. 2 is a schematic diagram of a location of a radio access network-based notification area provided in a related technology.

To reduce air interface signaling of UE and reduce power overheads of the UE, a network side defines a radio access network-based notification area (RAN-based notification area, RNA). One RNA may include coverage areas of one or more access network devices; or one RNA may include one or more cells, that is, one RNA may be a set of cells. Refer to FIG. 2. In FIG. 2, a dotted-line elliptical area represents an RNA, and a solid-line elliptical area represents a coverage area of an access network device. The access network device in the RNA may include a serving access network device, an anchor access network device, and another access network device.

The serving access network device is an access network device that UE in an inactive state reselects or an access network device to which the UE moves within the RNA to newly access. Any access network device may be used as a serving access network device of one or more UEs, and a serving access network device of same UE may be changed. The serving access network device of the UE may be understood as an access network device newly accessed by the UE (namely, a new access network device or a target access network device). In a communication method in the embodiments of this application, a first access network device is a serving access network device.

The anchor access network device is an access network device of the UE that switches from the connected state to the inactive state, or an access network device that stores an access stratum context of the UE. The anchor access network device of the UE may be understood as an access network device (namely, an old access network device or a source access network device) that the UE accesses last time before the UE is handed over to the new access network device. In the communication method in the embodiments of this application, a second access network device is an access network device that sends an RRC connection release message to UE, and the second access network device includes an anchor access network device. The anchor access network device and the serving access network device may be the same or may be different. In the embodiments of this application, the anchor access network device is different from the serving access network device, that is, the first access network device is different from the second access network device.

The another access network device is an access network device other than the serving access network device and the anchor access network device.

For example, refer to FIG. 2. At a moment t1, UE is within coverage of a RAN 1, and switches from a connected state to an inactive state. At a moment t2, the UE moves to coverage of a RAN 2, and a moving track of the UE is shown in FIG. 2 by using a dashed arrow. In this case, it may be considered that when the UE is within the coverage of the RAN 2, for the UE, the RAN 1 is an anchor access network device of the UE, and the RAN 2 is a serving access network device of the UE. Access network devices, such as a RAN 3 and a RAN 4, in an RNA other than the anchor access network device and the serving access network device of the UE are other access network devices for the UE.

The anchor access network device stores the access stratum context of the UE. The access stratum context of the UE may include the following information: an inactive radio network temporary identifier (I-RNTI), a next hop chaining count (NCC), a currently used base station key, a radio resource control (RRC) integrity protection key, a cell radio network temporary identifier (C-RNTI), a cell identifier, a physical cell identifier (PCI), a radio bearer configuration, and cell group configuration information. The I-RNTI is a unique identifier of the UE in one RNA. The NCC and the base station key are in a one-to-one correspondence, and the NCC can identify the base station key. Both the cell identifier and the PCI are identifiers of a cell that the UE recently accesses, and the C-RNTI is an identifier allocated by the first access network device (namely, the serving access network device) to the UE when the UE is in the cell that the UE recently accesses.

Optionally, the access stratum context of the UE may further include one or more of the following information: a connection identifier allocated by an AMF to the UE, a transport layer address of the AMF, a security capability of the UE, a protocol data unit (PDU) session list, and a maximum bit rate of the UE.

The communication method in the embodiments of this application is mainly for UE in an inactive state. First, a configuration process of the UE in the inactive state is described.

An access network device determines that the UE in a connected state has no data transmission, and sends an RRC connection release message to the UE, to instruct the UE to enter the inactive state. Correspondingly, after receiving the RRC connection release message from the access network device, the UE enters the inactive state. The RRC connection release message includes suspending configuration information such as a next hop chaining count (NCC), an inactive radio network temporary identifier (I-RNTI), and a paging periodicity. Based on the suspending configuration information, the UE may perform the following processing steps: resetting medium access control (MAC); releasing a MAC parameter configured by default; re-establishing a radio link control (RLC) entity of a signaling radio bearer (SRB) 1; suspending all data radio bearer (DRB) services on a packet data convergence protocol (PDCP) layer; transmitting, on a radio resource control (RRC) layer, an RRC connection suspension indication to an upper layer (for example, a non-access stratum); storing configuration information in an access stratum context of the UE, where the configuration information includes: the suspending configuration information, a current base station key, an RRC integrity protection key, an internet protocol (IP) header compression status, a C-RNTI used in a source primary cell (primary cell, PCell), a cell identifier and a physical cell identifier of the source PCell, and another parameter; and suspending all SRBs and DRBs except an SRB 0. In this way, the UE enters the inactive state. Then, the UE may perform cell reselection.

For the UE in the inactive state, if the received RRC connection release message still indicates the UE to be in the inactive state, the UE needs to update the access stratum context of the UE. For example, an originally stored base station key is replaced with a current base station key, an originally stored radio resource control (RRC) integrity protection key is replaced with a current radio RRC integrity protection key, an originally stored cell radio network temporary identifier (C-RNTI) is replaced with a C-RNTI in the current RRC connection release message, an originally stored cell identifier is replaced with a cell identifier in the current RRC connection release message, an originally stored physical cell identifier (PCI) is replaced with a PCI in the current RRC connection release message, and an originally stored suspending configuration parameter is replaced with a current suspending configuration parameter.

Third, two processing processes that may need to be performed by the UE in the inactive state are described:

In a first manner, the UE in the inactive state triggers a radio access network-based notification area update (RAU) process, so that the access network device determines that the UE is still within a specific RNA range and can send and receive information, for example, receive a paging message.

For example, when the UE in the inactive state moves to a new radio access network-based notification area (RNA), the UE triggers an RAU process; or the UE periodically triggers an RAU process, so that the access network device can determine an RNA in which the UE is located, to help the access network device determine a paging range of the UE. In this case, a cause value (Cause) carried in an RRC connection resume request message sent by the UE to the access network device is RNA update.

The RAU process includes two cases. In a first case, a second access network device (namely, an anchor access network device) is not changed, to be specific, the access stratum context of the UE does not need to be migrated from the second access network device (namely, the anchor access network device) to a first access network device (namely, a serving access network device). In a second case, a second access network device (namely, an anchor access network device) is changed, to be specific, the access stratum context of the UE needs to be migrated from the second access network device (namely, the anchor access network device) to a first access network device (namely, a serving access network device). The following describes the two cases of the RAU process:

Scenario 1: A case of "an access stratum context of UE is not migrated" is described by using an example of "an RNA in which the UE is located remains unchanged".

Figure 3:
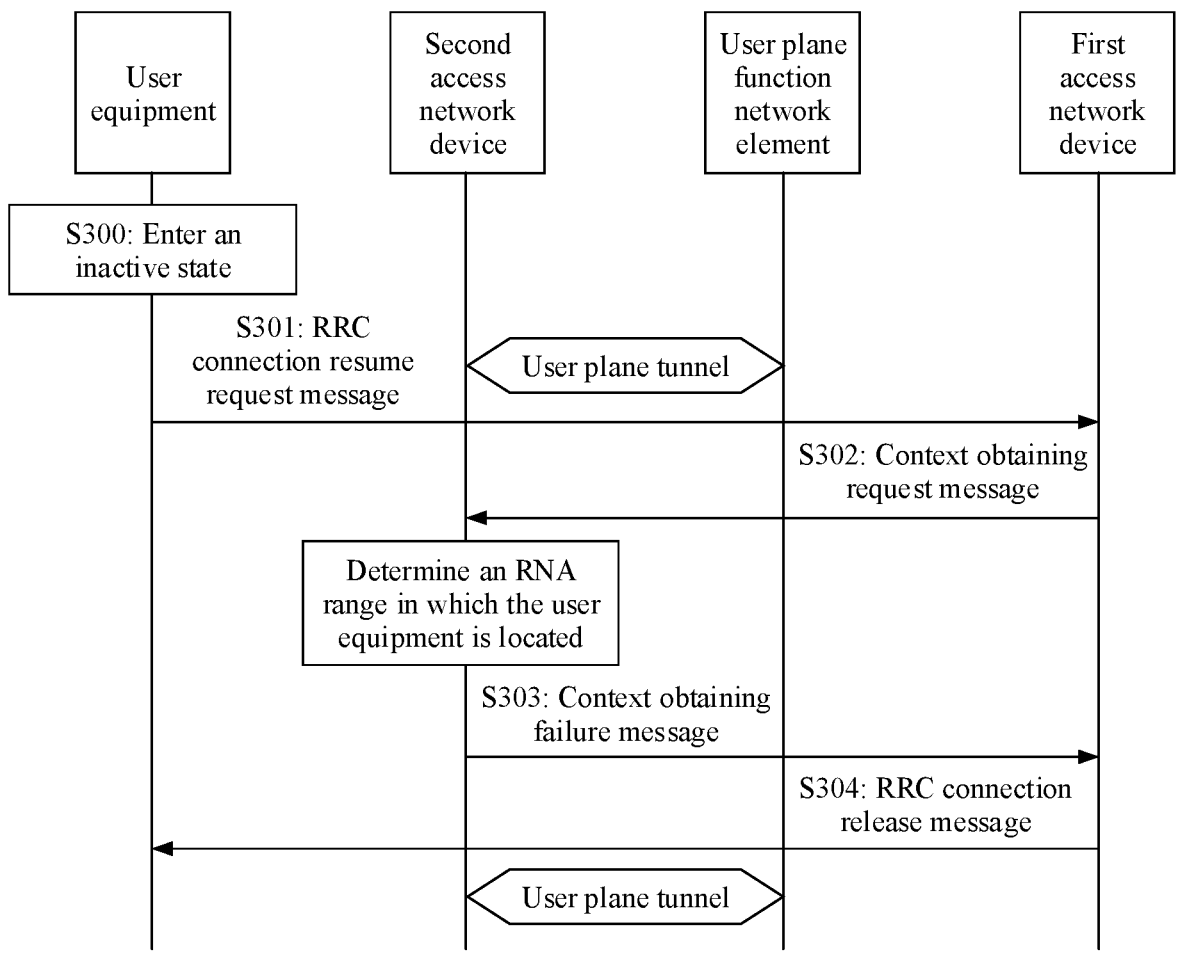
FIG. 3 is a method flowchart of a communication method provided in a related technology.

Refer to FIG. 3. A specific implementation process may include the following steps.

S300: The UE enters an inactive state.

For example, after receiving an RRC connection release message from a second access network device, the UE enters the inactive state. The RRC connection release message is used to indicate the UE to enter the inactive state. In this case, a cell in which the UE is located may be denoted as a cell A (Cell A).

S301: The UE sends an RRC connection resume request message to a first access network device. Correspondingly, the first access network device receives the RRC connection resume request message from the UE.

A cell in which the UE is located when the UE sends the RRC connection resume request message is denoted as a cell B (Cell B).

The RRC connection resume request message carries a first user equipment identifier, identity authentication information, and a cause value. For example, the first user equipment identifier is an I-RNTI, and is an identifier allocated by the second access network device to the UE. The identity authentication information is used by the second access network device to perform authentication on whether an identity of the UE is authorized. For example, the identity authentication information may be specifically a short message authentication code for integrity (MAC-I). The identity authentication information may be authentication information generated by the UE based on an RRC integrity protection key, a cell identifier of a source cell (the cell A), a C-RNTI allocated by the second access network device to the UE when the UE is located in the source cell, and a cell identifier of a target cell (the cell B). The cause value is RNA update (Cause=RNA update). The RRC connection resume request message may include an NCC.

S302: The first access network device sends a context obtaining request message to the second access network device. Correspondingly, the second access network device receives the context obtaining request message from the serving access network device.

The second access network device is an access network device determined by the first access network device based on the I-RNTI in the RRC connection resume request message.

The context obtaining request message is used by the first access network device to request the access stratum context of the UE from the second access network device. The context obtaining request message may include the first user equipment identifier, the identity authentication information of the UE, the cell identifier of the target cell accessed by the UE, the cause value, a second user equipment identifier, and a third user equipment identifier. The cell identifier of the target cell accessed by the UE is used by the second access network device to derive a new base station key, and the cell identifier of the target cell accessed by the UE is further used by the second access network device to update the access stratum context of the UE. Both the second user equipment identifier and the cause value are used by the second access network device to update the access stratum context of the UE. For example, the second user equipment identifier is a C-RNTI allocated by the first access network device to the UE. The third user equipment identifier is an identifier allocated by the first access network device to the UE. For example, the third user equipment identifier is an Xn application protocol (AP) identifier (ID). The Xn-AP ID is used by the first access network device to identify the UE on an Xn interface, so that the first access network device determines, based on the identifier, the UE to which the first access network device is to send data.

The second access network device determines, based on the first user equipment identifier (the I-RNTI) in the context obtaining request message, an RNA range in which the UE is located. The second access network device performs, based on the identity authentication information (the MAC-I) in the context obtaining request message, authentication on whether the identity of the UE is authorized. If the second access network device determines that the RNA range in which the UE is located is not changed and the identity is authenticated, the second access network device generates a new key and an RRC connection release message, and the second access network device performs S303.

S303: The second access network device sends a context obtaining failure message to the first access network device. Correspondingly, the first access network device receives the context obtaining failure message from the second access network device.

The context obtaining failure message includes the RRC connection release message and the Xn-AP ID. The RRC connection release message is a message that uses the new key for security protection. The Xn-AP ID is used to indicate the UE to which the first access network device sends the RRC connection release message.

S304: The first access network device sends the RRC connection release message to the UE. Correspondingly, the UE receives the RRC connection release message from the first access network device.

The RRC connection release message indicates the UE to remain in the inactive state or enter an idle state. In this embodiment, the RRC connection release message indicates the UE to remain in the inactive state.

In this way, in the foregoing processing process, the access stratum context of the UE is still stored in the second access network device and is not migrated to the first access network device, and a user plane tunnel between a core network device and the second access network device is also not changed. However, the access stratum context of the UE stored in the second access network device is updated. For example, the C-RNTI of the source cell, the cell identifier of the source cell, and a PCI of the source cell that are in the access stratum context of the UE are all updated.

Scenario 2: A case of "an access stratum context of UE is migrated" is described by using an example of "an RNA in which the UE is located is changed".

Figure 4:
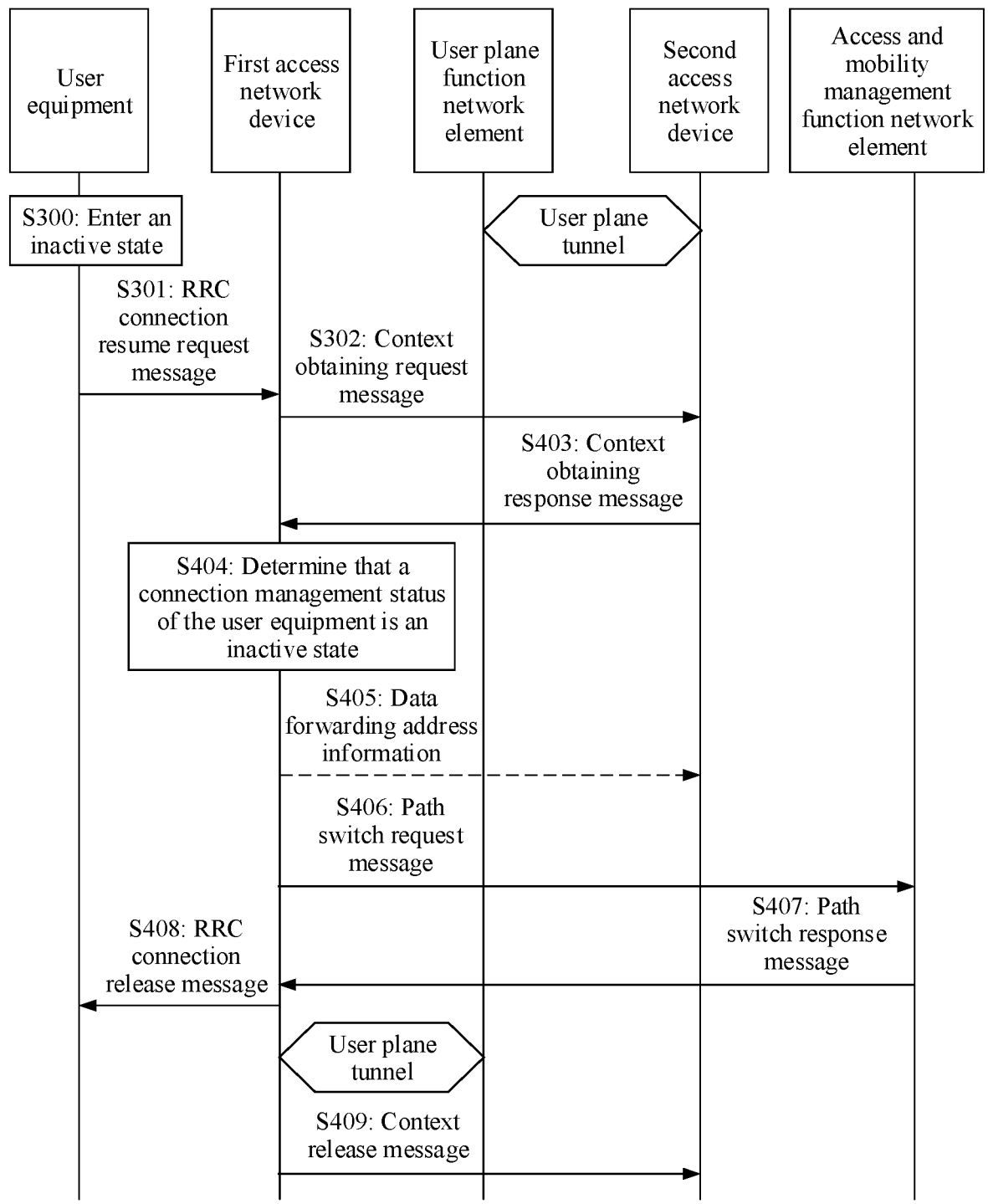
FIG. 4 is a method flowchart of another communication method provided in a related technology.

Refer to FIG. 4. A specific implementation process may include S300, S301, S302, and S403 to S409.

Based on S302, after obtaining the context obtaining request message, if the second access network device determines that an RNA range in which the UE is located is changed and the identity is authenticated, the second access network device performs S403 after finding information about the access stratum context of the UE.

S403: The second access network device sends a context obtaining response message to the first access network device. Correspondingly, the first access network device receives the context obtaining response message from the second access network device.

The context obtaining response message includes a new key and the access stratum context of the UE. For example, the access stratum context of the UE includes a connection identifier allocated by an AMF to the UE, a transport layer address of the AMF, a security capability of the UE, a PDU session list, and a maximum bit rate of the UE.

S404: The first access network device determines a connection management status of the UE.

For example, for the UE that moves to a new RNA, the first access network device determines that the connection management status of the UE is the inactive state.

(Optional) S405: The first access network device sends data forwarding address information to the second access network device. Correspondingly, the second access network device receives the data forwarding address information from the first access network device.

The data forwarding address information is used by the second access network device to transmit buffered downlink data to the first access network device. For example, the data forwarding address information may be a user plane interface. When the second access network device has buffered downlink data, the first access network device may perform S405, so that the first access network device receives the buffered downlink data from the second access network device through the user plane interface.

S406: The first access network device sends a path switch request message to the AMF. Correspondingly, the AMF receives the path switch request message from the first access network device.

The path switch request message includes address information allocated by the first access network device to a session. The path switch request message is used to request the AMF to switch a user plane tunnel.

Based on the path switch request message, the AMF sends a request message to a UPF, to request the UPF to allocate session address information to the session. After obtaining the session address information, the AMF performs S407.

S407: The AMF sends a path switch response message to the first access network device. Correspondingly, the first access network device receives the path switch response message from the AMF. In this way, the user plane tunnel between the second access network device and the UPF is switched to a user plane tunnel between the first access network device and the UPF.

S408: The first access network device sends an RRC connection release message to the UE.

S409: The first access network device sends a context release message to the second access network device. Correspondingly, the second access network device receives the context release message from the first access network device.

The context release message is used by the second access network device to release the access stratum context of the UE.

In this way, the access stratum context of the UE can be migrated from the second access network device to the first access network device, and the user plane tunnel between the access network device and the UPF is also switched, to be specific, the user plane tunnel between the second access network device and the UPF is switched to the user plane tunnel between the first access network device and the UPF.

It should be noted that, if the access network device does not receive an RRC connection resume request within a specific time period, the access network device deletes the access stratum context of the UE, to save storage resources of the access network device, ensure that the UE can always receive a paging message, and avoid a phenomenon in which the UE cannot receive the paging message due to power failure.

In a second manner, the UE in the inactive state needs to transmit uplink data or receive a paging message. In this case, the access stratum context of the UE is migrated, to be specific, the access stratum context of the UE is migrated from a second access network device to a first access network device, regardless of whether an RNA range is changed.

Scenario 3: A case of "context information of UE is migrated" is described by using an example of "the UE transmits uplink data".

Figure 5:
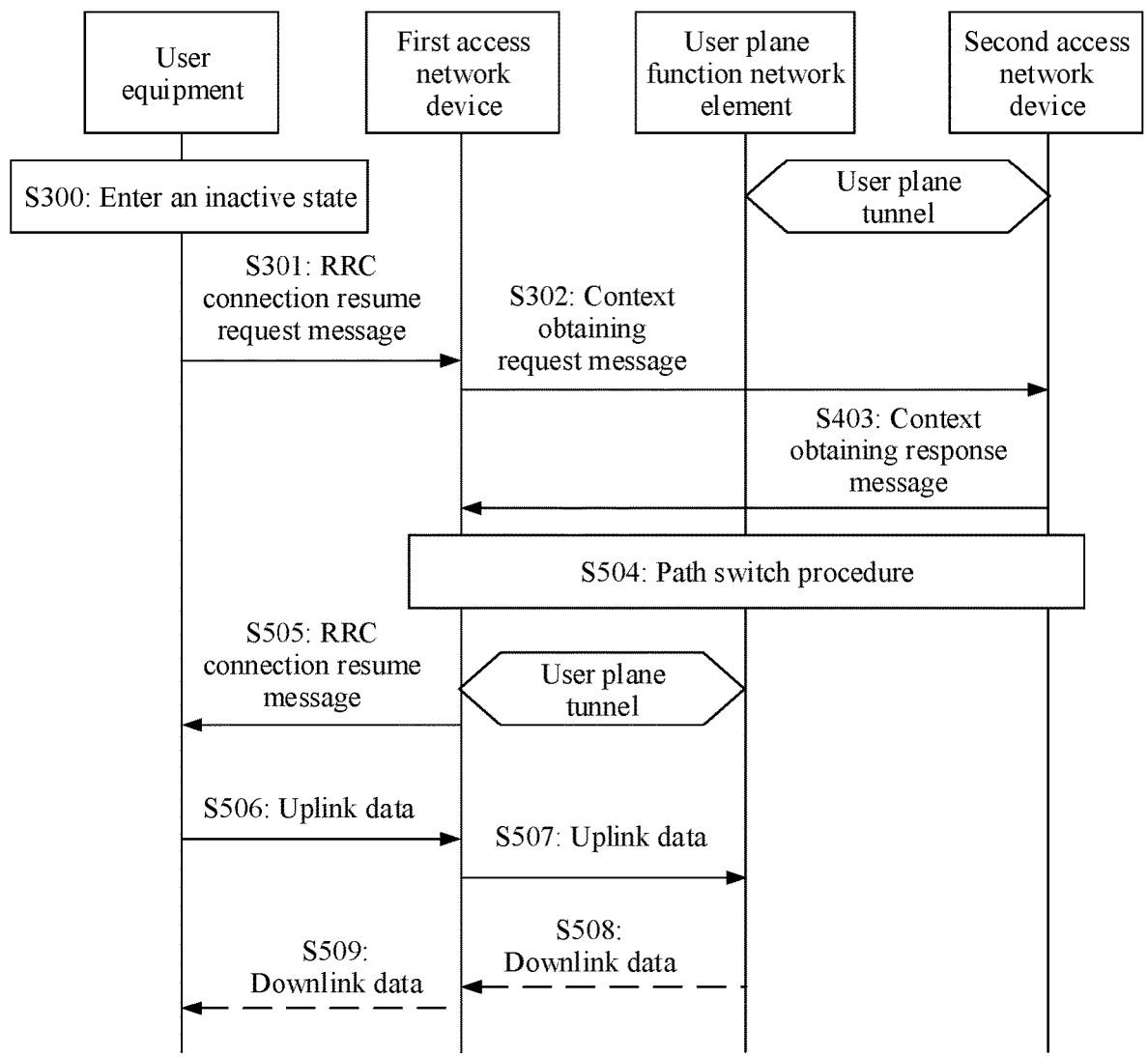
FIG. 5 is a method flowchart of still another communication method provided in a related technology.

Refer to FIG. 5. A specific implementation process may include S300, S301, S302, S403, and S504 to S509.

In S301, the cause value (Cause) in the RRC connection resume request message is sending uplink data (MO-data).

After S302, because the cause value is sending uplink data, the access stratum context of the UE is migrated regardless of whether the RNA range is changed. If the second access network device determines that the identity of the UE is authenticated and finds information about the access stratum context of the UE, the second access network device may perform S403. After obtaining the access stratum context of the UE, the first access network device performs S504.

S504: The first access network device triggers a path switch procedure, to switch a user plane tunnel between an access network device and a core network device from a user plane tunnel between the second access network device and the core network device to a user plane tunnel between the first access network device and the core network device.

S505: The first access network device sends an RRC connection resume message to the UE. Correspondingly, the UE receives the RRC connection resume message from the first access network device.

The RRC connection resume message is used to indicate the UE to enter a connected state.

S506: The UE sends the uplink data to the first access network device. Correspondingly, the first access network device receives the uplink data from the UE.

S507: The first access network device sends the uplink data to a UPF. Correspondingly, the UPF receives the uplink data from the first access network device, to implement uplink data transmission.

(Optional) S508: The UPF sends downlink data to the first access network device, and correspondingly, the first access network device receives the downlink data from the UPF.

S509: The first access network device sends the downlink data to the UE, and correspondingly, the UE receives the downlink data from the first access network device, to implement downlink data transmission.

In this way, when the UE needs to transmit the uplink data, the UE needs to first perform an access stratum context migration process and a user plane tunnel migration process, to be specific, migrates the access stratum context of the UE from the second access network device to the first access network device, and the user plane tunnel migration process is that the user plane tunnel between the second access network device and the UPF is switched to the user plane tunnel between the first access network device and the UPF. Because the access stratum context migration process and the user plane tunnel migration process need to be performed, a data transmission delay is long, signaling overheads are high, and power consumption of the UE is increased.

In addition, for UE that irregularly sends a data packet having a relatively small data amount, the UE may move back and forth between the second access network device and the first access network device. In this case, the access stratum context and the user plane tunnel need to be frequently migrated, further increasing the signaling overheads.

Similarly, after receiving a paging message, the UE in the inactive state triggers an RRC connection resume procedure, so that the UE enters the connected state, and then performs downlink data transmission. When the first access network device and the second access network device are different access network devices, the access network context migration process and the user plane tunnel migration process still need to be performed. Similarly, problems such as a long data transmission delay and high signaling overheads exist.

In view of this, embodiments of this application provide a communication method. The communication method in the embodiments of this application is applicable to various communication systems in which an inactive state of UE is introduced, for example, a 5G communication system, a future evolved system, a plurality of communication convergence systems in which an inactive state of UE is introduced based on an existing communication system.

Figure 6:
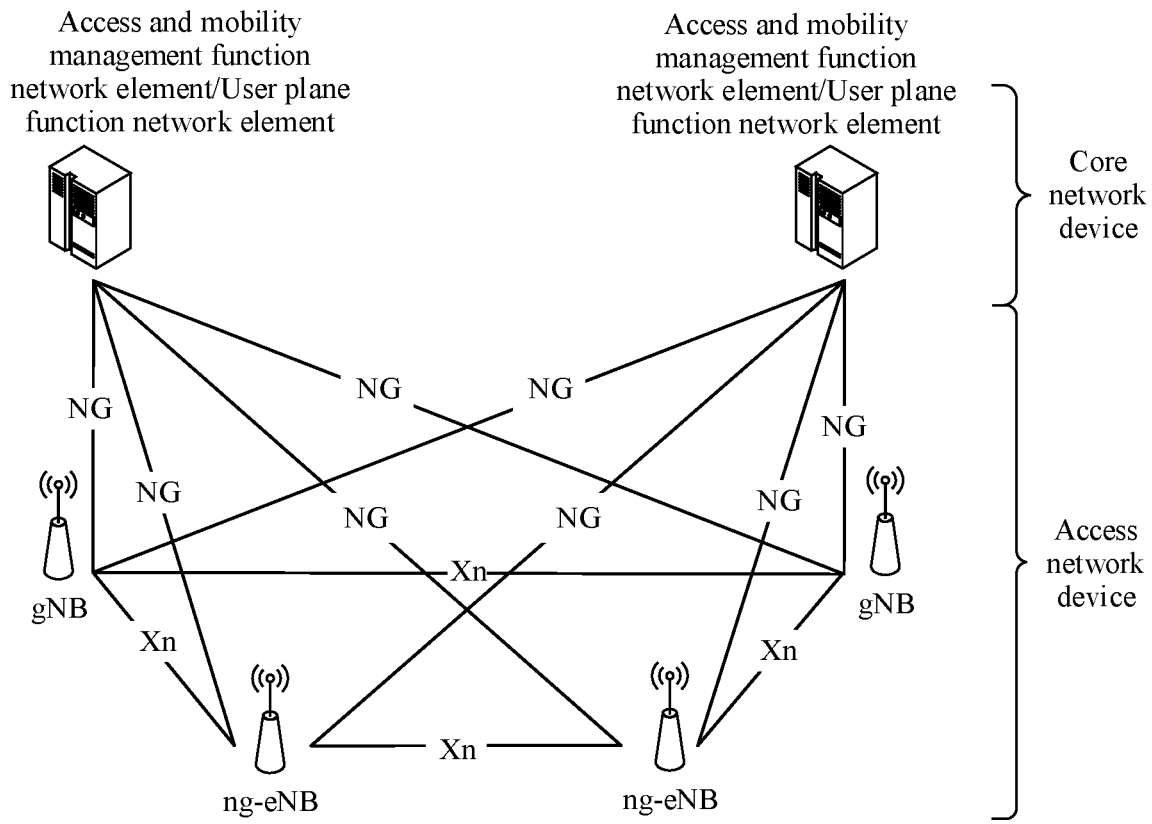
FIG. 6 is a schematic diagram of a system architecture of a communication system according to an embodiment of this application.

A 5G communication system is used as an example. FIG. 6 shows a system architecture of a 5G communication system. The 5G communication system includes a core network device, an access network device, and user equipment (not shown in FIG. 6).

The core network device is an apparatus deployed in a core network to serve the UE. In systems using different radio access technologies, core network devices having similar wireless communication functions may have different names. For example, when the communication method in the embodiments of this application is applied to a 5G system, the core network device may be an AMF or a UPF. For ease of description only, in the embodiments of this application, the foregoing apparatuses that can serve the UE are collectively referred to as core network devices. Interfaces between core network devices and between the core network device and the access network device are all NG interfaces.

The access network device may alternatively be a radio access network (RAN) device, and is an apparatus deployed in a radio access network to provide a wireless communication function. Optionally, the access network device in the embodiments of this application includes, for example, but is not limited to, a macro base station, a micro base station (also referred to as a small cell), a relay station, a transmission reception point (TRP), a next generation network node (g Node B, gNB), and an evolved NodeB connected to a next-generation core network (ng evolved Node B, ng-eNB) in various forms, and may further include an access network device in a non-3rd generation partnership project (3GPP) system such as a wireless local area network (WLAN) access device. FIG. 6 shows access network devices in the 5G communication system by using only gNBs and ng-eNBs as an example. Interfaces between the gNBs, between the gNB and the ng-eNB, and between the ng-eNBs are Xn interfaces.

The Xn interface includes a control plane (Xn-C) interface and a user plane (Xn-U) interface.

Figure 7:
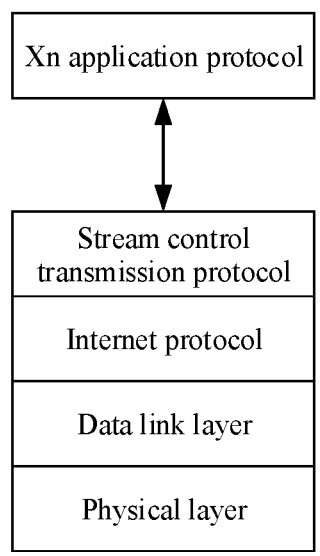
FIG. 7 is a schematic diagram of an interface protocol stack according to an embodiment of this application.

The Xn-C interface is mainly configured to transmit a control plane information element. An interface protocol stack of the Xn-C interface is an interface protocol stack based on the Xn application protocol (Xn-AP) and the stream control transmission protocol (SCTP). As shown in FIG. 7, the interface protocol stack of the Xn-C interface includes a physical layer, a data link layer, a network layer, a transport layer, and an application layer. A protocol used at the network layer is the internet protocol (IP), a protocol used at the transport layer is the stream control transmission protocol (SCTP), and a protocol used at the application layer is the Xn application protocol (Xn-AP).

Figure 8:
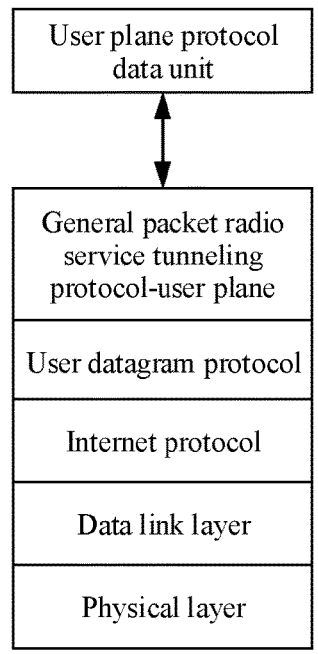
FIG. 8 is a schematic diagram of another interface protocol stack according to an embodiment of this application.

The Xn-U interface is mainly configured to transmit user plane data. An interface protocol stack of the Xn-U interface is an interface protocol stack based on the general packet radio service tunneling protocol-user plane (GPRS tunnel protocol-user plane, GTP-U). As shown in FIG. 8, the interface protocol stack of the Xn-U interface includes a physical layer, a data link layer, a network layer, a transport layer, and an application layer. A protocol used at the network layer is the internet protocol (IP), protocols used at the transport layer are the user datagram protocol (UDP) and the general packet radio service tunneling protocol-user plane (GPRS tunnel protocol-user plane, GTP-U), and a user plane protocol data unit (PDU) is transmitted at the application layer.

The user equipment is mainly configured to receive or send data. Optionally, the UE in the embodiments of this application may include, for example, but is not limited to, various handheld devices, vehicle-mounted devices, wearable devices, or computing devices that have a wireless communication function, or other processing devices connected to a wireless modem. The UE may further include a subscriber unit, a cellular phone, a smartphone (smart phone), a wireless data card, a personal digital assistant (PDA) computer, a tablet computer, a handheld device, a laptop computer, and a machine type communication (MTC) terminal.

The communication system and the service scenario that are described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

The following describes in detail a communication method provided in the embodiments of this application.

It should be noted that names of messages between network elements, names of parameters in messages, or the like in the following embodiments of this application are merely examples, and there may be other names in specific implementation. This is uniformly described herein. Details are not described in the following again.

Figure 9:
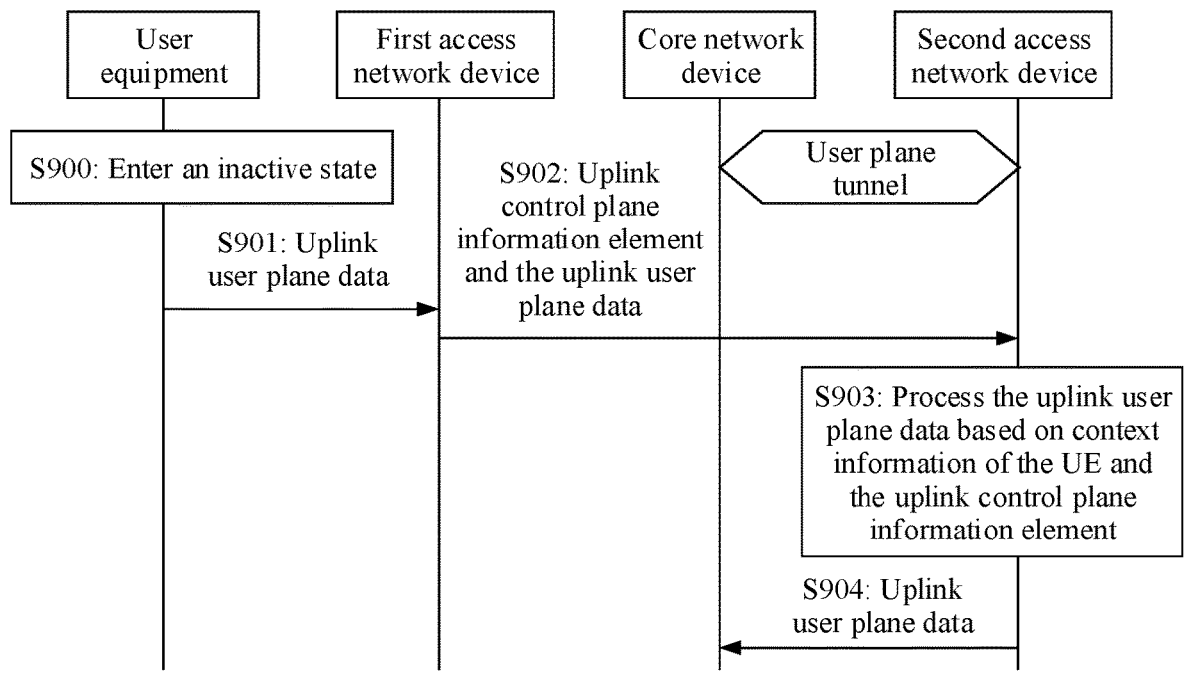
FIG. 9 is a method flowchart of a communication method according to an embodiment of this application.

An embodiment of this application provides a communication method. The communication method is applied to a process of forwarding data of UE in an inactive state. Refer to FIG. 9. The communication method includes the following steps.

S900: UE enters an inactive state.

For example, after receiving an RRC connection release message from an access network device (denoted as a second access network device), the UE enters the inactive state. The RRC connection release message is used to indicate the UE to enter the inactive state. A cell in which the UE is located when the UE receives the RRC connection release message is referred to as a source cell.

Both the UE and the second access network device store an access stratum context of the UE. A user plane bearer between the UE and the second access network device (namely, a user plane bearer of an air interface) has been suspended, and a user plane bearer and a control plane bearer between the second access network device and a core network device are still maintained.

When the UE needs to transmit uplink user plane data, the UE performs S901.

S901: The UE sends the uplink user plane data to a first access network device. Correspondingly, the first access network device receives the uplink user plane data from the UE.

The first access network device is an access network device that the UE in the inactive state reselects or an access network device to which the UE moves within an RNA to newly access. A cell in which the UE is located when the UE accesses the first access network device is referred to as a target cell.

The uplink user plane data may be data obtained through user plane key processing. For example, a user plane key may be a user plane encryption key, or may be a user plane integrity protection key. The UE may perform encryption processing on the uplink user plane data by using the user plane encryption key, to prevent the user plane data from being cracked during transmission. Alternatively, the UE may perform integrity protection processing on the uplink user plane data by using the user plane integrity protection key, to prevent the user plane data from being tampered with during transmission. Alternatively, the UE may perform protection processing on the uplink user plane data by using the user plane encryption key and the user plane integrity protection key.

A specific process in which the UE generates the user plane key is as follows:

Step 1: The UE derives a new base station key based on a target physical cell identifier, a target cell frequency, and an NCC. The new base station key may be denoted as $K_{NG-RAN}^*$. The target physical cell identifier is a PCI of a cell in which the UE is currently located. The target cell frequency is a carrier frequency corresponding to the cell in which the UE is currently located. The NCC and a base station key may be in a one-to-one correspondence, the base station key may be denoted as $K_{gNG}$, and the NCC and a next hop (NH) key may also be in a one-to-one correspondence. A process in which the UE derives the new base station key based on $K_{gNG}$ may be referred to as a horizontal key calculation (horizontal key derivation) process. For a specific process, refer to a conventional technology, and details are not described herein. A process in which the UE derives the new base station key based on the NH may be referred to as a vertical key calculation (vertical key derivation) process. For a specific process, refer to a conventional technology, and details are not described herein.

Step 2: The UE derives the user plane key based on the new base station key. The user plane key may be the user plane encryption key. The user plane encryption key is used to encrypt user plane data to form a ciphertext, to prevent the user plane data from being cracked during transmission. The user plane key may alternatively be the user plane integrity protection key. The user plane integrity protection key is used to perform integrity protection on the user plane data, to prevent the user plane data from being tampered with during transmission. For a process in which the UE derives the user plane key based on the new base station key, refer to a conventional technology, and details are not described herein.

In addition, the UE can further derive an RRC signaling key based on the new base station key. The RRC signaling key includes an RRC encryption key and an RRC integrity protection key, the RRC encryption key is used to perform encryption processing on RRC signaling, and the RRC integrity protection key is used to perform integrity protection processing on the RRC signaling. For a process in which the UE derives the RRC signaling key based on the new base station key, refer to a conventional technology, and details are not described herein.

The uplink user plane data may be one data packet, or may be a plurality of data packets. The uplink user plane data may be transmitted by the UE to the first access network device in a plurality of manners. The following describes transmission manners of the uplink user plane data.

Manner 1: The UE simultaneously sends the uplink user plane data and an RRC connection resume request message to the first access network device.

The RRC connection resume request message includes a first user equipment identifier, identity authentication information of the UE, and a cause value.

The first user equipment identifier is a unique identifier of the UE in an RNA area, and is an identifier allocated by the second access network device to the UE. For example, the first user equipment identifier may be an I-RNTI. The first user equipment identifier is used by the first access network device to determine an anchor base station (namely, the second access network device) of the UE, and is further used to identify the access stratum context stored by the UE in the second access network device.

The identity authentication information of the UE is used by the second access network device to perform authentication on whether an identity of the UE is authorized. For example, the identity authentication information may be specifically a short MAC-I, and the identity authentication information may be identity authentication information generated by the UE based on a stored RRC integrity protection key, a cell identifier of the source cell, a C-RNTI allocated by the second access network device to the UE when the UE is located in the source cell, and a cell identifier of the target cell.

The cause value may be transmitting the uplink user plane data, or may be other information "that can indicate the UE in the inactive state to transmit the uplink user plane data. For example, the cause value is transmitting the uplink user plane data of the UE in the inactive state.

It should be noted that the user plane data obtained through integrity protection processing can reflect the identity information of the UE. If the user plane data is data obtained through integrity protection processing, the RRC connection resume message may not carry the identity authentication information of the UE. If the RRC connection resume message carries the identity authentication information of the UE, integrity protection processing may not be performed on the user plane data.

Manner 2: The UE first sends an RRC connection resume request message to the first access network device. Correspondingly, after receiving the RRC connection resume request message from the UE, the first access network device allocates an uplink resource to the UE. The UE sends the uplink user plane data to the first access network device by using the uplink resource. The uplink resource may be a resource scheduled by the first access network based on a second user equipment identifier (a C-RNTI allocated by the first access network device to the UE), or may be a preconfigured physical uplink shared channel (PUSCH) resource.

Figure 10:
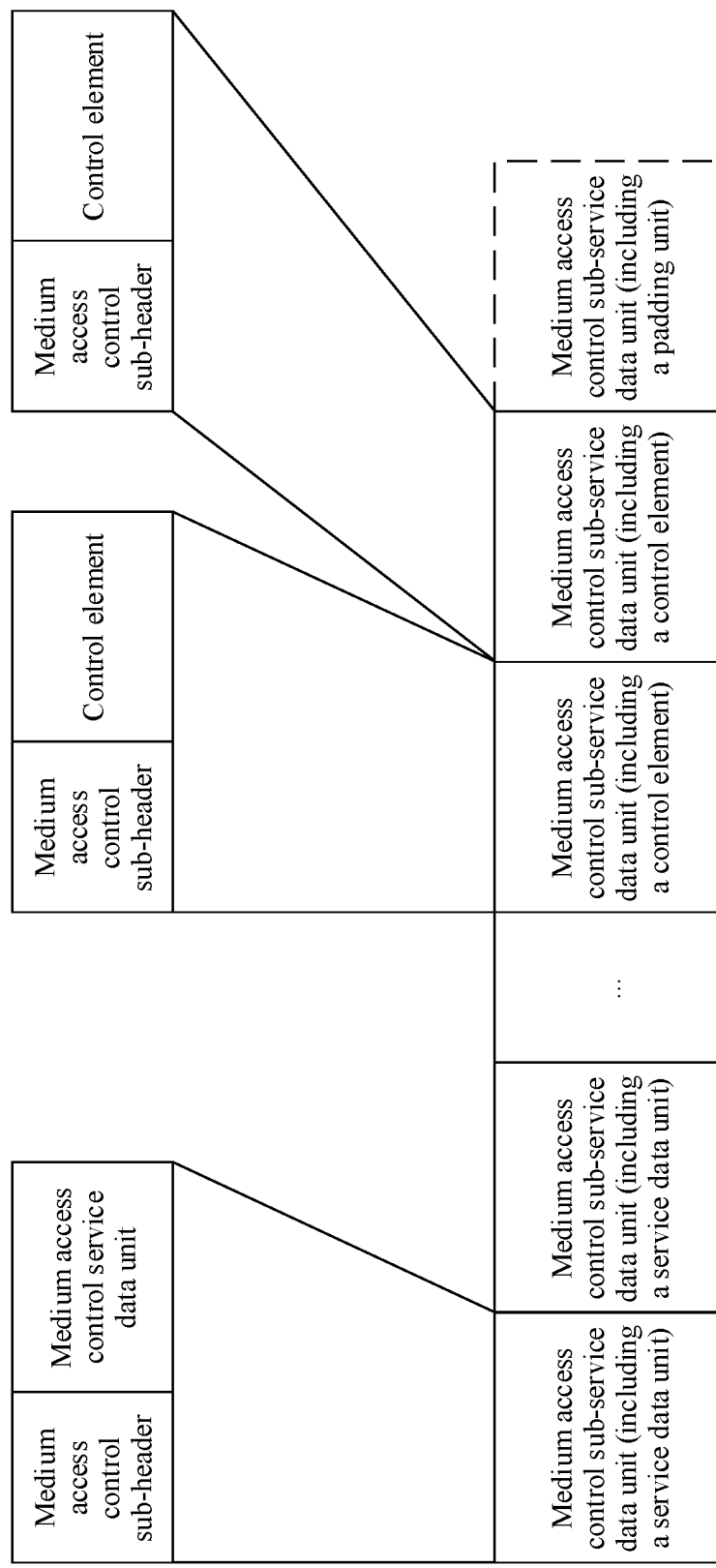
FIG. 10 is a schematic diagram of a structure of an uplink medium access control protocol data unit according to an embodiment of this application.

It should be noted that, when the UE sends the uplink user plane data and the RRC connection resume request message to the first access network device, the uplink user plane data and the RRC connection resume request message may be carried in a same medium access control (MAC) protocol data unit (PDU). Refer to FIG. 10. One uplink MAC PDU includes one or more MAC sub-PDUs. One MAC sub-PDU includes a MAC sub-header and a medium access control (MAC) service data unit (SDU), and the MAC sub-header is used to carry a logical channel identifier (LCH ID) corresponding to the MAC SDU. For example, the MAC SDU is used to carry the uplink user plane data and/or an uplink control plane information element. Alternatively, one MAC sub-PDU includes a MAC sub-header and a medium access control (MAC) control element (CE). For example, the MAC CE is used to carry a buffer status report (BSR). Optionally, one uplink MAC PDU further includes a padding unit. The uplink user plane data and the RRC connection resume request message may be carried in different MAC PDUs.

S902: The first access network device sends the uplink control plane information element and the uplink user plane data to the second access network device. Correspondingly, the second access network device receives the uplink control plane information element and the uplink user plane data from the first access network device.

The first access network device may send the uplink control plane information element and the uplink user plane data to the second access network device through a same interface. Correspondingly, the second access network device may receive the uplink control plane information element and the uplink user plane data from the first access network device through a same interface. Alternatively, the first access network device may send the uplink control plane information element and the uplink user plane data to the second access network device through different interfaces. Correspondingly, the second access network device may also receive the uplink control plane information element and the uplink user plane data from the first access network device through different interfaces.

There may be two forms of the uplink user plane data:

In a first manner, the uplink user plane data is transmitted in a form of a MAC PDU. In this case, after receiving the MAC PDU from the UE, the first access network device does not perform splitting processing, and directly sends the MAC PDU of the UE to the second access network device. Because the MAC PDU carries a logical channel identifier, the first access network device does not need to additionally send the logical channel identifier to the second access network device.

In a second manner, the uplink user plane data is transmitted in a form of a sub-block. The sub-block may include one or more medium access control (MAC) service data units (SDU), or may include one or more radio link control (RLC) SDUs. The MAC SDU may also be referred to as an RLC PDU, and the RLC SDU may also be referred to as a packet data convergence protocol (PDCP) PDU. All MAC SDUs in the sub-block correspond to a same logical channel identifier (LCH ID). All RLC SDUs in the sub-block also correspond to a same logical channel identifier. When the uplink user plane data is carried in a control plane message in the form of the sub-block, the first access network device further needs to send the logical channel identifier corresponding to the sub-block to the second access network device.

Figure 11:
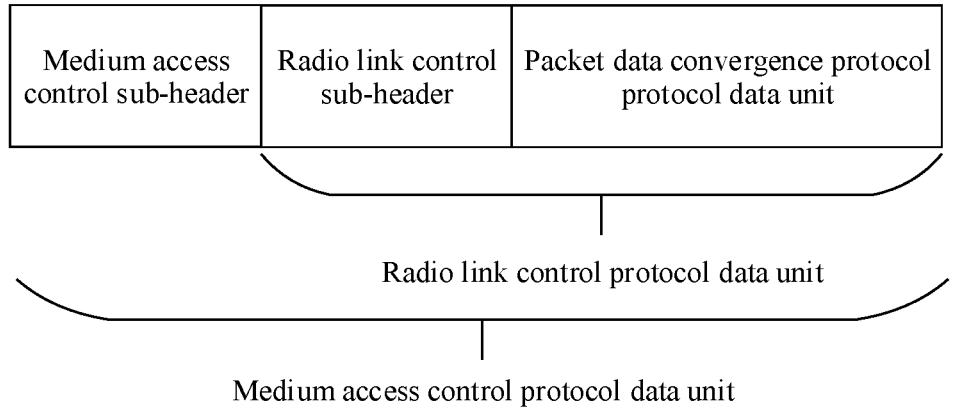
FIG. 11 is a schematic diagram of a structure of a protocol data unit according to an embodiment of this application.

It should be noted that one MAC PDU includes one or more MAC sub-PDUs, and one MAC sub-PDU may include a MAC sub-header and a MAC SDU; or one MAC sub-PDU may include a MAC sub-header and a medium access control (MAC) control element (CE). The MAC sub-header includes a logical channel identifier and a data packet length. The MAC SDU is also referred to as an RLC PDU. One RLC PDU may include an RLC sub-header and an RLC SDU. The RLC SDU is also referred to as a PDCP PDU, and is specifically shown in FIG. 11.

In a first possible design, the uplink control plane information element and the uplink user plane data may be transmitted by the first access network device to the second access network device through a same interface. The following describes in detail the uplink control plane information element transmitted through the same interface and a transmission process through the same interface.

The uplink control plane information element includes one or more of the first user equipment identifier, the cell identifier of the target cell accessed by the UE, the second user equipment identifier allocated by the first access network device to the UE, the identity authentication information of the UE, and a third user equipment identifier.

The first user equipment identifier is used by the first access network device to determine the anchor base station (namely, the second access network device) of the UE, and is further used by the second access network device to determine the access stratum context of the UE. For example, the first user equipment identifier may be the I-RNTI allocated by the second access network device to the UE.

The cell identifier of the target cell accessed by the UE is used by the second access network device to generate new identity authentication information of the user equipment, and is further used by the second access network device to derive anew base station key. The target cell belongs to a coverage area of the first access network device. Herein, the new identity authentication information that is of the user equipment and that is generated based on the cell identifier of the target cell in the current uplink control plane information element is used to check the identity authentication information in the current uplink control plane information element.

The second user equipment identifier is used by the second access network device to perform resource scheduling. For example, the second access network device schedules an uplink resource based on the second user equipment identifier. The second user equipment identifier is further used by the second access network device to generate new identity authentication information of the user equipment. Herein, the new identity authentication information that is of the user equipment and that is generated based on the second user equipment identifier in the current uplink control plane information element is used to check identity authentication information in an uplink control plane information element received next time by the second access network device. For example, the second user equipment identifier may be the C-RNTI allocated by the first access network device to the UE.

The identity authentication information of the UE is used by the second access network device to perform authentication on whether the identity of the UE is authorized. For example, the UE authentication information may be a MAC-I or a short MAC-I.

The third user equipment identifier is used to identify the user equipment. For example, the third user equipment identifier may be an Xn application protocol identifier (Xn-AP ID). It should be noted that, when the second access network device feeds back a message (for example, a context obtaining response message or a context obtaining failure message) to the first access network device after receiving the uplink control plane information element and the uplink user plane data, the feedback message may carry the third user equipment identifier, to indicate the UE for which the feedback message is directed, so that the first access network device forwards a corresponding feedback message to the UE.

It should be noted that, when the uplink user plane data and the uplink control plane information element are transmitted between the first access network device and the second access network device through the same interface, if the uplink user plane data can be transmitted from the first access network device to the second access network device through only one time of forwarding, the uplink control plane information element carries the first user equipment identifier, the cell identifier of the target cell accessed by the UE, the second user equipment identifier allocated by the first access network device to the UE, and the identity authentication information of the UE. Optionally, the uplink control plane information element may further carry the third user equipment identifier.

If the uplink user plane data can be transmitted from the first access network device to the second access network device only after two or more times of forwarding, during the first forwarding process, to be specific, when a part of the uplink user plane data and the uplink control plane information element are transmitted from the first access network device to the second access network device, the uplink control plane information element carries the first user equipment identifier, the cell identifier of the target cell accessed by the UE, the second user equipment identifier allocated by the first access network device to the UE, and the identity authentication information of the UE. Optionally, the uplink control plane information element may further include the third user equipment identifier. During a subsequent forwarding process, to be specific, when the other part of the uplink user plane data (namely, data in the uplink user plane data other than the foregoing part of data) and the uplink control plane information element are transmitted from the first access network device to the second access network device, the uplink control plane information element carries only information used to identify the UE, for example, one or more of the first user equipment identifier, the second user equipment identifier, and the third user equipment identifier.

In addition, when the uplink user plane data and the uplink control plane information element are transmitted between the first access network device and the second access network device through the same interface, if the uplink user plane data is data obtained through integrity protection processing, the uplink control plane information element may not carry the identity authentication information of the UE; or if the uplink user plane data has not been processed through integrity protection processing, the uplink control plane information element carries the identity authentication information of the UE.

Optionally, the uplink control plane information element may further include a cause value, and the cause value is used to indicate the second access network device to receive the uplink user plane data of the UE. For example, the cause value may be transmitting the uplink user plane data, or may be transmitting the uplink user plane data of the UE in the inactive state. In this way, the second access network device may learn of a requirement that "the UE needs to transmit the uplink user plane data", so that the second access network device can determine a state of the UE.

Figure 12:
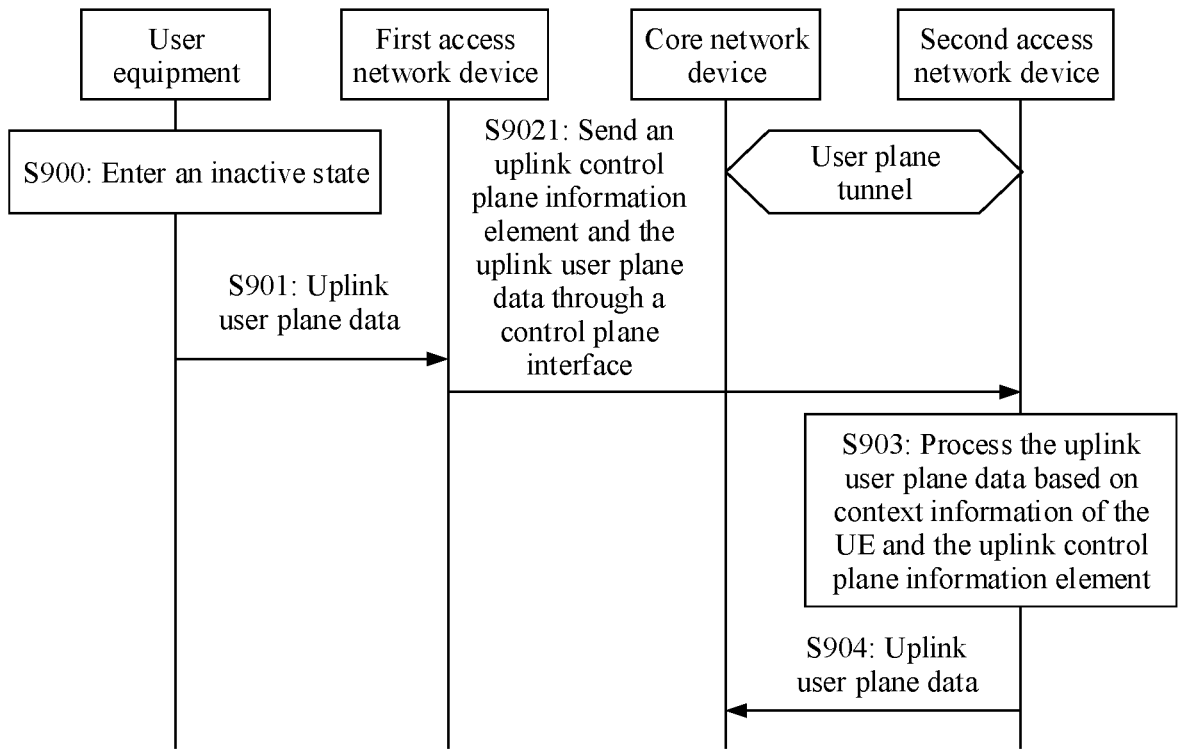
FIG. 12 is a method flowchart of a communication method based on a control plane interface according to an embodiment of this application.

In a first possible implementation, the same interface for transmitting the uplink control plane information element and the uplink user plane data may be a control plane (Xn-C) interface between the first access network device and the second access network device. Refer to FIG. 12. S902 is specifically implemented as S9021.

S9021: The first access network device sends the uplink control plane information element and the uplink user plane data to the second access network device through the control plane (Xn-C) interface. Correspondingly, the second access network device receives the uplink control plane information element and the uplink user plane data from the first access network device through the control plane (Xn-C) interface.

The uplink control plane information element and the uplink user plane data may be carried in a same control plane message, or may be carried in different control plane messages.

For example, the first access network device sends the control plane message to the second access network device through the control plane interface. Correspondingly, the second access network device receives the control plane message from the first access network device through the control plane interface. There may be one control plane message, and the control plane message carries the uplink control plane information element and the uplink user plane data. There may be two or more control plane messages. The uplink control plane information element and the uplink user plane data are carried in different control plane messages. In this case, the control plane message carrying the uplink user plane data carries an identifier of the UE, and the identifier of the UE may include one or more of the following identifiers: the first user equipment identifier (for example, the I-RNTI) allocated by the second access network device to the UE, the second user equipment identifier (for example, the C-RNTI) allocated by the first access network device to the UE, and the third user equipment identifier (for example, the Xn-AP ID) allocated by the first access network device to the UE.

An example in which "the control plane message is a context obtaining request message" is used for description. The context obtaining request message is used to obtain the access stratum context of the UE. The context obtaining request message may carry only the uplink user plane data, and another control plane message is used to carry the uplink control plane information element. In this case, the first access network device sends the context obtaining request message and the control plane message carrying the uplink control plane information element to the second access network device. Alternatively, the context obtaining request message may carry both the uplink control plane information element and the uplink user plane data. In this case, the first access network device only needs to send the context obtaining request message to the second access network device.

Both the uplink control plane information element and the uplink user plane data are carried in the control plane message in a plaintext form, or may be carried in the control plane message in a container form. The plaintext form specifically means that both the uplink control plane information element and the uplink user plane data are visible in an Xn interface protocol. The container form specifically means that both the uplink control plane information element and the uplink user plane data are invisible in the Xn interface protocol. The uplink control plane information element and the uplink user plane data may be carried in a same container, or may be carried in different containers. When both the uplink control plane information element and the uplink user plane data are invisible in the Xn interface protocol, the first access network device may forward the uplink control plane information element and the uplink user plane data to the second access network device without processing the uplink control plane information element and the uplink user plane data.

Figure 13:
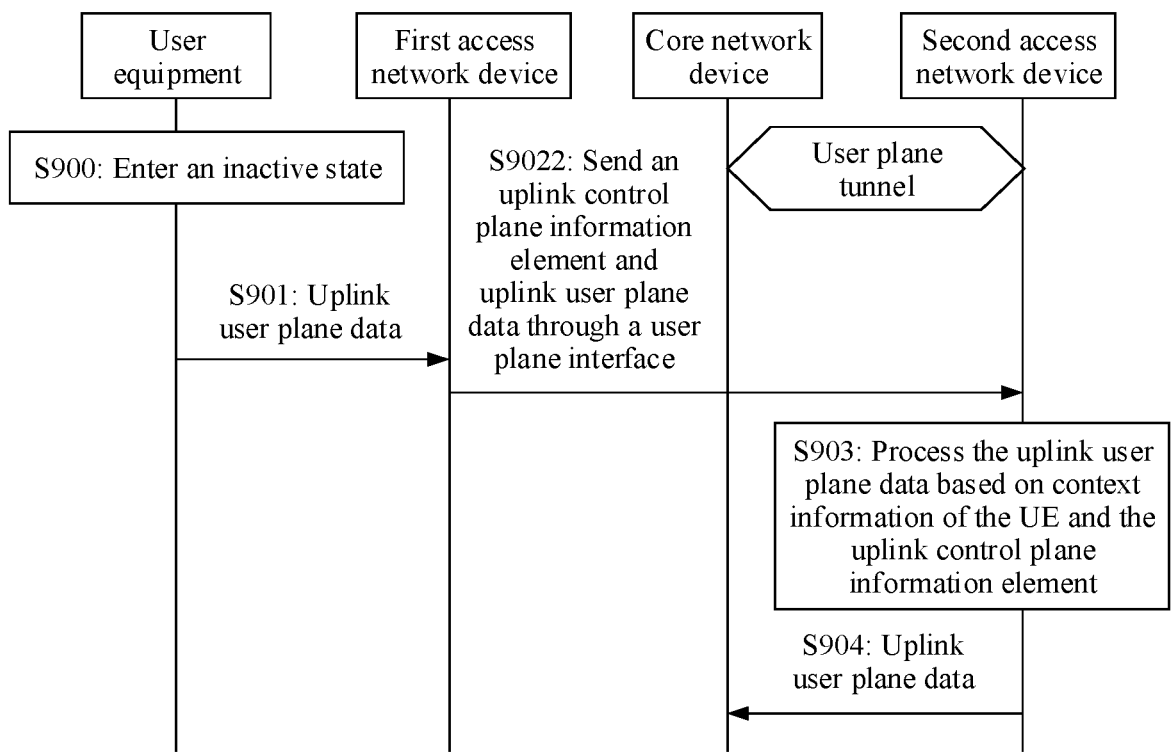
FIG. 13 is a method flowchart of a communication method based on a user plane interface according to an embodiment of this application.

In a second possible implementation, the same interface for transmitting the uplink control plane information element and the uplink user plane data may alternatively be a user plane (Xn-U) interface between the first access network device and the second access network device. Refer to FIG. 13. S902 is specifically implemented as S9022.

S9022: The first access network device sends the uplink control plane information element and the uplink user plane data to the second access network device through the user plane (Xn-U) interface. Correspondingly, the second access network device receives the uplink control plane information element and the uplink user plane data from the first access network device through the user plane (Xn-U) interface.

The uplink control plane information element and the uplink user plane data are transmitted from the first access network device to the second access network device through a user plane tunnel. The user plane tunnel is a pre-established user plane tunnel.

For example, the uplink user plane data, the first user equipment identifier (for example, the I-RNTI), and the identity authentication information of the UE (for example, the MAC-I) are all carried in a MAC PDU. The MAC PDU, the cell identifier of the target cell accessed by the UE, and the second user equipment identifier (for example, the C-RNTI) are transmitted from the first access network device to the second access network device through the user plane tunnel. In this case, after receiving the MAC PDU from the UE, the first access network device does not need to perform splitting processing, and directly sends the MAC PDU to the second access network device. If the uplink user plane data and the RRC connection resume request message are carried in a same MAC PDU (that is, the MAC PDU from the UE carries both the uplink user plane data and the RRC connection resume request message), the first access network device only needs to send one MAC PDU to the second access network device. If the uplink user plane data and the RRC connection resume request message are carried in different MAC PDUs, the first access network device sends two or more MAC PDUs to the second access network device.

For example, the uplink user plane data is carried in a MAC SDU. Both the first user equipment identifier (for example, the I-RNTI) and the identity authentication information (for example, the MAC-I) of the UE are carried in another MAC SDU. The MAC SDU carrying the uplink user plane data, a logical channel identifier corresponding to the uplink user plane data, a MAC SDU carrying a part of the uplink control plane information element, the cell identifier of the target cell accessed by the UE, and the second user equipment identifier (for example, the C-RNTI) are transmitted from the first access network device to the second access network device through the user plane tunnel. In this case, after receiving the MAC PDU from the UE, the first access network device performs splitting processing, determines SDUs corresponding to a same logical channel identifier, and sends the MAC PDU corresponding to the same logical channel identifier to the second access network device. In addition, the first access network device further sends the logical channel identifier to the second access network device.

In addition, if the logical channel identifier is a default value, the first access network device does not need to send the logical channel identifier to the second access network device.

It should be noted that the user plane tunnel can transmit data for each UE in the inactive state. A quantity of served UEs varies based on a granularity of establishing the user plane tunnel. The granularity of establishing the user plane tunnel may include but is not limited to the following examples:

1. A user plane tunnel is established based on an access network device. For example, one user plane tunnel is established between every two access network devices. In this case, the user plane tunnel can be used to transmit data for UE accessing the two access network devices.

2. A user plane tunnel is established based on a cell. In this case, a user plane tunnel existing between two access network devices can be used to transmit data for UE in a cell, and the cell is a cell covered by any one of the foregoing two access network devices.

3. A user plane tunnel is established based on a session identifier. In this case, a user plane tunnel existing between two access network devices can be used to transmit data for a session of a type, and the session is a session of a type whose data can be transmitted by UE in the inactive state.

4. A user plane tunnel is established based on a radio bearer (RB). In this case, a user plane tunnel existing between two access network devices can be used to transmit data for an RB of a type, and the RB is an RB of a type whose data can be transmitted by UE in the inactive state.

5. A user plane tunnel is established based on a quality of service (QoS) flow. In this case, a user plane tunnel existing between two access network devices can be used to transmit data for a QoS flow of a type, and the QoS flow is a QoS flow of a type whose data can be transmitted by UE in the inactive state. The foregoing two access network devices are adjacent access network devices.

A process of establishing a user plane tunnel is as follows:

Step 1: A third access network device sends a user plane tunnel establishment request message to a fourth access network device. Correspondingly, the fourth access network device receives the user plane tunnel establishment request message from the third access network device. The user plane tunnel establishment request message is used to request to establish a user plane tunnel. The user plane tunnel establishment request message includes internet protocol (IP) address information of the third access network device and address information of the user plane tunnel allocated by the third access network device.

Step 2: The fourth access network device sends user plane tunnel establishment response information to the third access network device. Correspondingly, the third access network device receives the user plane tunnel establishment response message from the fourth access network device. The user plane tunnel establishment response message includes IP address information of the fourth access network device and address information of the user plane tunnel allocated by the fourth access network device. In this way, the user plane tunnel between the third access network device and the fourth access network device is established.

It should be noted that the third access network device and the fourth access network device may be any two access network devices, to be specific, the third access network device may be the first access network device or the second access network device, or may be another access network device other than the first access network device and the second access network device. Similarly, the fourth access network device may be the first access network device or the second access network device, or may be another access network device other than the first access network device and the second access network device.

The uplink control plane information element and the uplink user plane data may be transmitted by the first access network device to the second access network device through different interfaces. In this case, the uplink control plane information element includes a first indication information element. The first indication information element is used to indicate the second access network device to receive the uplink user plane data sent by the first access network device. For example, the first indication information element includes a cause value and/or a buffer status report (BSR). The cause value may be transmitting the uplink user plane data, or may be other information "that can indicate the UE in the inactive state to transmit the uplink user plane data. For example, the cause value is transmitting the uplink user plane data of the UE in the inactive state. The BSR is used to indicate a data amount of the uplink user plane data. The first indication information element may further include another information element that can indicate "the second access network device to receive the uplink user plane data sent by the first access network device". For example, an information element that is generated by the first access network device and that can indicate "the second access network device to receive the uplink user plane data sent by the first access network device".

In a second possible design, the uplink control plane information element and the uplink user plane data may be transmitted through different interfaces. For example, the uplink control plane information element is transmitted through the control plane interface, and the uplink user plane data is transmitted through the user plane interface. The following describes in detail the uplink control plane information element and the uplink user plane data transmitted through the different interfaces.

Figure 14:
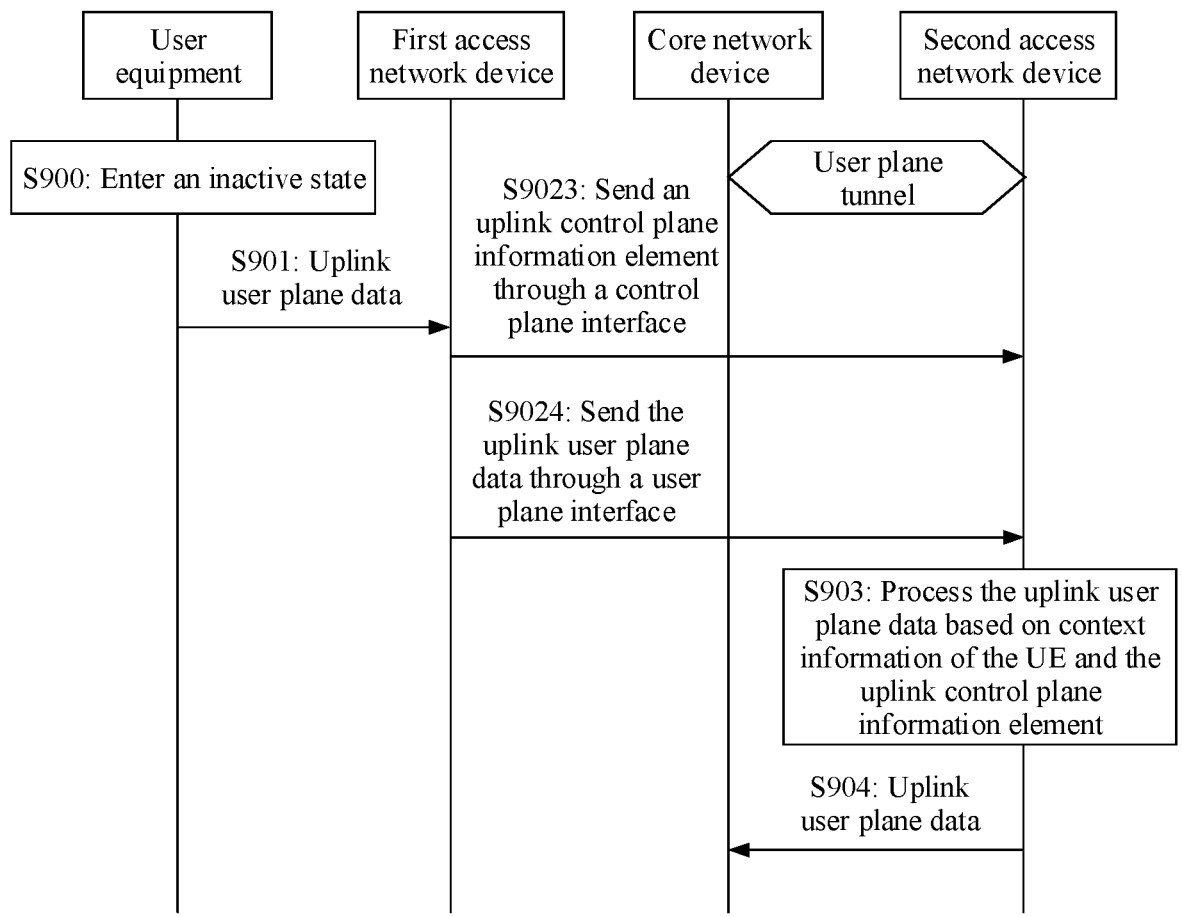
FIG. 14 is a method flowchart of a communication method based on a control plane interface and a user plane interface according to an embodiment of this application.

Refer to FIG. 14. S902 is specifically implemented as S9023 and S9024.

S9023: The first access network device sends the uplink control plane information element to the second access network device through the control plane interface, and correspondingly, the second access network device receives the uplink control plane information element from the first access network device through the control plane interface.

In addition to the first indication information element, the uplink control plane information element may further include one or more of the following information elements: the first user equipment identifier, the identity authentication information of the UE, the cell identifier of the target cell accessed by the UE, and the second user equipment identifier allocated by the first access network device to the UE.

It should be noted that when the uplink control plane information element and the uplink user plane data are transmitted through the different interfaces, the first user terminal identifier, the cell identifier of the target cell accessed by the UE, and the second user terminal identifier are also information elements transmitted by the first access network device to the second access network device. All the three information elements may be transmitted through the control plane interface or may be transmitted through the user plane interface; any one of the three information elements may be transmitted through the control plane interface, and the remaining two of the three information elements may be transmitted through the user plane interface; or any two of the three information elements may be transmitted through the control plane interface, and the remaining one is transmitted through the user plane interface. In addition, the identity authentication information of the UE may also be transmitted through the control plane interface, or may be transmitted through the user plane interface. For example, the identity authentication information of the UE is transmitted to the second access network device through the user plane interface in a form in which integrity protection is performed on the user plane data.

For example, a control plane message carrying the uplink control plane information element is a context obtaining request message. The first access network device transmits the context obtaining request message to the second access network device through the control plane interface.

S9024: The first access network device sends the uplink user plane data to the second access network device through the user plane interface, and correspondingly, the second access device receives the uplink user plane data from the first access network device through the user plane interface.

Herein, when the uplink user plane data is transmitted through the user plane interface, information used to identify the UE is transmitted, to indicate the UE to which the uplink user plane data belongs. The information used to identify the UE may specifically include one or more of the following information: the first user equipment identifier (for example, the I-RNTI), the second user equipment identifier (for example, the C-RNTI), and the third user equipment identifier (for example, the Xn-AP ID).

For example, the uplink user plane data, the first user equipment identifier, the identity authentication information of the UE, the cell identifier of the target cell accessed by the UE, and the second user equipment identifier allocated by the first access network device to the UE are all carried in a MAC PDU. The first access network device transmits the MAC PDU to the second access network device through the control plane interface.

It should be noted that the first access network device may first perform S9023 and then perform S9024. Alternatively, the first access network device may first perform S9024 and then perform S9023. Alternatively, the first access network device may simultaneously perform S9023 and S9024. An execution sequence of S9023 and S9024 is not limited herein. For the second access network device, there may be three cases: The second access network device first receives the uplink control plane information element, and then receives the uplink user plane data; the second access network device first receives the uplink user plane data, and then receives the uplink control plane information element; or the second access network device simultaneously receives both the uplink control plane information element and the uplink user plane data.

If the second access network device first receives the uplink control plane information element, because the uplink control plane information element carries the first indication information element, the second access network device learns, based on the first indication information element, that the second access network device needs to receive the uplink user plane data from the first access network device. After receiving the uplink user plane data, the second access network device sends an RRC connection release message to the first access network device.

If the second access network device first receives the uplink user plane data, the second access network device waits to receive the uplink control plane information element from the first access network device within a preset time period after receiving the uplink user plane data. For example, the second access network device starts a timer when the second access network device receives the uplink user plane data but does not receive the uplink control plane information element, and during running of the timer, the second access network device receives the uplink control plane information element, so that the second access network device derives a new key based on the uplink control plane information element, to decrypt the uplink user plane data, or the second access network device performs authentication on the identity of the UE based on the uplink control plane information element.

S903: The second access network device processes the uplink user plane data based on the uplink control plane information element and context information of the UE.

For example, the second access network device determines the access stratum context of the UE based on the first user equipment identifier (for example, the I-RNTI). The second access network device generates one piece of new identity authentication information based on a currently stored RRC integrity protection key, compares the newly generated identity authentication information with the identity authentication information received by the second access network device, and if they are consistent, it is considered that the authentication succeeds, or if they are inconsistent, it is considered that the authentication fails. After the identity authentication succeeds, the second access network device generates a user plane key. The user plane key includes a user plane encryption key and/or a user plane integrity protection key. For uplink user plane data processed by using a user plane encryption key, the second access network device performs decryption by using the newly generated user plane encryption key. For uplink user plane data processed by using a user plane integrity protection key, the second access network device performs decryption by using the newly generated user plane integrity protection key. For uplink user plane data processed by using a user plane encryption key and a user plane integrity protection key, the second access network device performs decryption by using the newly generated user plane encryption key and the user plane integrity protection key. For a process in which the second access network device generates the user plane key, refer to a process in which "the UE generates the user plane key" in S901. Details are not described herein again.

S904: The second access network device sends the uplink user plane data to the core network device.

A user plane tunnel exists between the second access network device and the core network device, and no migration occurs.

For example, the core network device may be a user plane function (UPF) network element. An N3 connection exists between the second access network device and the UPF, and an N6 connection exists between the UPF and a data network (DN). The second access network device sends the decrypted uplink user plane data to the UPF, and the UPF sends the uplink user plane data to the data network.

According to the communication method provided in this embodiment of this application, the first access network device receives the uplink user plane data from the user equipment UE in the inactive state, and then sends the uplink control plane information element and the uplink user plane data to the second access network device through the same interface, or sends the uplink control plane information element and the uplink user plane data to the second access network device through the different interfaces. When the first access network device sends the uplink control plane information element and the uplink user plane data to the second access network device through the different interfaces, the uplink control plane information element includes the first indication information element, and the first indication information element is used to indicate the second access network device to receive the uplink user plane data sent by the first access network device. Compared with the conventional technology, before receiving the uplink user plane data from the UE in the inactive state, the first access network device needs to perform an access stratum context migration process of the UE and a migration process of the user plane tunnel between the access network device and the core network device, resulting in a long data transmission delay, and high signaling overheads. However, in the communication method in this embodiment of this application, the first access network device can receive the uplink user plane data from the user equipment UE in the inactive state and then send the uplink control plane information element and the uplink user plane data to the second access network device, and the second access network device forwards the uplink user plane data to the core network device, so that a data transmission function is implemented. Because the first access network device that receives the uplink user plane data of the UE does not need to send the uplink user plane data to the core network device, but forwards the uplink user plane data to the core network device through the second access network device, there is no migration process of the access stratum context of the UE, and there is also no migration process of the user plane tunnel between the second access network device and the core network device, so that the data transmission delay can be reduced, signaling overheads between the UE and the access network device can be reduced, and signaling overheads between the access network device and the core network device can also be reduced.

Figure 15:
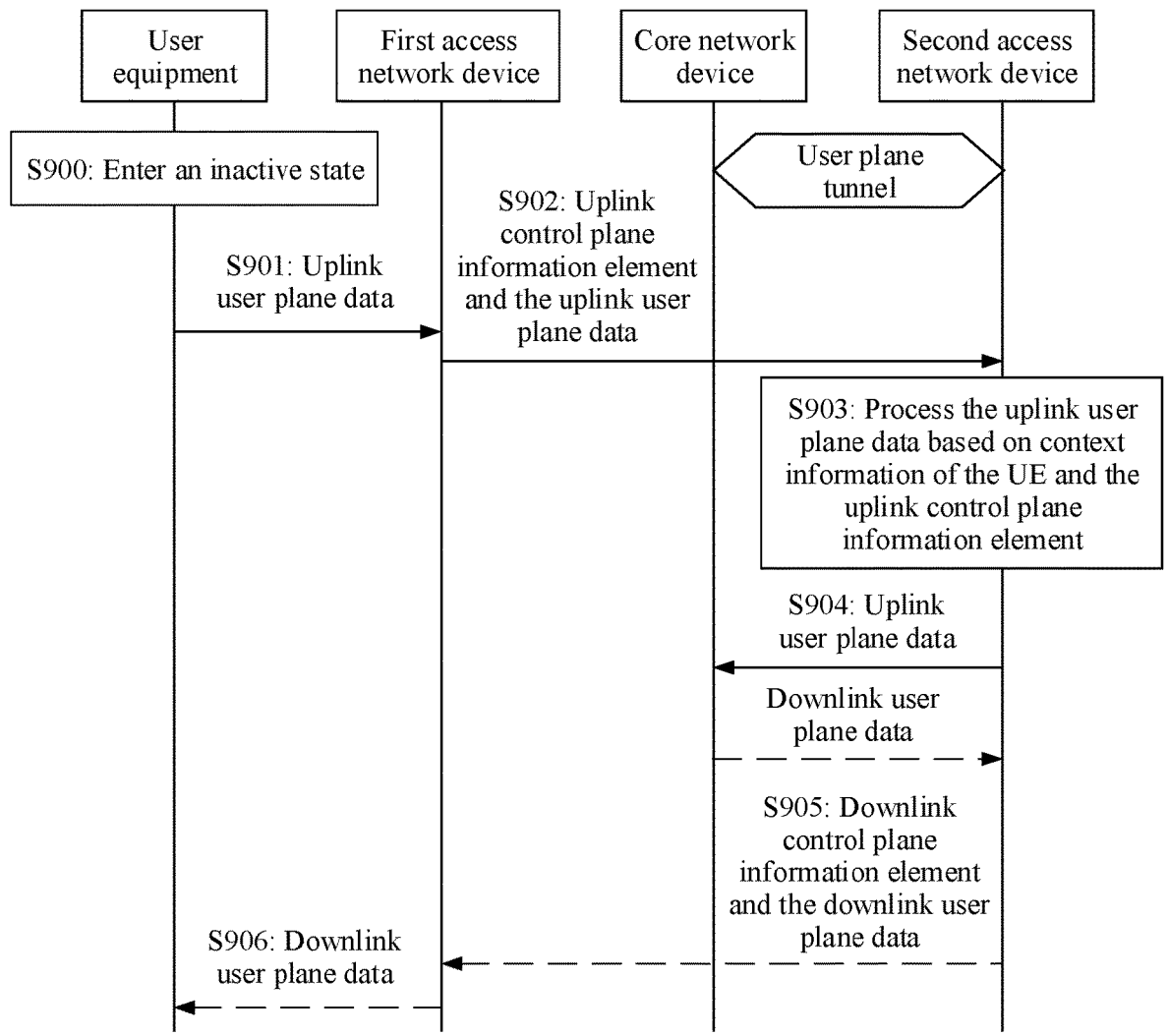
FIG. 15 is a method flowchart of another communication method according to an embodiment of this application.

For the second access network device, if the second access network device needs to send buffered downlink user plane data, that is, the second access network device needs to send data received from the core network device, the second access network device performs a downlink transmission process. Refer to FIG. 15. A specific process may include the following steps.

S905: The second access network device sends a downlink control plane information element and downlink user plane data to the first access network device. Correspondingly, the first access network device receives the downlink control plane information element and the downlink user plane data from the second access network device.

The downlink user plane data is data obtained by the second access network device through processing by using a new user plane key.

There may also be two forms of transmitting the downlink user plane data from the second access network device to the first access network device:

In a first manner, the downlink user plane data is transmitted from the second access network device to the first access network device in a form of a MAC PDU. In this case, the second access network device does not need to send a logical channel identifier to the first access network device.

In a second manner, the downlink user plane data is transmitted from the second access network device to the first access network device in a form of a sub-block. For descriptions of the sub-block, refer to related descriptions in S902. Details are not described herein again. When the downlink user plane data is carried in a control plane message in the form of the sub-block, the second access network device further needs to send a logical channel identifier corresponding to the sub-block to the first access network device.

In a first possible design, the downlink control plane information element and the downlink user plane data may be transmitted by the second access network device to the first access network device through a same interface. The following describes in detail the downlink control plane information element transmitted through the same interface and a transmission process through the same interface.

The downlink control plane information element includes information used to identify the UE and a state indication information element.

The information about the user equipment UE is used by the first access network device to determine the UE to which the downlink user plane data corresponds. For example, the information used to identify the UE may be at least one of the following identification information: the I-RNTI allocated by the second access network device to the UE, the C-RNTI allocated by the first access network device to the UE, and the Xn-AP ID allocated by the first access network device to the UE.

The state indication information element is used to indicate a state of the UE. For example, the state indication information element may be an RRC connection release message, to indicate the UE to remain in the inactive state, or indicate the UE to enter an idle state.

Figure 16:
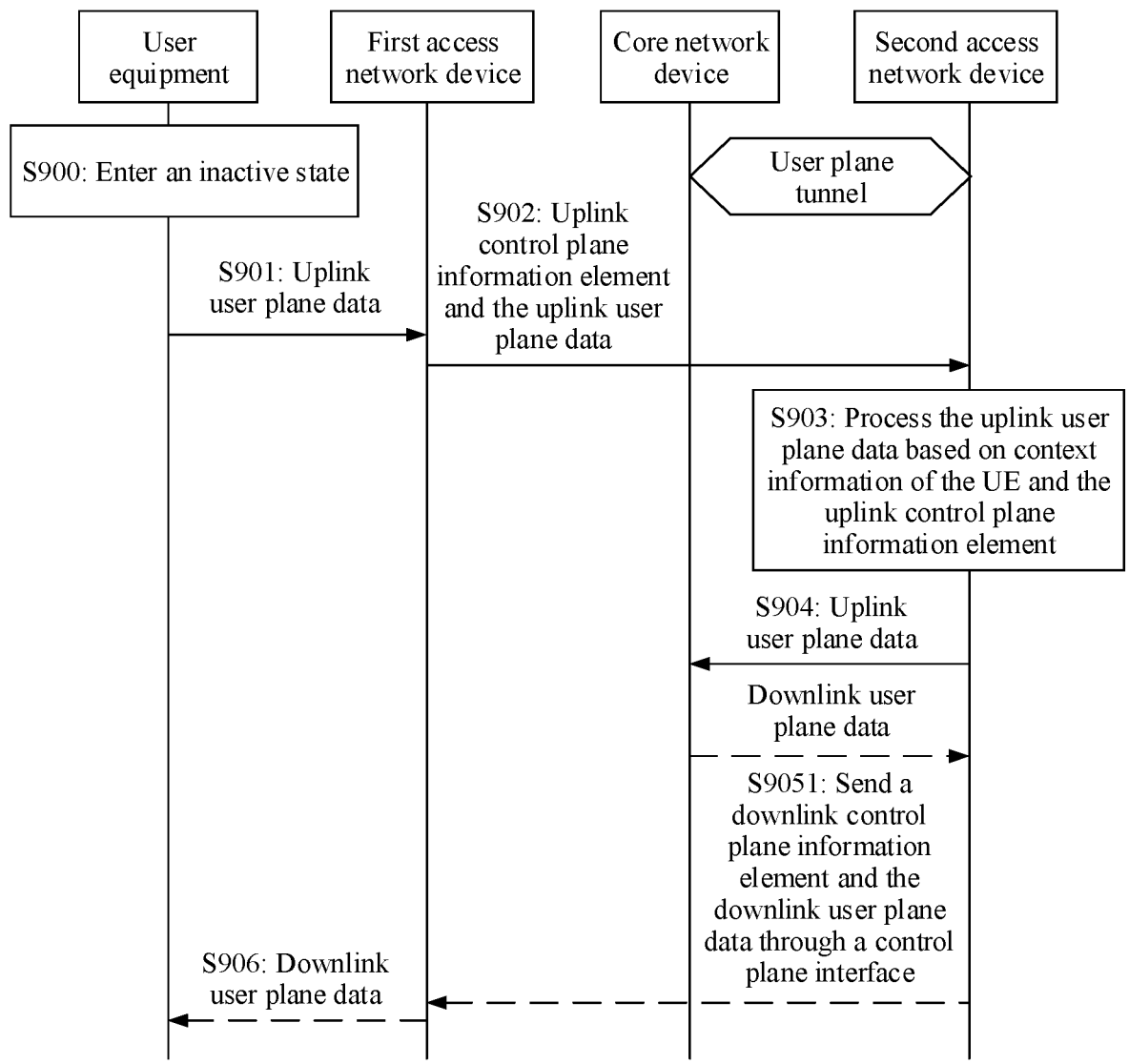
FIG. 16 is a method flowchart of another communication method based on a control plane interface according to an embodiment of this application.

In a first possible implementation, the same interface for transmitting the downlink control plane information element and the downlink user plane data may be the control plane (Xn-C) interface between the first access network device and the second access network device. Refer to FIG. 16. S905 is specifically implemented as S9051.

S9051: The second access network device sends the downlink control plane information element and the downlink user plane data to the first access network device through the control plane interface. Correspondingly, the first access network device receives the downlink control plane information element and the downlink user plane data from the second access network device through the control plane interface.

The downlink control plane information element and the downlink user plane data may be carried in a same control plane message, or may be carried in different control plane messages.

For example, the second access network device sends the control plane message to the first access network device through the control plane interface. Correspondingly, the first access network device receives the control plane message from the second access network device through the control plane interface. There may be one control plane message, and the control plane message carries the downlink control plane information element and the downlink user plane data. There may be two or more control plane messages. The downlink control plane information element and the downlink user plane data are carried in different control plane messages. In this case, the control plane message carrying the downlink user plane data carries an identifier of the UE, and the identifier of the UE may include one or more of the following identifiers: the first user equipment identifier (for example, the I-RNTI), the second user equipment identifier (for example, the C-RNTI), and the third user equipment identifier (for example, the Xn-AP ID).

An example in which "the control plane message is a context obtaining failure message" is used for description. The context obtaining failure message is used to indicate that obtaining of the access stratum context of the UE fails. The context obtaining failure message may carry only the downlink user plane data, and another control plane message is used to carry the downlink control plane information element. In this case, the second access network device sends the context obtaining failure message and the control plane message carrying the downlink control plane information element to the first access network device. Alternatively, the context obtaining request message may carry both the downlink control plane information element and the downlink user plane data. In this case, the second access network device needs to send only the context obtaining failure message to the first access network device.

Both the downlink control plane information element and the downlink user plane data may still be carried in the control plane message in the plaintext form, or may be carried in the control plane message in the container form. If the downlink control plane information element and the downlink user plane data are carried in the control plane message in the container form, after receiving a container, the first access network device directly forwards the container to the UE without needing to parse the container. The downlink control plane information element and the downlink user plane data may be carried in a same container, or may be carried in different containers.

Figure 17:
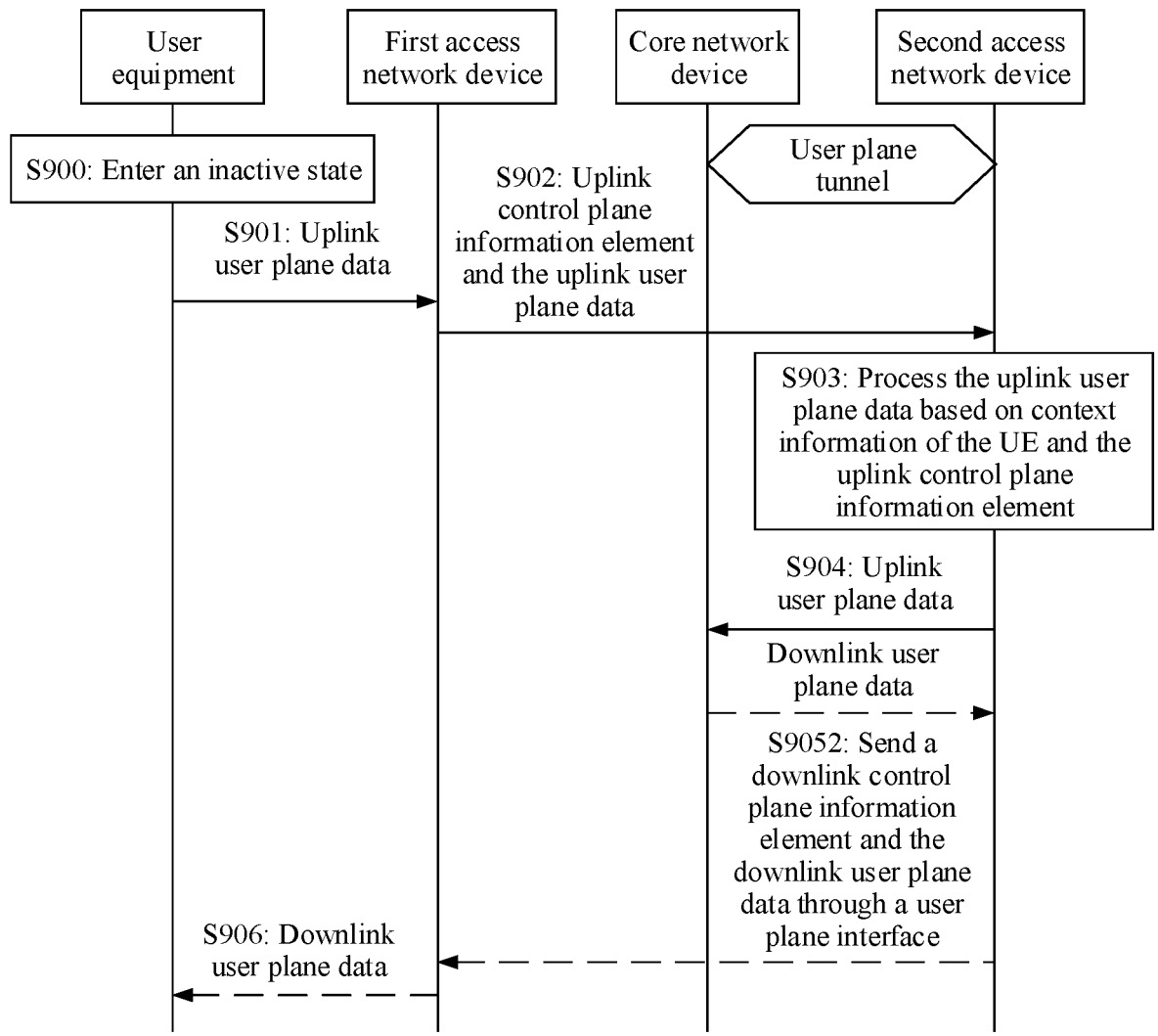
FIG. 17 is a method flowchart of another communication method based on a user plane interface according to an embodiment of this application.

In a second possible implementation, the same interface for transmitting the downlink control plane information element and the downlink user plane data may alternatively be the user plane (Xn-U) interface between the first access network device and the second access network device. Refer to FIG. 17. S905 is specifically implemented as S9052.

S9052: The second access network device sends the downlink control plane information element and the downlink user plane data to the first access network device through the user plane interface. Correspondingly, the first access network device receives the downlink control plane information element and the downlink user plane data from the second access network device through the user plane interface.

The downlink control plane information element and the downlink user plane data are transmitted from the second access network device to the first access network device through the user plane tunnel.

For example, the state indication information element in the downlink control plane information element is carried in a PDCP PDU. The downlink user plane data is carried in a PDCP PDU. The information used to identify the UE, the PDCP PDU carrying a part of the downlink control plane information element, and the PDCP PDU carrying the downlink user plane data are transmitted from the second access network device to the first access network device through the user plane tunnel. In addition, the second access network device further needs to send the logical channel identifier to the first access network device.

In addition, if the logical channel identifier is a default value, the second access network device does not need to send the logical channel identifier to the first access network device.

After receiving the PDCP PDUs, the first access network device performs processing on the PDCP PDUs at an RLC layer and a MAC layer to obtain a MAC PDU. For example, the downlink user plane data and the RRC connection release message may be carried in a same MAC PDU, or may be carried in different MAC PDUs. The RRC connection release message is used to indicate a state of the UE, to be specific, indicate the UE to remain in the inactive state, or indicate the UE to enter the idle state.

In a second possible design, the downlink control plane information element and the downlink user plane data may be transmitted by the second access network device to the first access network device through different interfaces. For example, the downlink control plane information element is transmitted through the control plane interface, and the downlink user plane data is transmitted through the user plane interface. The following describes in detail the downlink control plane information element transmitted through a different interface and a transmission process through the different interface.

Figure 18:
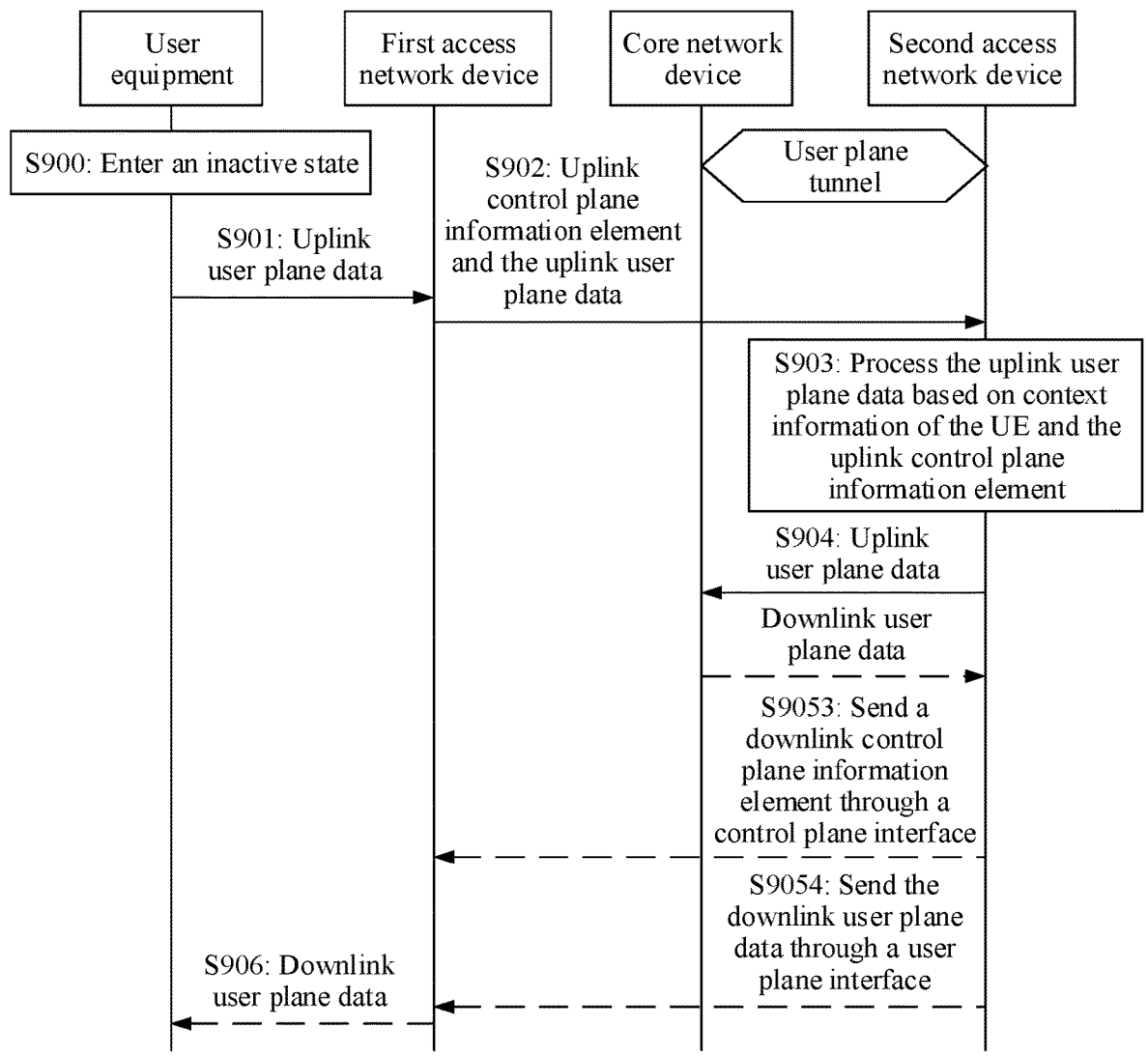
FIG. 18 is a method flowchart of another communication method based on a control plane interface and a user plane interface according to an embodiment of this application.

The downlink control plane information element carries information used to identify the UE and a state indication information element, and further carries a second indication information element, and the second indication information element is used to indicate the first access network device to receive the downlink user plane data from the second access network device. For example, the second indication information element includes a buffer status report (BSR), and the BSR is used to indicate a data amount of the downlink user plane data. The second indication information element may further include another information element that can indicate "the first access network device to receive the downlink user plane data from the second access network device". For example, the information element that is generated by the second access network device and that can indicate "the first access network device to receive the downlink user plane data from the second access network device". Refer to FIG. 18. S905 is specifically implemented as S9053 and S9054.

S9053: The second access network device sends the downlink control plane information element to the first access network device through the control plane interface, and correspondingly, the first access device receives the downlink control plane information element from the second access network device through the control plane interface.

In addition to the second indication information element, the downlink control plane information element may further include information used to identify the UE and a state indication information element.

For example, a control plane message carrying the downlink control plane information element is a context obtaining failure message. The first access network device transmits the context obtaining failure message to the second access network device through the control plane interface.

S9054: The second access network device sends the downlink user plane data to the first access network device through the user plane interface, and correspondingly, the first access device receives the downlink user plane data from the second access network device through the user plane interface.

Herein, when the downlink user plane data is transmitted through the user plane interface, the information used to identify the UE is transmitted, to indicate the UE to which the downlink user plane data belongs. The information used to identify the UE may specifically include one or more of the following information: the first user equipment identifier (for example, the I-RNTI), the second user equipment identifier (for example, the C-RNTI), and the third user equipment identifier (for example, the Xn-AP ID).

It should be noted that the second access network device may first perform S9053 and then perform S9054. Alternatively, the second access network device may first perform S9054 and then perform S9053. Alternatively, the second access network device may simultaneously perform S9053 and S9054. An execution sequence of S9053 and S9054 is not limited herein. For the first access network device, there may be three cases: The first access network device first receives the downlink control plane information element, and then receives the downlink user plane data; the first access network device first receives the downlink user plane data, and then receives the downlink control plane information element; or the first access network device simultaneously receives the downlink control plane information element and the downlink user plane data.

If the first access network device first receives the downlink control plane information element, because the downlink control plane information element carries the second indication information element, the first access network device learns, based on the second indication information element, that the first access network device needs to receive the downlink user plane data from the second access network device. After receiving the downlink user plane data, the first access network device sends an RRC connection release message to the UE.

If the first access network device first receives the downlink user plane data, the first access network device waits to receive the downlink control plane information element from the second access network device within a preset time period after the first access network device receives the downlink user plane data. For example, the first access network device starts a timer when the first access network device receives the downlink user plane data but does not receive the downlink control plane information element. During running of the timer, the first access network device receives the downlink control plane information element, so that the first access network device is prevented from directly sending the RRC connection release message to the UE based on the downlink control plane information element. After receiving the RRC connection release message, the UE enters the inactive state and does not receive the downlink user plane data. If the downlink user plane data is still not received after running of the timer expires, the first access network device sends the RRC connection release message to the UE. If the first access network device receives the downlink user plane data from the second access network device during running of the timer, the first access network device performs S906.

S906: The first access network device sends the downlink user plane data to the UE. Correspondingly, the UE receives the downlink user plane data from the first access network device.

In addition, the first access network device further sends the RRC connection release message to the UE. Correspondingly, the UE receives the RRC connection release message from the first access network device.

The downlink user plane data and the RRC connection release message may be transmitted by using a same MAC PDU, or may be transmitted by using different MAC PDUs.

For example, the first access network device first sends the downlink user plane data to the UE, and then sends the RRC connection release message to the UE. Alternatively, the first access network device simultaneously sends the downlink user plane data and the RRC connection release message to the UE.

For the second access network device, if there is no buffered downlink user plane data, namely, data received by the second access network device from the core network device, in the second access network device, in both S905 and S906, the downlink user plane data does not need to be transmitted, and the downlink control plane information element still needs to be transmitted to indicate the state of the UE.

For example, transmission through the control plane interface is used as an example. After the first access network device sends the context obtaining request message to the second access network device, the first access network device receives a feedback message of the context obtaining request message from the second access network device, where the feedback message is used to indicate that context obtaining fails, to notify the first access network device that obtaining of the access stratum context of the UE fails, and therefore the access stratum context of the UE does not need to be migrated, thereby reducing signaling overheads between the access network devices. For example, the feedback message may be a context obtaining failure message. The context obtaining failure message carries the state indication information element to indicate the state of the UE. After receiving the context obtaining failure message from the second access network device, the first access network device sends an RRC connection release message to the UE, to indicate the UE to enter the idle state or remain in the inactive state.

For example, transmission through the user plane interface is used as another example. After the first access network device sends the uplink control plane information element and the uplink user plane data to the second access network device, the first access network device receives the downlink control plane information element from the second access network device. The downlink control plane information element includes the state indication information element, and the state indication information element is used to indicate the state of the UE. After receiving the downlink control plane information element from the second access network device, the first access network device sends an RRC connection release message to the UE, to indicate the UE to enter the idle state or remain in the inactive state.

The communication method provided in the embodiments of this application is described in detail below by using an example in which "the first access network device sends the uplink control plane information element and the uplink user plane data to the second access network device through the control plane interface".

Figure 19:
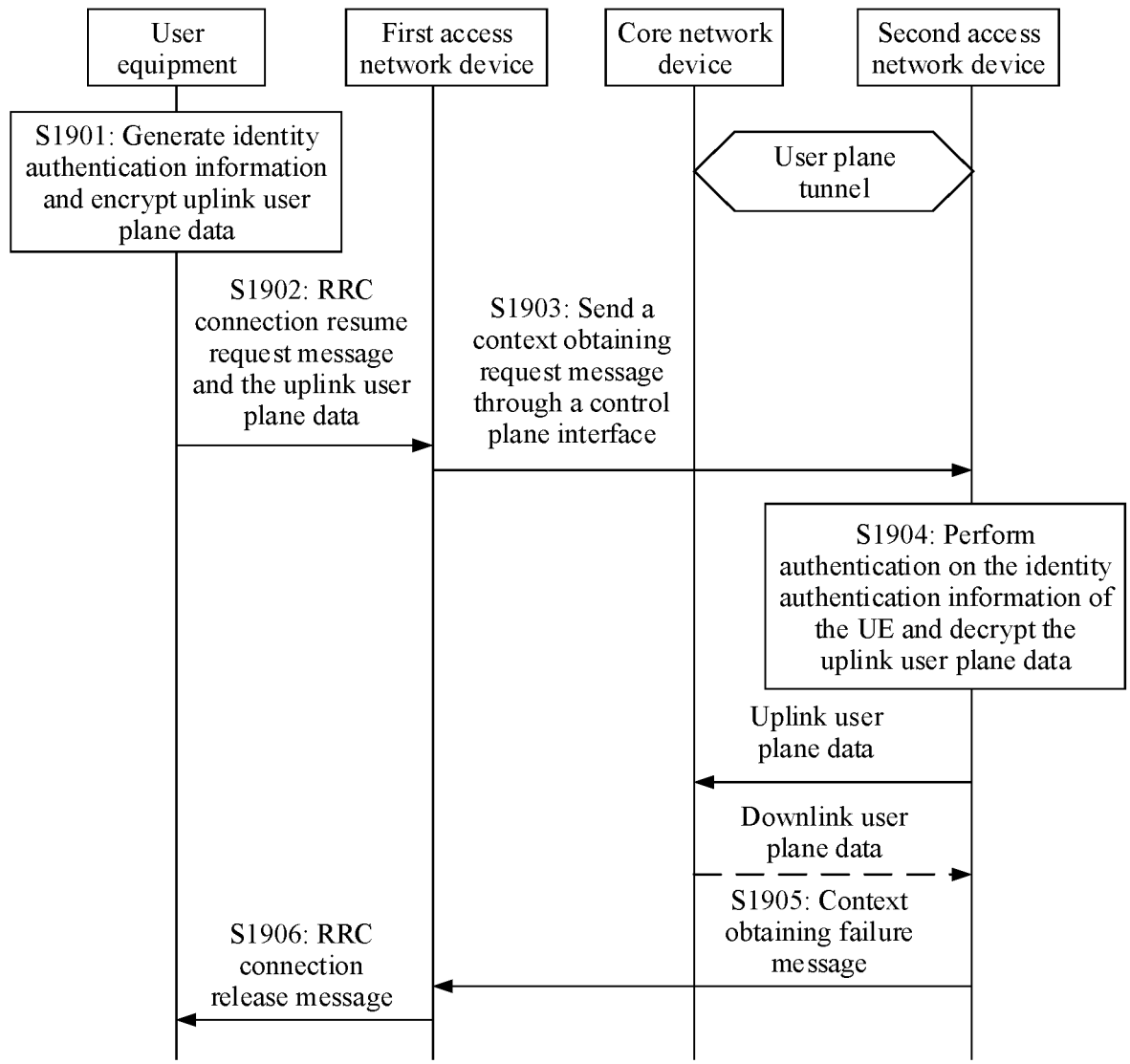
FIG. 19 is a method flowchart of another communication method according to an embodiment of this application.

Example 1: The UE can send all uplink user plane data to the first access network device through one time of transmission. Refer to FIG. 19. A specific implementation process is as follows:

S1901: The UE generates identity authentication information, and encrypts the uplink user plane data.

The UE is UE in an inactive state, and a cell in which the UE is located when the UE receives an RRC connection release message is referred to as a source cell. After the UE in the inactive state accesses a new access network device (denoted as the first access network device), a cell in which the UE is located is referred to as a target cell.

The identity authentication information is authentication information generated based on a currently stored RRC integrity protection key, a cell identifier of the source cell, a C-RNTI allocated by the second access network device to the UE when the UE is located in the source cell, and a cell identifier of the target cell.

A key for encrypting the uplink user plane data is a new user plane key. For a process in which the UE derives the new user plane key, refer to related descriptions of "generating the user plane key by the UE" in S901. Details are not described herein again.

S1902: The UE sends an RRC connection resume request message and the uplink user plane data to the first access network device. Correspondingly, the first access network device receives the RRC connection resume request message and the uplink user plane data from the UE.

For the RRC connection resume request message and the uplink user plane data, and a data transmission manner of the RRC connection resume request message and the uplink user plane data, refer to related descriptions in S901. Details are not described herein again.

Optionally, an uplink control plane information element carries a BSR, and a value of the BSR is 0, to notify the first access network device that there is no uplink user plane data subsequently.

S1903: The first access network device sends a context obtaining request message to the second access network device through the control plane interface. Correspondingly, the second access network device receives the context obtaining request message from the first access network device.

The context obtaining request message is used to request to obtain an access stratum context of the UE. The context obtaining request message may include the uplink user plane data, an I-RNTI, the identity authentication information, a C-RNTI allocated by the first access network device to the UE, the cell identifier of the source cell, and an Xn-AP ID allocated by the first access network device to the UE. The I-RNTI, the identity authentication information, the C-RNTI allocated by the first access network device to the UE, the cell identifier of the source cell, and the Xn-AP ID allocated by the first access network device to the UE all belong to information elements in the uplink control plane information element. For descriptions of the uplink user plane data and the uplink control plane information element, refer to related descriptions of S9021. Details are not described herein again.

S1904: The second access network device performs authentication on the identity authentication information of the UE, and decrypts the uplink user plane data.

For a specific implementation process of S1904, refer to related descriptions of S903. If the authentication performed by the UE succeeds, the second access network device sends the uplink user plane data to a user plane function network element. Correspondingly, the user plane function network element receives the uplink user plane data from the second access network device, so that transmission of the uplink user plane data is completed.

S1905: The second access network device sends a context obtaining failure message to the first access network device through the control plane interface. Correspondingly, the first access network device receives the context obtaining failure message from the second access network device.

The context obtaining failure message is used to indicate that obtaining of the access stratum context of the UE fails. The context obtaining failure message includes a downlink control plane information element. The downlink control plane information element indicates a state of the UE. When the context obtaining failure message does not carry downlink user plane data, for a transmission process of the context obtaining failure message, refer to a conventional technology. Details are not described herein again.

Optionally, if the second access network device buffers the downlink user plane data of the UE, the downlink user plane data is downlink user plane data sent by the user plane function network element to the second access network device. In this case, the context obtaining failure message includes the downlink control plane information element and the downlink user plane data. For descriptions of the downlink user plane data and the downlink control plane information element, refer to related descriptions of S9051. Details are not described herein again.

S1906: The first access network device sends an RRC connection release message to the UE. Correspondingly, the UE receives the RRC connection release message from the first access network device.

The RRC connection release message indicates the state of the UE. For a process in which "the first access network device transmits only the RRC connection release message to the UE", refer to the conventional technology. Details are not described herein again.

Optionally, if the first access network device further needs to send the downlink user plane data to the UE, for descriptions of the downlink user plane data and the RRC connection release message, refer to related descriptions in S906. Details are not described herein again.

In this way, the uplink user plane data or the downlink user plane data is transmitted between the first access network device and the second access network device through the control plane interface, to implement data transmission between the UE and a core network device, without needing to migrate the access stratum context of the UE, and without needing to switch a user plane tunnel between the access network device and the core network device (the UPF), thereby reducing signaling overheads between the UE and the access network device and between the access network device and the core network device, and reducing a data transmission delay.

Figure 20:
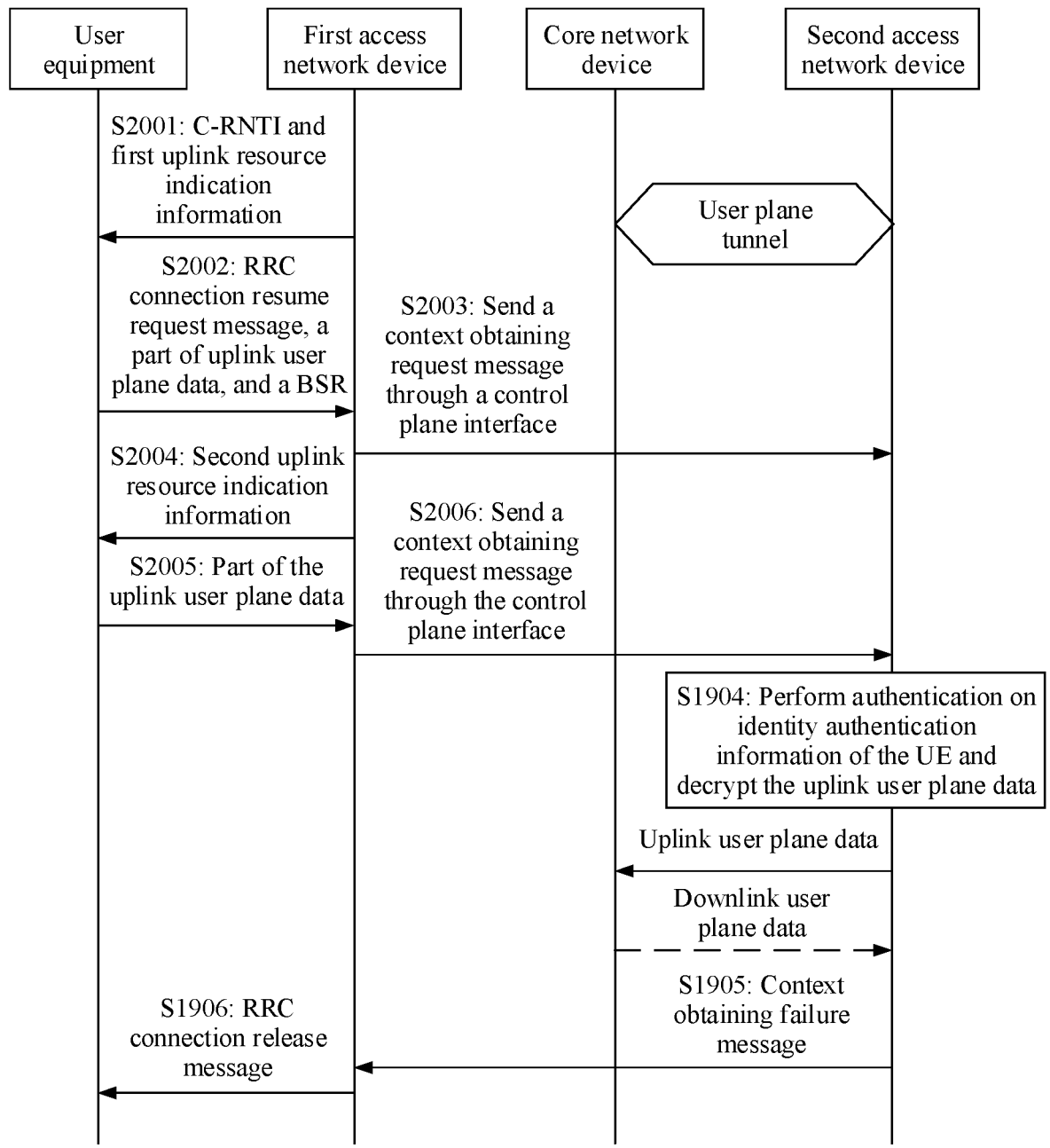
FIG. 20 is a method flowchart of still another communication method according to an embodiment of this application.

Example 2: The UE can send all uplink user plane data to the first access network device twice or more times, and the uplink user plane data and an uplink control plane information element are also transmitted between the first access network device and the second access network device twice or more times. Refer to FIG. 20. A specific implementation process is as follows:

S2001: The first access network device sends a C-RNTI and first uplink resource indication information to the UE. Correspondingly, the UE receives the C-RNTI and the first uplink resource indication information from the first access network device. The first uplink resource indication information is used to indicate an uplink resource of the UE.

S2002: The UE sends an RRC connection resume request message, a part of the uplink user plane data, and a BSR to the first access network device by using the uplink resource indicated by the first uplink resource indication information. Correspondingly, the first access network device receives the RRC connection resume request message, the part of the uplink user plane data, and the BSR from the UE. If a value of the BSR is greater than 0, the BSR indicates that the UE needs to subsequently send the uplink user plane data to the first access network device.

S2003: The first access network device sends a context obtaining request message to the second access network device through the control plane interface. Correspondingly, the second access network device receives the context obtaining request message from the first access network device.

The context obtaining request message is used to request to obtain an access stratum context of the UE. The context obtaining request message may include the part of the uplink user plane data, an I-RNTI, identity authentication information, the C-RNTI allocated by the first access network device to the UE, a cell identifier of a source cell, and an Xn-AP ID allocated by the first access network device to the UE. For descriptions of the part of the uplink user plane data and the uplink control plane information element, refer to related descriptions of S9021. Details are not described herein again.

S2004: The first access network device indicates the UE to send second uplink resource indication information. Correspondingly, the UE receives the second uplink resource indication information from the first access network device.

A resource indicated by the second uplink resource indication information is a resource scheduled by the first access network based on a second user equipment identifier (the C-RNTI allocated by the first access network device to the UE), or may be a preconfigured physical uplink shared channel (PUSCH) resource.

S2005: The UE sends a part of the uplink user plane data to the first access network device by using the uplink resource indicated by the second uplink resource indication information. Correspondingly, the first access network device receives the part of the uplink user plane data from the UE.

S2006: The first access network device sends a context obtaining request message to the second access network device through the control plane interface. Correspondingly, the second access network device receives the context obtaining request message from the first access network device.

The context obtaining request message is used to request to obtain the access stratum context of the UE. The context obtaining request message may include the part of the uplink user plane data (where herein, the part of the uplink user plane data is the part of the uplink user plane data transmitted by the UE to the first access network device in S2005) and information used to identify the UE. The information used to identify the UE may include one or more of the following information: a first user equipment identifier (for example, the I-RNTI), the second user equipment identifier (for example, the C-RNTI), and a third user equipment identifier (for example, the Xn-AP ID). Herein, the context obtaining request message does not need to carry the identity authentication information and the cell identifier of the source cell.

After receiving the context obtaining request message from the first access network device, the second access network device performs S1904 to S1906.

In this way, for the UE, if a data amount of the uplink user plane data is relatively large or an uplink resource is limited, the UE may send the uplink user plane data to the first access network device twice or more times. Correspondingly, each time the first access network device receives a part of the uplink user plane data of the UE, the first access network device sends the part to the second access network device, so that a plurality of data packets of the uplink user plane data are transmitted between the first access network device and the second access network device, thereby satisfying a requirement of transmitting a large data amount of uplink user plane data.

Figure 21:
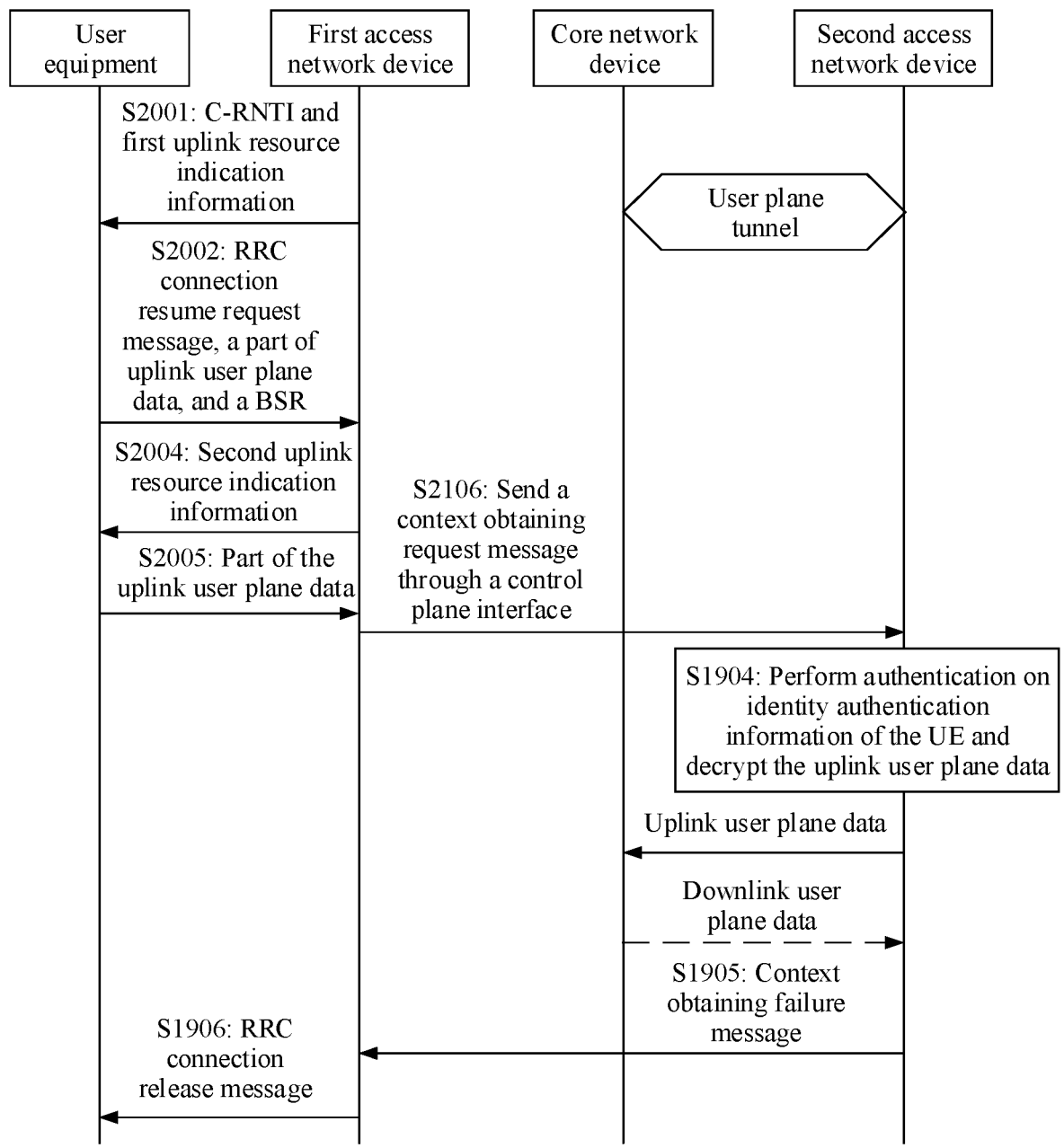
FIG. 21 is a method flowchart of yet another communication method according to an embodiment of this application.

Example 3: The UE can send all uplink user plane data to the first access network device twice or more times, and the first access network device can forward the uplink user plane data of the UE to the second access network device once. Refer to FIG. 21. A specific implementation process includes S2001, S2002, S2004, S2005, S2106, and S1904 to S1906.

S2106: The first access network device sends a context obtaining request message to the second access network device through the control plane interface. Correspondingly, the second access network device receives the context obtaining request message from the first access network device.

The context obtaining request message is used to request to obtain an access stratum context of the UE. The context obtaining request message includes the uplink user plane data of the UE, an I-RNTI, identity authentication information, a C-RNTI allocated by the first access network device to the UE, a cell identifier of a source cell, and an Xn-AP ID allocated by the first access network device to the UE. For descriptions of the part of the uplink user plane data and the uplink control plane information element, refer to related descriptions of S9021. Details are not described herein again.

The uplink user plane data carried in the context obtaining request message is the uplink user plane data received by the first access network device by using S2002 and S2005.

After receiving the context obtaining request message from the first access network device, the second access network device performs S1904 to S1906.

In this way, for the UE, if a data amount of the uplink user plane data is relatively large or an uplink resource is limited, the UE may send the uplink user plane data to the first access network device twice or more times. The first access network device transmits the uplink user plane data of the UE to the second access network device once, so that signaling overheads between the access network devices are reduced.

The communication method provided in the embodiments of this application is described in detail below by using an example in which "the first access network device sends the uplink control plane information element and the uplink user plane data to the second access network device through the user plane interface".

Figure 22:
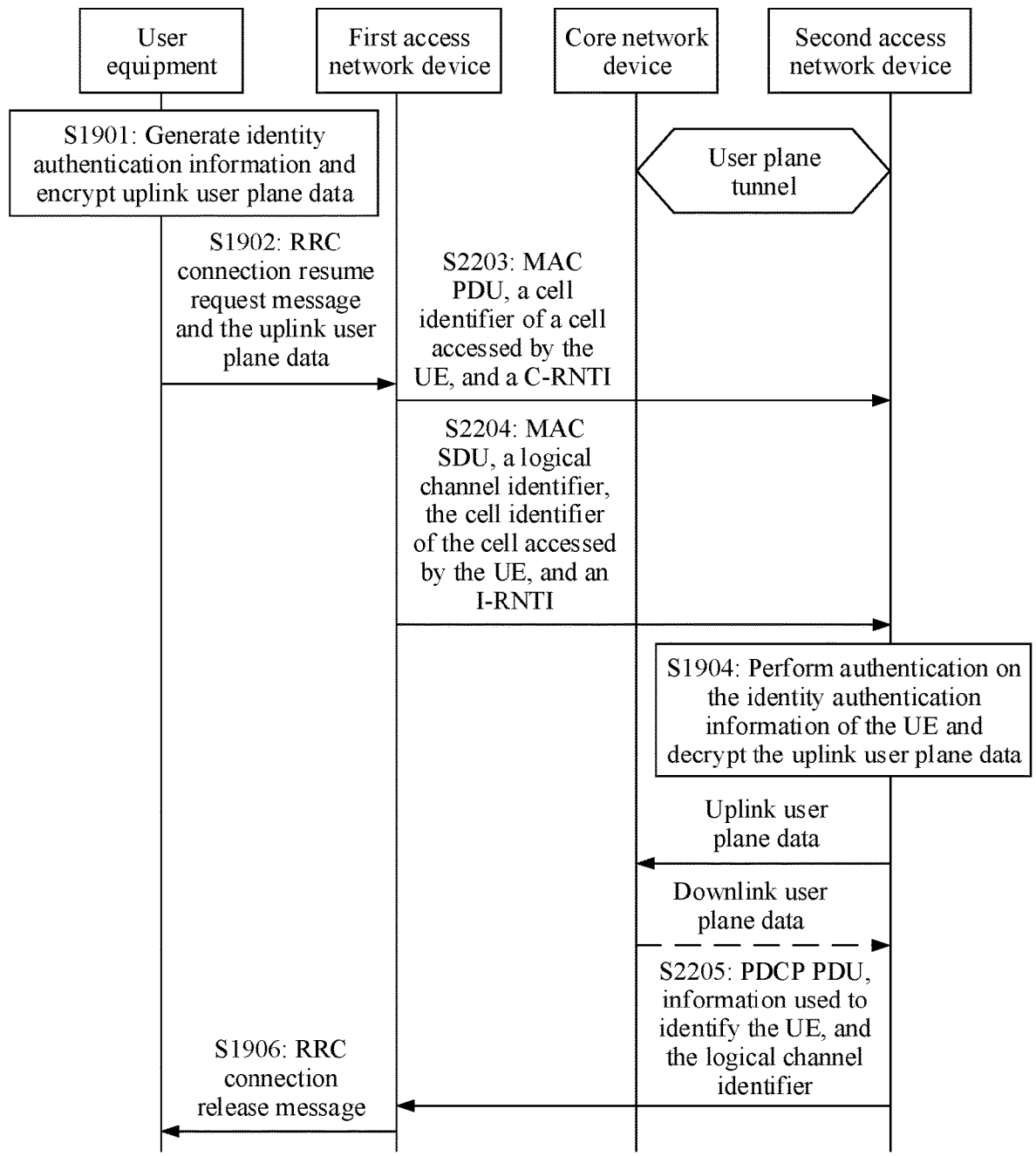
FIG. 22 is a method flowchart of yet another communication method according to an embodiment of this application.

Example 4: Refer to FIG. 22. A specific implementation process is as follows:

S1901: The UE generates identity authentication information, and encrypts uplink user plane data.

S1902: The UE sends an RRC connection resume request message and the uplink user plane data to the first access network device. Correspondingly, the first access network device receives the RRC connection resume request message and the uplink user plane data from the UE, and performs S2203 or S2204.

The RRC connection resume request message and the uplink user plane data may be carried in a same MAC PDU, or may be carried in different MAC PDUs.

S2203: The first access network device sends, to the second access network device through the user plane interface, the MAC PDU, a cell identifier of a target cell accessed by the UE, and a second user equipment identifier (for example, a C-RNTI) allocated by the second access network device to the UE. Correspondingly, the second access network device receives, from the first access network device, the MAC PDU, the cell identifier of the target cell accessed by the UE, and the second user equipment identifier allocated by the second access network device to the UE.

For example, the uplink user plane data, a first user equipment identifier (for example, an I-RNTI), and the identity authentication information of the UE (for example, a MAC-I) are all carried in the MAC PDU. The MAC PDU, the cell identifier of the target cell accessed by the UE, and the second user equipment identifier (for example, the C-RNTI) are transmitted from the first access network device to the second access network device through a user plane tunnel. In this case, after receiving the MAC PDU from the UE, the first access network device does not need to perform splitting processing, and directly sends the MAC PDU to the second access network device. If the uplink user plane data and the RRC connection resume request message are carried in a same MAC PDU (that is, the MAC PDU from the UE carries both the uplink user plane data and the RRC connection resume request message), the first access network device only needs to send one MAC PDU to the second access network device. If the uplink user plane data and the RRC connection resume request message are carried in different MAC PDUs, the first access network device sends two or more MAC PDUs to the second access network device.

S2204: The first access network device sends, to the second access network device through the user plane interface, a MAC SDU, a logical channel identifier, the cell identifier of the target cell accessed by the UE, and the second user equipment identifier (for example, an I-RNTI) allocated by the first access network device to the UE. Correspondingly, the second access network device receives, from the first access network device, the MAC SDU, the logical channel identifier, the cell identifier of the target cell accessed by the UE, and the second user equipment identifier allocated by the second access network device to the UE.

For example, the uplink user plane data is carried in a MAC SDU. Both the first user equipment identifier (for example, the I-RNTI) and the identity authentication information (for example, the MAC-I) of the UE are carried in another MAC SDU. The MAC SDU carrying the uplink user plane data, a logical channel identifier corresponding to the uplink user plane data, a MAC SDU carrying a part of an uplink control plane information element, the cell identifier of the target cell accessed by the UE, and the second user equipment identifier (for example, the C-RNTI) are transmitted from the first access network device to the second access network device through the user plane tunnel. In this case, after receiving the MAC PDU from the UE, the first access network device performs splitting processing, determines SDUs corresponding to a same logical channel identifier, and sends the MAC PDU corresponding to the same logical channel identifier to the second access network device.

S1904: The second access network device performs authentication on the identity authentication information of the UE, and decrypts the uplink user plane data.

S2205: The second access network device sends a PDCP PDU, information used to identify the UE, and the logical channel identifier to the first access network device through the user plane interface. Correspondingly, the first access network device receives the PDCP PDU, the information used to identify the UE, and the logical channel identifier from the second access network device through the user plane interface.

For example, the PDCP PDU includes a PDCP PDU that carries the downlink control plane information element. The information used to identify the UE, the PDCP PDU carrying a part of the downlink control plane information element, and the logical channel identifier are transmitted from the second access network device to the first access network device through the user plane tunnel.

Optionally, the PDCP PDU further includes a PDCP PDU that carries downlink user plane data. The logical channel identifier and the PDCP PDU that carries the downlink user plane data are transmitted from the second access network device to the first access network device through the user plane tunnel.

S1906: The first access network device sends an RRC connection release message to the UE. Correspondingly, the UE receives the RRC connection release message from the first access network device.

The RRC connection release message indicates a state of the UE. For a process in which "the first access network device transmits only the RRC connection release message to the UE", refer to the conventional technology. Details are not described herein again.

Optionally, if the first access network device further needs to send the downlink user plane data to the UE, for descriptions of the downlink user plane data and the RRC connection release message, refer to related descriptions in S906. Details are not described herein again.

In this way, the uplink user plane data or the downlink user plane data is transmitted between the first access network device and the second access network device through the user plane interface, to implement data transmission between the UE and the core network device, without needing to migrate an access stratum context of the UE, and without needing to switch the user plane tunnel between the access network device and the core network device (the UPF), thereby reducing signaling overheads between the UE and the access network device and between the access network device and the core network device, and reducing a data transmission delay.

The communication method provided in the embodiments of this application is described in detail below by using an example in which "the first access network device and the second access network device transmit the control plane information element and the user plane data through different interfaces".

Figure 23:
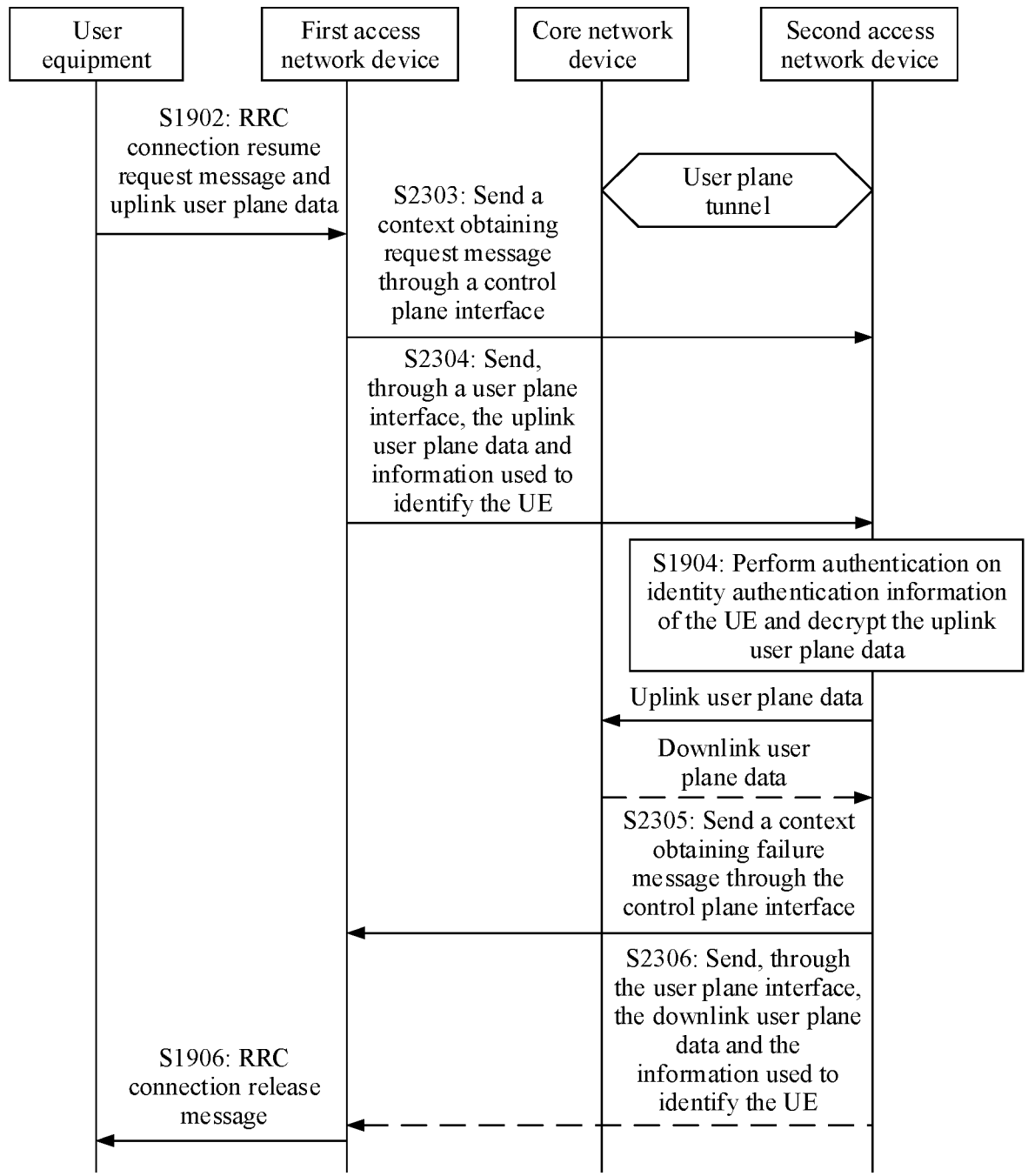
FIG. 23 is a method flowchart of yet another communication method according to an embodiment of this application.

Example 5: Refer to FIG. 23. A specific implementation process is as follows:

S1902: The UE sends an RRC connection resume request message and uplink user plane data to the first access network device. Correspondingly, the first access network device receives the RRC connection resume request message and the uplink user plane data from the UE.

S2303: The first access network device sends a context obtaining request message to the second access network device through the control plane interface. Correspondingly, the second access network device receives the context obtaining request message from the first access network device.

The context obtaining request message is used to request to obtain an access stratum context of the UE. The context obtaining request message may include an I-RNTI, identity authentication information, a C-RNTI allocated by the first access network device to the UE, a cell identifier of a source cell, an Xn-AP ID allocated by the first access network device to the UE, and a first indication information element. The first indication information element is used to indicate the second access network device to receive the uplink user plane data from the first access network device.

S2304: The first access network device sends the uplink user plane data and information used to identify the UE to the second access network device through the user plane interface. Correspondingly, the second access network device receives the uplink user plane data and the information used to identify the UE from the first access network device through the user plane interface.

Herein, the second access network device starts a timer based on the first indication information element. During running of the timer, the second access network device receives the uplink user plane data from the first access network device.

Optionally, if the second access network device first receives the uplink user plane data but does not receive an uplink control plane information element, the second access network device starts the timer, and the second access network device receives the uplink control plane information element during running of the timer. Timing duration of the timer may be timing duration obtained by the second access network device from the first access network device, or may be timing duration preset by the second access network device.

S1904: The second access network device performs authentication on the identity authentication information of the UE, and decrypts the uplink user plane data.

S2305: The second access network device sends a context obtaining failure message to the first access network device through the control plane interface. Correspondingly, the first access network device receives the context obtaining failure message from the second access network device through the control plane interface.

The context obtaining failure message is used to indicate that obtaining of the access stratum context of the UE fails. The context obtaining failure message includes a downlink control plane information element. The downlink control plane information element indicates a state of the UE.

Optionally, if the second access network device buffers downlink user plane data of the UE, the context obtaining failure message in S2305 further carries a second indication information element, used to indicate the first access network device to receive the downlink user plane data from the second access network device. The second access network device further performs S2306.

S2306: The second access network device sends the downlink user plane data and the information used to identify the UE to the first access network device through the user plane interface. Correspondingly, the first access network device receives the downlink user plane data and the information used to identify the UE from the second access network device through the user plane interface.

Herein, the first access network device starts a timer based on the second indication information element. During running of the timer, the second access network device receives the downlink user plane data from the first access network device.

Optionally, if the first access network device first receives the downlink user plane data but does not receive the downlink control plane information element, the first access network device starts the timer, and the first access network device receives the downlink control plane information element during running of the timer. Timing duration of the timer may be timing duration obtained by the first access network device from the second access network device, or may be timing duration preset by the first access network device.

S1906: The first access network device sends an RRC connection release message to the UE. Correspondingly, the UE receives the RRC connection release message from the first access network device.

Optionally, if the first access network device further needs to send the downlink user plane data to the UE, for descriptions of the downlink user plane data and the RRC connection release message, refer to related descriptions in S906. Details are not described herein again.

In this way, the uplink user plane data or the downlink user plane data is transmitted between the first access network device and the second access network device through the user plane interface, and the uplink control plane information element or the downlink control plane information element is transmitted between the first access network device and the second access network device through the control plane interface, without needing to migrate the access stratum context of the UE, and without needing to switch a user plane tunnel between the access network device and the core network device (the UPF), thereby reducing signaling overheads between the UE and the access network device and between the access network device and the core network device, and reducing a data transmission delay.

The communication method provided in the embodiments of this application is described in detail below by using an example in which "the first access network device and the second access network device transmit the uplink control plane information element and the uplink user plane data through different interfaces, and transmit the downlink control plane information element and the downlink user plane data through a same interface".

Figure 24:
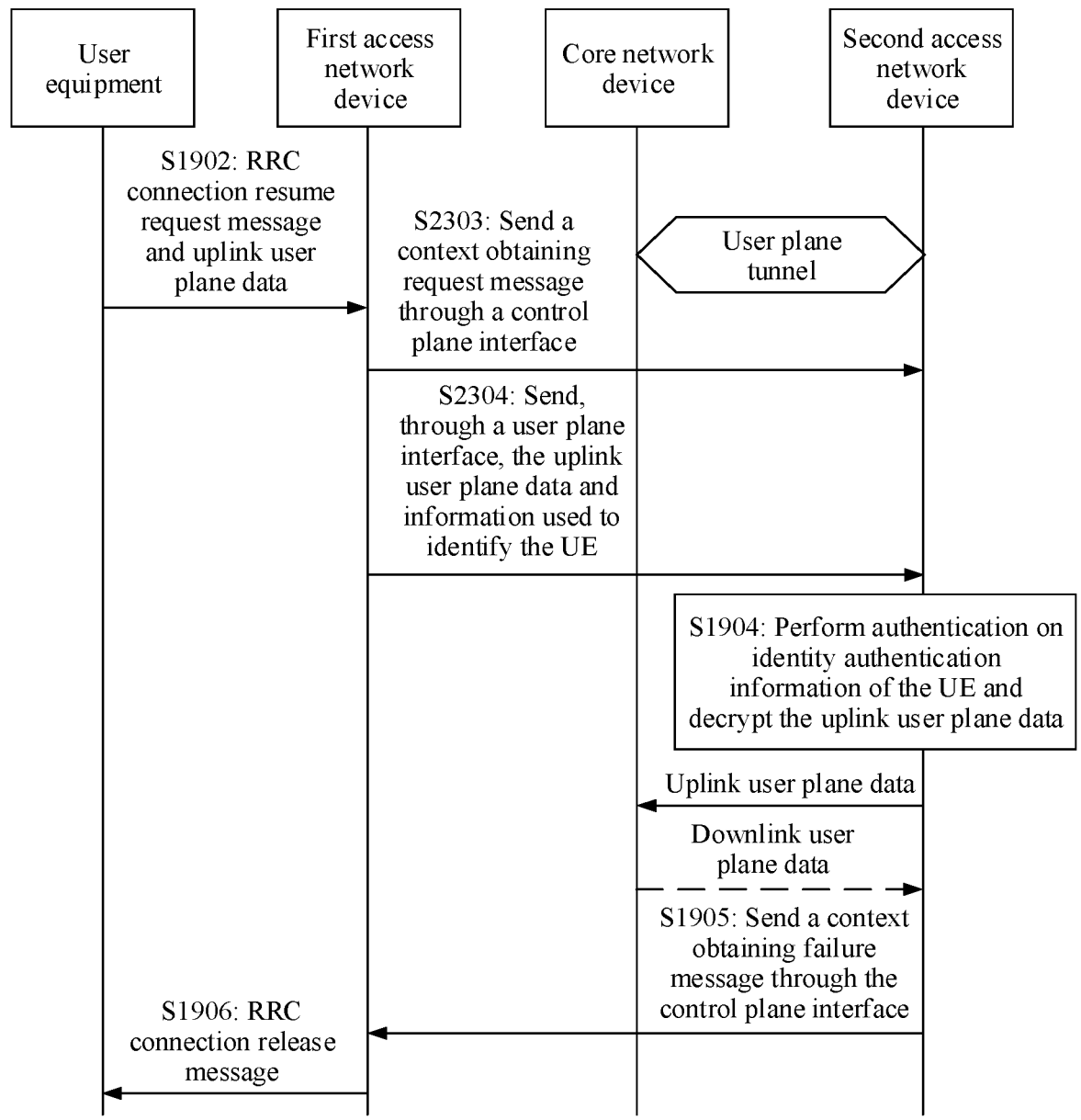
FIG. 24 is a method flowchart of yet another communication method according to an embodiment of this application.

Example 6: Refer to FIG. 24. A specific implementation process sequentially includes S1902, S2303, S2304, S1904, S1905, and S1906.

For S1902, S2303, and S2304, refer to related descriptions in Example 5. For S1904 to S1906, refer to related descriptions in Example 1.

In this way, during downlink transmission, the first access network device and the second access network device transmit downlink user plane data and a downlink control plane information element through the control plane interface, to avoid a case in which "the UE cannot receive the downlink user plane data because the second access network device prematurely sends the RRC connection release message.

The communication method provided in the embodiment of this application is described in detail by using an example in which "the first access network device and the second access network device transmit a control plane information element and user plane data through a core network device".

Figure 25:
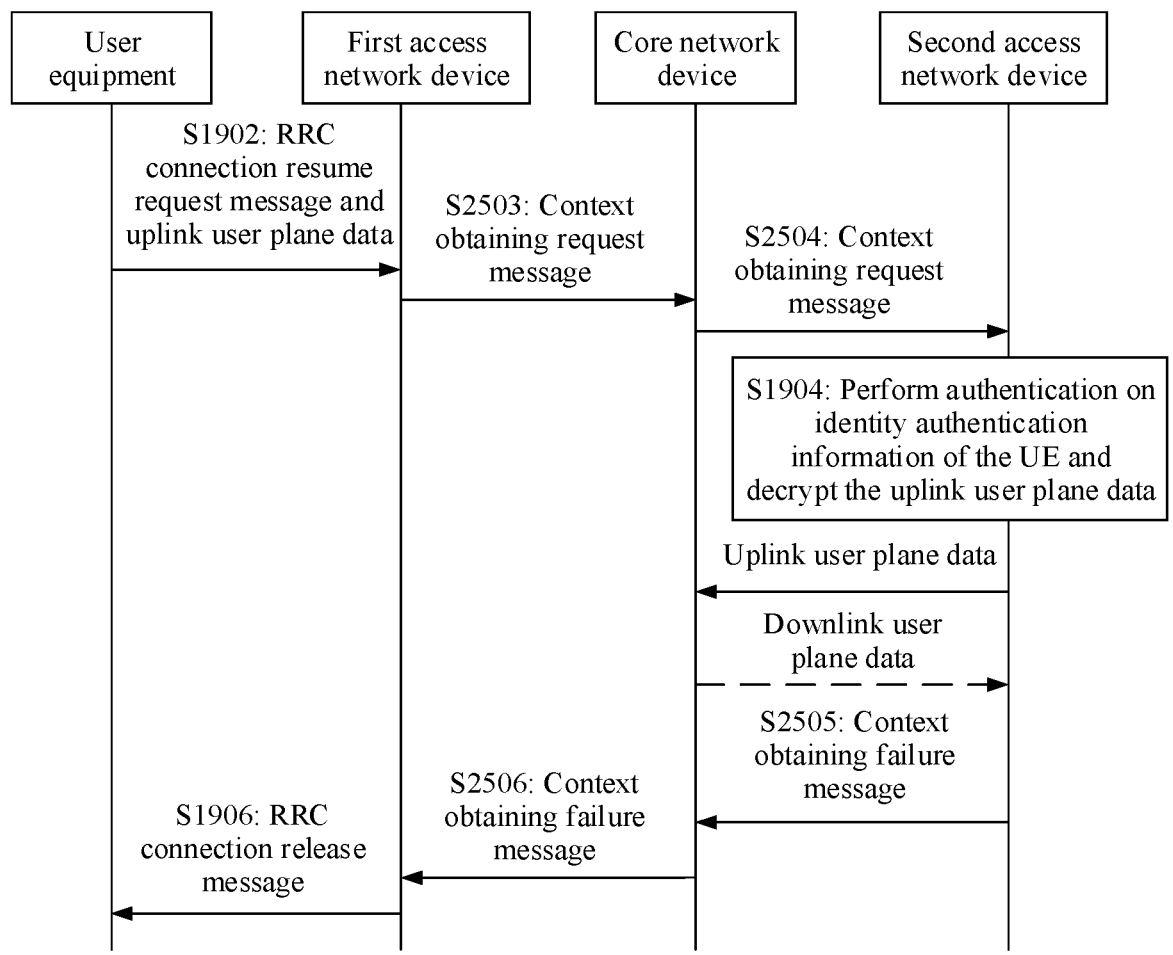
FIG. 25 is a method flowchart of yet another communication method according to an embodiment of this application.

Example 7: Refer to FIG. 25. A specific implementation process is as follows:

S1902: The UE sends an RRC connection resume request message and uplink user plane data to the first access network device. Correspondingly, the first access network device receives the RRC connection resume request message and the uplink user plane data from the UE.

S2503: The first access network device sends a context obtaining request message to the core network device. Correspondingly, the core network device receives the context obtaining request message from the first access network device.

The context obtaining request message is used to request an access stratum context of the UE. The context obtaining request message carries the uplink user plane data.

The core network device is an AMF.

S2504: The core network device sends a context obtaining request message to the second access network device. Correspondingly, the second access network device receives the context obtaining request message from the core network device.

The context obtaining request message is used to request the access stratum context of the UE. The context obtaining request message carries the uplink user plane data.

S1904: The second access network device performs authentication on identity authentication information of the UE, and decrypts the uplink user plane data.

S2505: The second access network device sends a context obtaining failure message to the core network device. Correspondingly, the core network device receives the context obtaining failure message from the second access network device.

The context obtaining failure message is used to indicate that obtaining of the access stratum context of the UE fails. The context obtaining failure message includes a downlink control plane information element. The downlink control plane information element indicates a state of the UE.

Optionally, if the second access network device buffers downlink user plane data of the UE, the context obtaining failure message includes the downlink control plane information element and the downlink user plane data.

S2506: The core network device sends the context obtaining failure message to the first access network device. Correspondingly, the first access network device receives the context obtaining failure message from the core network device, and the first access network device performs S1906.

Optionally, if the second access network device buffers the downlink user plane data of the UE, the context obtaining failure message includes the downlink control plane information element and the downlink user plane data.

In this way, in a scenario in which no Xn interface exists between the first access network device and the second access network device, the first access network device and the second access network device transmits the user plane data and the control plane information element through the core network device. This avoids a long data transmission delay and high signaling overheads that are caused by context migration and user plane tunnel migration.

The communication method provided in the embodiments of this application is described in detail below by using an example in which "the first access network device and the second access network device cooperate to determine a transmission manner".

Figure 26:
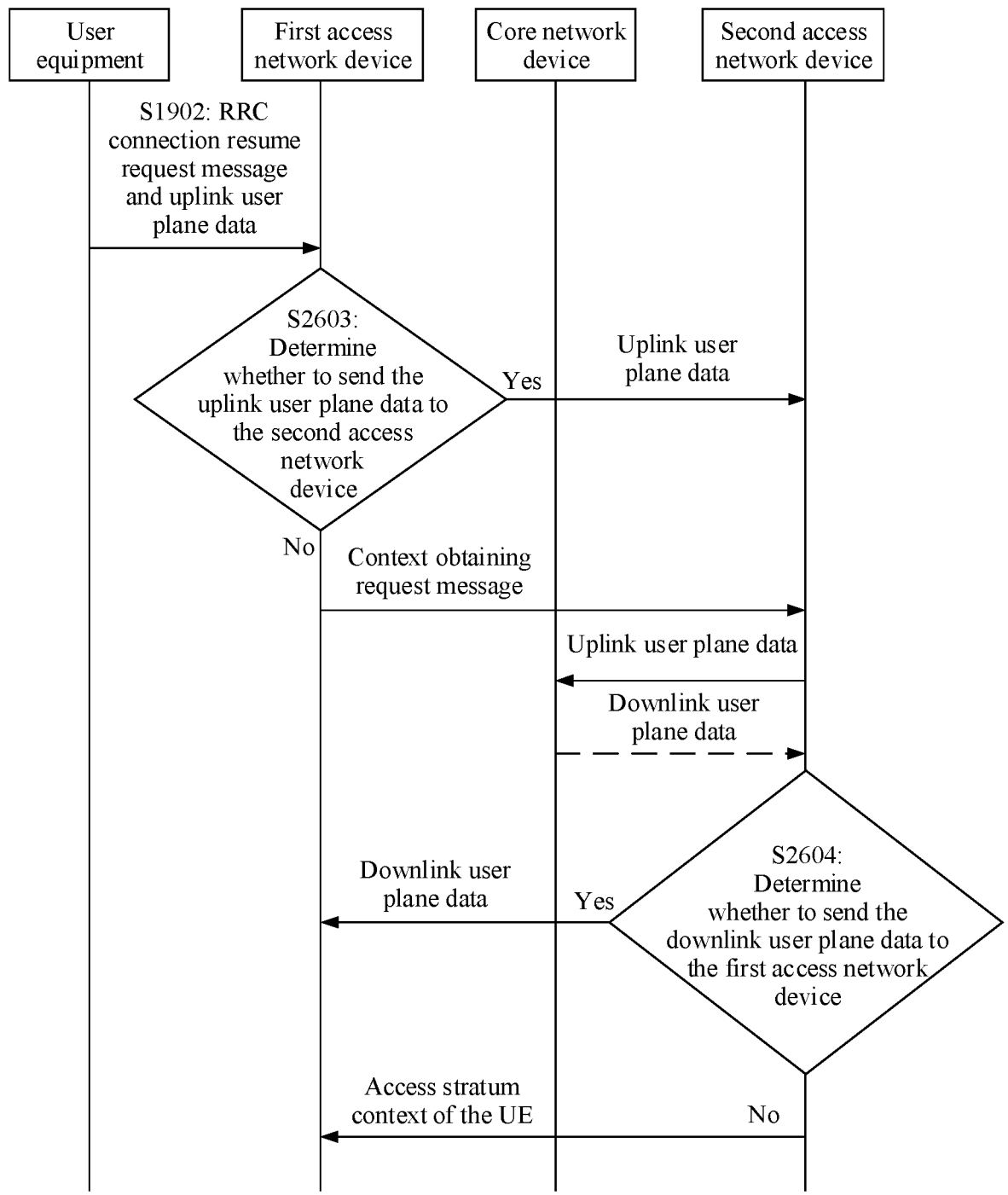
FIG. 26 is a method flowchart of yet another communication method according to an embodiment of this application.

Example 8: Refer to FIG. 26. A specific implementation process is as follows:

S1902: The UE sends an RRC connection resume request message and uplink user plane data to the first access network device. Correspondingly, the first access network device receives the RRC connection resume request message and the uplink user plane data from the UE.

S2603: The first access network device determines, based on a configuration policy and/or a configuration parameter, whether to send the uplink user plane data to the second access network device, and if yes, the second access network device forwards the uplink user plane data to a core network device; or if not, the first access network device performs procedures of migrating an access stratum context of the UE and a user plane tunnel between the second access network device and the core network device.

For a specific procedure in which the second access network device forwards the uplink user plane data to the core network device, refer to descriptions in any one of the foregoing Example 1 to Example 7. Details are not described herein again.

The processes of migrating the access stratum context of the UE and the user plane tunnel (the user plane tunnel between the second access network device and the core network device), refer to a conventional technology. Details are not described herein again.

The configuration policy includes whether the first access network device can forward the uplink user plane data to the second access network device. The configuration policy may be a policy configured by the core network device, or may be a policy determined by the first access network device based on the configuration parameter of the first access network device.

The configuration parameter includes a data amount threshold for forwarding the uplink user plane data by the first access network device to the second access network device. The configuration policy may be a policy configured by the core network device, or may be a policy determined by the first access network device based on the configuration parameter of the first access network device.

For example, when the first access network device determines, based on the configuration policy, whether to send the uplink user plane data to the second access network device, if the configuration policy is that the first access network device can forward the uplink user plane data to the second access network device, the second access network device forwards the uplink user plane data to the core network device; or if the configuration policy is that the first access network device cannot forward the uplink user plane data to the second access network device, the first access network device migrates the access stratum context of the UE and the user plane tunnel between the second access network device and the core network device.

When the first access network device determines, based on the configuration parameter, whether to send the uplink user plane data to the second access network device, if the uplink user plane data is less than or equal to the data amount threshold, the second access network device forwards the uplink user plane data to the core network device; or if the uplink user plane data is greater than the data amount threshold, the first access network device migrates the access stratum context of the UE and the user plane tunnel between the second access network device and the core network device.

When the first access network device determines, based on the configuration policy and the configuration parameter, whether to send the uplink user plane data to the second access network device, if the configuration policy is that the first access network device can forward the uplink user plane data to the second access network device, and the uplink user plane data is less than or equal to the data amount threshold, the second access network device forwards the uplink user plane data to the core network device; or if the configuration policy is that the first access network device cannot forward the uplink user plane data to the second access network device, or the uplink user plane data is greater than the data amount threshold, the first access network device migrates the access stratum context of the UE and the user plane tunnel between the second access network device and the core network device.

If the second core network device buffers downlink user plane data, S2604 is performed.

S2604: The second access network device determines, based on a configuration policy and/or a configuration parameter, whether to send the uplink user plane data to the first access network device, and if yes, the first access network device forwards the downlink user plane data to the UE; or if not, the second access network device performs procedures of migrating the access stratum context of the UE and the user plane tunnel between the second access network device and the core network device.

For example, when the second access network device determines, based on the configuration policy, whether to send the downlink user plane data to the first access network device, if the configuration policy is that the second access network device can forward the downlink user plane data to the first access network device, the first access network device forwards the downlink user plane data to the UE; or if the configuration policy is that the second access network device cannot forward the downlink user plane data to the first access network device, the second access network device migrates the access stratum context of the UE and the user plane tunnel between the second access network device and the core network device.

When the second access network device determines, based on the configuration parameter, whether to send the downlink user plane data to the first access network device, if the downlink user plane data is less than or equal to the data amount threshold, the first access network device forwards the downlink user plane data to the UE; or if the downlink user plane data is greater than the data amount threshold, the second access network device migrates the access stratum context of the UE and the user plane tunnel between the second access network device and the core network device.

When the second access network device determines, based on the configuration policy and the configuration parameter, whether to send the downlink user plane data to the first access network device, if the configuration policy is that the second access network device can forward the downlink user plane data to the first access network device, and the downlink user plane data is less than or equal to the data amount threshold, the second access network device forwards the downlink user plane data to the UE; or if the configuration policy is that the second access network device cannot forward the downlink user plane data to the first access network device, or the downlink user plane data is greater than the data amount threshold, the second access network device migrates the access stratum context of the UE and the user plane tunnel between the second access network device and the core network device.

In this way, the configuration policy and the configuration parameter can control data forwarding load between the first access network device and the second access network device, and can also reduce signaling overheads between the UE and the access network device and between the access network device and the core network device.

The foregoing mainly describes the solutions provided in the embodiments of this application from a perspective of interaction between different network elements. It may be understood that, to implement the foregoing functions, the first access network device and the second access network device include corresponding hardware structures and/or software modules for performing the functions. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation falls beyond the scope of the technical solutions in the embodiments of this application.

In the embodiments of this application, the communication apparatus may be divided into functional units based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that, in the embodiments of this application, division into the units is an example and merely logical function division, and may be other division in actual implementations.

Figure 27:
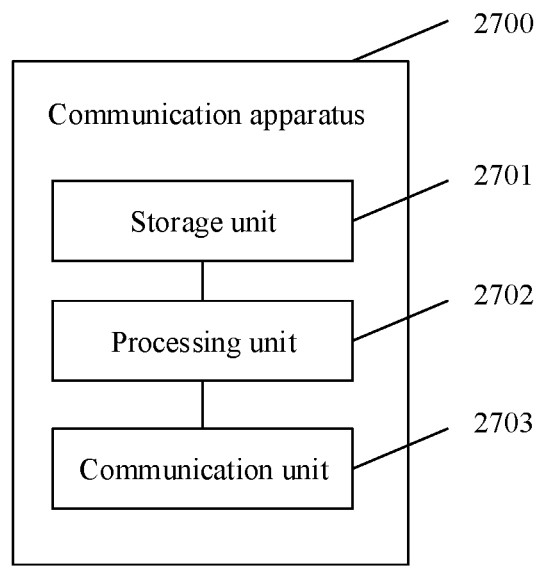
FIG. 27 is a schematic diagram of a structure of a communication apparatus according to an embodiment of this application.

FIG. 27 is a schematic block diagram of a communication apparatus 2700 according to an embodiment of this application. The communication apparatus 2700 may exist in a form of software, or may be a device, or a component (for example, a chip system) in the device. The communication apparatus 2700 includes a processing unit 2702 and a communication unit 2703.

The communication unit 2703 is an interface circuit of the communication apparatus 2700, and is configured to receive a signal from or send a signal to another apparatus. For example, when the communication apparatus 2700 is implemented in a form of a chip, the communication unit 2703 is an interface circuit used by the chip to receive a signal from another chip or apparatus, or is an interface circuit used by the chip to send a signal to another chip or apparatus.

The communication unit 2703 may include a communication unit configured to communicate with UE and a communication unit configured to communicate with another access network device, and may further include a communication unit configured to communicate with a core network device. The communication units may be integrated together, or may be implemented independently.

When the communication apparatus 2700 is configured to implement a function of the foregoing first access network device, for example, the processing unit 2702 may be configured to support the communication apparatus 2700 in performing S2603 in FIG. 26, and/or another process used for the solution described in this specification. The communication unit 2703 is configured to support the communication apparatus 2700 in communicating with another network element (for example, a second access network device). For example, the communication unit is configured to support the communication apparatus 2700 in performing S902 shown in FIG. 9, and/or another process used for the solution described in this specification.

When the communication apparatus 2700 is configured to implement a function of the second access network device in the foregoing method, for example, the processing unit 2702 may be configured to support the communication apparatus 2700 in performing S903 in FIG. 9, and/or another process used for the solution described in this specification. The communication unit 2703 is configured to support the communication apparatus 2700 in communicating with another network element (for example, a first access network device). For example, the communication unit is configured to support the communication apparatus 2700 in performing S904 shown in FIG. 9, and/or another process used for the solution described in this specification.

Optionally, the communication apparatus 2700 may further include a storage unit 2701, configured to store program code and data of the communication apparatus 2700, where the data may include but is not limited to original data, intermediate data, or the like.

The processing unit 2702 may be a processor or a controller, for example, a CPU, a general-purpose processor, a DSP, an ASIC, an FPGA or another programmable logic device, a transistor logic device, a hardware component, or any combination thereof. The processing unit 2702 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The communication unit 2703 may be a communication interface, a transceiver, a transceiver circuit, or the like. The communication interface is a general name. In a specific implementation, the communication interface may include a plurality of interfaces, for example, an interface between the first access network device and the second access network device and/or another interface.

The storage unit 2701 may be a memory.

Figure 28:
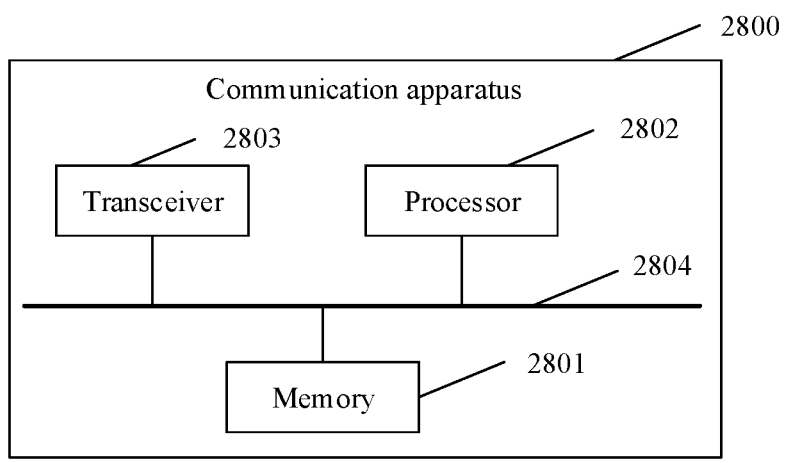
FIG. 28 is a schematic diagram of a structure of another communication apparatus according to an embodiment of this application.

When the processing unit 2702 is a processor, the communication unit 2703 is a communication interface, and the storage unit 2701 is a memory, a communication apparatus 2800 in this embodiment of this application may be shown in FIG. 28.

Refer to FIG. 28. The communication apparatus 2800 includes a processor 2802, a transceiver 2803, and a memory 2801.

The transceiver 2803 may be an independently disposed transmitter, and the transmitter may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in this embodiment of this application.

Optionally, the communication apparatus 2800 may further include a bus 2804. The transceiver 2803, the processor 2802, and the memory 2801 may be connected to each other through the bus 2804. The bus 2804 may be a peripheral component interconnect (PCI) bus, an extended industry standard architecture (EISA) bus, or the like. The bus 2804 may be classified into an address bus, a data bus, a control bus, or the like. For ease of representation, only one thick line is used to represent the bus in FIG. 28, but this does not mean that there is only one bus or only one type of bus.

A person of ordinary skill in the art may understand that all or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions in the embodiments.

In addition, functional units in the embodiments of this application may be integrated into one processing unit, or each of the functional units may exist independently, or two or more units may be integrated into one unit. The integrated unit may be implemented in a form of hardware, or may be implemented in a form of hardware combined with a software functional unit.

Based on the foregoing descriptions of the implementations, a person skilled in the art may clearly understand that this application may be implemented by software in addition to necessary universal hardware or by hardware only. In most circumstances, the former is a preferred implementation. Based on such an understanding, the technical solutions of this application essentially or the part contributing to the current technology may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
receiving, by a first access network device, uplink user plane data from a user equipment (UE) in an inactive state; and
sending, by the first access network device, an uplink control plane information element and the uplink user plane data to a second access network device through different interfaces, wherein the uplink control plane information element comprises a first indication information element, and wherein the first indication information element comprises a cause value or a buffer status report (BSR), and the cause value or the BSR is used to indicate the second access network device to receive the uplink user plane data sent by the first access network device.

2. The communication method according to claim 1, wherein the uplink control plane information element comprises one or more of the following information elements:
a first user equipment identifier,
identity authentication information of the UE,
a cell identifier of a target cell accessed by the UE, or
a second user equipment identifier allocated by the first access network device to the UE.

3. The communication method according to claim 1, wherein the sending, by the first access network device, the uplink control plane information element and the uplink user plane data to the second access network device through different interfaces comprises:
sending, by the first access network device, the uplink control plane information element to the second access network device through a control plane interface; and
sending, by the first access network device, the uplink user plane data to the second access network device through a user plane interface.

4. The communication method according to claim 1, further comprising:
receiving, by the first access network device, a downlink control plane information element and downlink user plane data from the second access network device through different interfaces; and
sending, by the first access network device, the downlink user plane data to the UE, wherein the downlink control plane information element comprises a second indication information element, and the second indication information element is used to indicate the first access network device to receive the downlink user plane data from the second access network device.

5. The communication method according to claim 4, wherein the receiving, by the first access network device, the downlink control plane information element and the downlink user plane data from the second access network device through different interfaces comprises:
receiving, by the first access network device, the downlink user plane data from the second access network device through a user plane interface; and
receiving, by the first access network device, the downlink control plane information element from the second access network device through a control plane interface.

6. The communication method according to claim 4, further comprising:
starting, by the first access network device, a timer in response to the first access network device receiving the downlink user plane data but not receiving the downlink control plane information element, wherein a running period of the timer is used by the first access network device to receive the downlink control plane information element.

7. The communication method according to claim 1, further comprising:
receiving, by the first access network device through a control plane interface or a user plane interface, a downlink control plane information element and downlink user plane data from the second access network device.

8. An apparatus, comprising:
one or more processors; and
a non-transitory memory coupled to the one or more processors, wherein the non-transitory memory stores a program to be executed by the one or more processors, the program including instructions for:
receiving, by the apparatus, uplink user plane data from a user equipment (UE) in an inactive state; and
sending, by the apparatus, an uplink control plane information element and the uplink user plane data to a second access network device through different interfaces, wherein the uplink control plane information element comprises a first indication information element, and wherein the first indication information element comprises a cause value or a buffer status report (BSR), and the cause value or the BSR is used to indicate the second access network device to receive the uplink user plane data sent by the apparatus.

9. The apparatus according to claim 8, wherein the uplink control plane information element comprises one or more of the following information elements:
a first user equipment identifier,
identity authentication information of the UE,
a cell identifier of a target cell accessed by the UE, or
a second user equipment identifier allocated by the first access network device to the UE.

10. The apparatus according to claim 8, wherein the sending, by the apparatus, the uplink control plane information element and the uplink user plane data to the second access network device through different interfaces comprises:
sending, by the apparatus, the uplink control plane information element to the second access network device through a control plane interface; and
sending, by the apparatus, the uplink user plane data to the second access network device through a user plane interface.

11. The apparatus according to claim 8, wherein the program further includes instructions for:
receiving, by the apparatus, a downlink control plane information element and downlink user plane data from the second access network device through different interfaces; and
sending, by the apparatus, the downlink user plane data to the UE, wherein the downlink control plane information element comprises a second indication information element, and the second indication information element is used to indicate the apparatus to receive the downlink user plane data from the second access network device.

12. The apparatus according to claim 11, wherein the receiving, by the apparatus, the downlink control plane information element and downlink user plane data from the second access network device through different interfaces comprises:

receiving, by the apparatus, the downlink user plane data from the second access network device through a user plane interface; and receiving, by the apparatus, the downlink control plane information element from the second access network device through a control plane interface.

13. The apparatus according to claim 11, wherein the program further includes instructions for:

starting, by the apparatus, a timer in response to the apparatus receiving the downlink user plane data but not receiving the downlink control plane information element, wherein a running period of the timer is used by the apparatus to receive the downlink control plane information element.

14. The apparatus according to claim 8, wherein the program further includes instructions for:

receiving, by the apparatus through a control plane interface or a user plane interface, a downlink control plane information element and downlink user plane data from the second access network device.

15. A non-transitory computer readable medium, wherein the non-transitory computer readable medium stores instructions that are executable by a computer, and the instructions comprise instructions for:

receiving, by a first access network device, uplink user plane data from a user equipment (UE) in an inactive state; and sending, by the first access network device, an uplink control plane information element and the uplink user plane data to a second access network device through different interfaces, wherein the uplink control plane information element comprises a first indication information element, and wherein the first indication information element comprises a cause value or a buffer status report (BSR), and the cause value or the BSR is used to indicate the second access network device to receive the uplink user plane data sent by the first access network device.

16. The non-transitory computer readable medium according to claim 15, wherein the uplink control plane information element comprises one or more of the following information elements:

a first user equipment identifier, identity authentication information of the UE, a cell identifier of a target cell accessed by the UE, or a second user equipment identifier allocated by the first access network device to the UE.

17. The non-transitory computer readable medium according to claim 15, wherein the sending, by the first access network device, the uplink control plane information element and the uplink user plane data to the second access network device through different interfaces comprises:

sending, by the first access network device, the uplink control plane information element to the second access network device through a control plane interface; and sending, by the first access network device, the uplink user plane data to the second access network device through a user plane interface.

* * * * *